United States Patent
Harazin

(10) Patent No.: US 11,275,188 B2
(45) Date of Patent: Mar. 15, 2022

(54) SYSTEMS AND METHODS FOR EMULATING SCINTILLATION EVENTS USING AN ELECTRONIC TEST SOURCE

(71) Applicant: PerkinElmer Health Sciences, Inc., Waltham, MA (US)

(72) Inventor: Richard Harazin, Lombard, IL (US)

(73) Assignee: PerkinElmer Health Sciences, Inc., Waltham, MA (US)

(*) Notice: Subject to any disclaimer, the term of this patent is extended or adjusted under 35 U.S.C. 154(b) by 0 days.

(21) Appl. No.: 16/645,399

(22) PCT Filed: Sep. 14, 2018

(86) PCT No.: PCT/US2018/051116
§ 371 (c)(1),
(2) Date: Mar. 6, 2020

(87) PCT Pub. No.: WO2019/055805
PCT Pub. Date: Mar. 21, 2019

(65) Prior Publication Data
US 2020/0284927 A1    Sep. 10, 2020

Related U.S. Application Data

(60) Provisional application No. 62/559,064, filed on Sep. 15, 2017.

(51) Int. Cl.
  *G01T 7/00*    (2006.01)
  *G01T 1/204*   (2006.01)
  *G01T 1/208*   (2006.01)

(52) U.S. Cl.
  CPC ............. *G01T 7/005* (2013.01); *G01T 1/204* (2013.01); *G01T 1/208* (2013.01)

(58) Field of Classification Search
  CPC .......... G01T 7/005; G01T 1/204; G01T 1/208
  See application file for complete search history.

(56) References Cited

U.S. PATENT DOCUMENTS 3,818,356 A    6/1974 Kinbara
3,988,586 A   10/1976 Stuart et al.
(Continued)

FOREIGN PATENT DOCUMENTS

CN    103235331 A    8/2013
CN    105425268 A    3/2016
(Continued)

OTHER PUBLICATIONS

Ahn, J. K. et al., RENO: An Experiment for Neutrino Oscillation Parameter q13 Using Reactor Neutrinos at Yonggwang (Proposal and Technical Design Report), RENO Collaboration, 128 pages, (2010).
(Continued)

*Primary Examiner* — Blake C Riddick
(74) *Attorney, Agent, or Firm* — Choate, Hall & Stewart LLP; William R. Haulbrook; Ronen Adato

(57) ABSTRACT

Presented herein are systems and methods that provide for calibration and/or testing of liquid scintillation counters (LSCs) using an electronic test source. In certain embodiments, the electronic test source described herein provides for emission of emulated radioactive event test pulses that emulate light pulses produced by a scintillator as a result of radioactive decay of a variety of different kinds of radioactive emitters (e.g., beta, alpha, and gamma emitters). Additionally, in certain embodiments, the systems and methods described herein provide for the emission of emulated background light (e.g., luminescence and after-pulses) from the electronic test source. The emulated radioactive event test pulses and, optionally, emulated background light can be used for the calibration and/or testing of LSCs, in place of (Continued)

hazardous radioactive material and/or volatile chemicals. Accordingly, the systems and methods described herein dramatically improve the calibration and/or testing of liquid scintillation counters.

16 Claims, 24 Drawing Sheets

(56) References Cited

U.S. PATENT DOCUMENTS

| | | | |
|---|---|---|---|
| 4,060,726 A * | 11/1977 | Luitwieler | G01T 1/16 250/252.1 |
| 4,651,006 A | 3/1987 | Valenta | |
| 4,742,226 A | 5/1988 | De Filippis | |
| 5,308,544 A * | 5/1994 | Dodson | G01T 1/2042 252/301.16 |
| 5,317,158 A | 5/1994 | McElhaney et al. | |
| 5,357,114 A * | 10/1994 | Kaihola | G01T 1/204 250/328 |
| 5,399,869 A | 3/1995 | Usuda | |
| 5,483,070 A | 1/1996 | Valenta | |
| 5,489,775 A | 2/1996 | Viera | |
| 5,866,907 A * | 2/1999 | Drukier | G01T 1/2008 250/366 |
| 6,392,236 B1 | 5/2002 | Maekawa et al. | |
| 8,115,176 B2 | 2/2012 | Stein et al. | |
| 8,796,632 B2 | 8/2014 | Aspinall et al. | |
| 9,297,909 B2 | 3/2016 | Harazin | |
| 10,145,967 B2 | 12/2018 | Belobraydich et al. | |
| 2004/0206909 A1 | 10/2004 | Izumi et al. | |
| 2004/0262530 A1 | 12/2004 | Reber et al. | |
| 2006/0081786 A1 | 4/2006 | Berthold et al. | |
| 2006/0207066 A1* | 9/2006 | Segelke | G02B 21/10 23/295 R |
| 2007/0051892 A1* | 3/2007 | Warburton | G01T 1/2928 250/362 |
| 2007/0051893 A1 | 3/2007 | Matsumoto | |
| 2007/0257193 A1* | 11/2007 | Macciocchi | G01T 1/1642 250/341.5 |
| 2007/0290136 A1 | 12/2007 | Ivan | |
| 2008/0315110 A1* | 12/2008 | Iwatschenko-Borho | G01T 1/023 250/394 |
| 2009/0039271 A1 | 2/2009 | Farsoni et al. | |
| 2010/0226580 A1* | 9/2010 | Frank | G06K 9/00543 382/209 |
| 2010/0280980 A1* | 11/2010 | Gentile | G01V 5/0075 706/12 |
| 2010/0308231 A1 | 12/2010 | Sharghi Ido et al. | |
| 2012/0080598 A1 | 4/2012 | Aspinall et al. | |
| 2013/0275087 A1 | 10/2013 | Scott et al. | |
| 2013/0277565 A1 | 10/2013 | Bogorodzki et al. | |
| 2014/0001365 A1* | 1/2014 | Akers | G01T 1/2008 250/362 |
| 2015/0021489 A1 | 1/2015 | Bogorodzki et al. | |
| 2015/0301194 A1 | 10/2015 | Harazin | |
| 2015/0323682 A1 | 11/2015 | Yang et al. | |

FOREIGN PATENT DOCUMENTS

| | | |
|---|---|---|
| GB | 1497367 A | 1/1978 |
| GB | 2484393 A | 4/2012 |
| JP | 2000-131441 A | 5/2000 |
| JP | 2004163352 A | 6/2004 |
| JP | 2008-26195 A | 2/2008 |
| WO | WO-2015/160480 A1 | 10/2015 |
| WO | WO-2015/171919 A1 | 11/2015 |
| WO | WO-2018/075081 A1 | 4/2018 |

OTHER PUBLICATIONS

Bower et al., Alpha-beta discrimination liquid scintillation counting for uranium and its daughters, Journal of Radioanalytical and Nuclear Chemistry, Articles, 181(1):97-107 (1994).

Chepurnov, A.S. et al., Online calibration of neutrino liquid scintillator detectors above 10 MeV, Journal of Physics: Conference Series 675(1):012008, 6 pages, (2016).

Edler, R. et al., Basics of alpha/beta-discrimination for liquid scintillation counting, (2010) Retrieved from the Internet: URL:http://www.perkinelmer.co.jp/Portals/0/resource/data/pdf/ApplicationNotes/LS_AN_009379_01.pdf [retrieved on Jun. 29, 2017].

EG&G Wallac, Pulse Shape Analysis (PSA), Instrument Manual, 1220 Quantulus, Ultra Low Level Liquid Scintillation Spectrometer, Internal Software Version 1.D, pp. 21-24 (1999).

International Search Report, PCT/US2016/059508, 4 pages, dated Jul. 14, 2017.

International Search Report, PCT/US2018/051116 (Systemsand Methods for Emulating Scintillation Events Using an Electronic Test Source, filed Sep. 14, 2018), issued by ISA/European Patent Office, dated Jan. 8, 2019, 3 pages.

Perkiinelmer, Scintillation Cocktails & Consumables, PerkinElmer, Inc., 48 pages (2007).

Perkinelmer Life Sciences, Instrument Manual, Wallac 1220 Quantulus, Ultra Low Level Liquid Scintillation Spectrometer, 210 pages (2002).

Perkinelmer, Scintillating Results at Your Lowest Concentrations, PerkinElmer, Inc., 12 Pages (2015).

Sefzick, T. et al., A System for Simulation of Scintillator Light Signals, Nuclear Instruments and Methods in Physics Research, A288:571-573, (1990).

Stojkovic, I. et al., PSA discriminator influence on 222Rn efficiency detection in waters by liquid scintillation counting, Applied Radiation and Isotopes, 112:80-88, (2016).

Thomson, J., Use and Preparation of Quench Curves in Liquid Scintillation Counting, Packard BioScience, Lquicid Scintillation Counting, Application Note LSC-007, pp. 1-6 (2001).

University of Wisconsin, Milwaukee Environmental Health, Safety and Risk Management Radiation Safety Program, Liquid Scintillation Counting, 14 pages (1999).

Written Opinion, PCT/US2016/059508, 9 pages, dated Jul. 14, 2017.

Written Opinion, PCT/US2018/051116 (Systemsand Methods for Emulating Scintillation Events Using an Electronic Test Source, filed Sep. 14, 2018), issued by ISA/European Patent Office, dated Jan. 8, 2019, 8 pages.

* cited by examiner

SYSTEMS AND METHODS FOR EMULATING SCINTILLATION EVENTS USING AN ELECTRONIC TEST SOURCE

CROSS REFERENCE TO RELATED APPLICATIONS

This application claims priority to and the benefit of U.S. Provisional Application No. 62/559,064, filed Sep. 15, 2017, the content of which is hereby incorporated by reference in its entirety.

FIELD OF THE INVENTION

This invention relates generally to systems and methods for calibrating and/or testing a liquid scintillation counter using an electronic test source, e.g., without requiring radioactive calibration materials or chemicals.

BACKGROUND OF THE INVENTION

Radionuclides that are present in a sample may be identified and quantified by detecting and analyzing the radiation emitted from the sample. This is important in many contexts, such as the detection of tritium, radon, radium, and uranium in drinking water; the detection of strontium in food; the detection of $^{14}C$ in food, alcohol, and biofuels; evaluations of tritium and $^{14}C$ emissions from nuclear power plants; the monitoring of radioactivity during decommissioning of nuclear reactors; tracer measurements in oil exploration; adsorption, distribution, metabolism, and excretion (ADME) studies; the detection of radionuclides in biological samples (e.g., identification of viable drug pathways in drug development); and radiocarbon dating of archaeological samples, as well as many other biological and environmental contexts.

There are a variety of systems and analytical techniques available for the detection of events caused by the radioactive decay of radionuclides in a sample. Where the sample contains a plurality of radionuclides that emit different kinds of radiation (e.g., both alpha and beta emitters), or where a sample contains a radionuclide of unknown type, it is important to be able to determine whether a detected radioactive event is caused by alpha, beta, or gamma radiation.

For example, in liquid scintillation counting, a test sample containing one or more radionuclides to be identified is mixed with a solvent capable of dissolving the sample, along with a scintillator (e.g., a fluor). A vial of the resulting cocktail is placed in a detector comprising one or more photomultiplier tubes (PMTs). When the radionuclide(s) undergo radioactive decay, the emitted decay energy causes excitation of the scintillator, which releases light that is then detected. For example, alpha and beta decay events are typically detected using a fast photon emitting liquid scintillator (e.g., 2,5-diphenyloxazole (PPO)) while gamma decay events (e.g., from gamma-emitting sources, e.g., from cosmic rays) are detected using a slower photon emitting solid scintillator (e.g., bismuth germinate oxide (BGO)). The intensity of the light emitted by a scintillator is a function of the decay energy, and the shape of the detected pulse can be used to distinguish between different kinds of radioactive decay events (e.g., alpha, beta, or gamma emission). The detector produces a pulse signal corresponding to each of a plurality of radioactive events detected in the test sample. The identity and/or quantity of the radionuclide can then be determined.

It is recognized that pulse shape may be indicative of the identity of a radionuclide. For example, a pulse of light detected by a liquid scintillation counter (LSC) can be classified as having been caused by an emitted alpha particle, beta particle, or gamma ray based on its pulse shape. Beta pulses have the shortest duration (e.g., shortest pulse width, e.g., shortest tail length) followed by alpha and gamma pulses, respectively.

Liquid scintillation counting measurements of radioactive activity are accompanied by background light that can obscure the identity and/or quantity of radionuclide(s) in a sample. This background can originate, for example, from chemiluminescence, environmental radiation, electronic noise, crosstalk between the liquid scintillation counter's photomultiplier tubes, and the residual radioactivity and/or luminescence of the sample vial and other materials of the liquid scintillation counter. Such background light may take the form of low level light corresponding to single photon events, or light pulses that resemble those produced by radionuclides in a sample. For example, external gamma rays (e.g., cosmic rays) may strike a liquid scintillator, resulting in an initial pulse of light that is similar to that caused by a beta event. In order to accurately detect radioactive events produced by radionuclides present in a sample, liquid scintillation counters include circuitry and associated software that allows such background light to be distinguished from pulses of light that originate from radioactive decay of radionuclides within a sample.

In order to distinguish between the different radioactive decay events (alpha, beta, and gamma emission) and to discriminate between background signals and true radioactive decay events originating from the sample, a liquid scintillation counter must be appropriately calibrated and/or tested.

However, the calibration and/or testing of a liquid scintillation counter is a complex and at times hazardous process, often requiring the use of hazardous radioactive test materials and/or volatile chemicals. The need to use such hazardous and/or volatile materials limits not only the ease but also efficacy with which a liquid scintillation counter can be calibrated.

Thus, there is a need for improved systems and methods for calibrating and/or testing liquid scintillation counters. Systems and methods that provide for calibrating and/or testing liquid scintillation counters without the need to use radioactive calibration materials and/or volatile chemicals are of particular importance.

SUMMARY OF THE INVENTION

Presented herein are systems and methods that provide for calibration and/or testing of liquid scintillation counters (LSCs) using an electronic test source. In certain embodiments, the systems provide improved calibration results without requiring radioactive calibration materials or chemicals such as solvents or bleach.

In certain embodiments, the electronic test source described herein provides for emission of emulated radioactive event test pulses that emulate light pulses produced by a scintillator as a result of radioactive decay of a variety of different kinds of radioactive emitters (e.g., beta emitters; e.g., alpha emitters; e.g., gamma emitters). Additionally, in certain embodiments, the systems and methods described herein provide for the emission of emulated background light (e.g., luminescence and after-pulses) from the electronic test source. The emulated radioactive event test pulses and, optionally, emulated background light can be used for the calibration and/or testing of liquid scintillation counters, in place of hazardous radioactive material and/or volatile chemicals.

In particular, as described herein, the electronic test source can be used in a programmable fashion to generate various different emulated radioactive event test pulses that emulate those produced by the radioactive decay of real radioactive elements. These emulated radioactive event test pulses can be generated at various energies and in the form of sequences of light pulses, emitted at programmable rates as fixed and/or pseudorandom sequences. In this manner, the electronic test source described herein can be used to calibrate and/or test a wide range of features (e.g., electronics and/or associated software) of a liquid scintillation counter that are used to differentiate between light pulses originating from different kinds of radioactive emitters. Moreover, the electronic test source can also be used to emulate background light, such as luminescence and/or after-pulses. The emulated background light can be generated in conjunction with emulated radioactive event test pulses and used to calibrate and/or test features (e.g., electronics and/or associated software) of a liquid scintillation counter that are used to discriminate light pulses originating from radioactive emitters in a sample from light that corresponds to undesired background signal.

As described herein, in certain embodiments, the capability of the electronic test source to emit emulated radioactive event test pulses and/or emulated background light in a programmable fashion is achieved via one or more light emitting diodes (LEDs) that are driven by specially designed circuitry in combination with a programmable controller module. Accordingly, the specific types and characteristics of emulated radioactive event test pulses and/or emulated background light generated by the electronic test source may be set, and adjusted by a user in a flexible manner, based on their particular calibration and/or testing needs. In addition, in certain embodiments, the electronic test source is implemented as a single, battery powered, small component, that can be placed into standard scintillation vials used in a liquid scintillation counter.

The electronic test source described herein may be used to generate emulated radioactive event test pulses that emulate light pulses produced by radioactive events such as beta events, alpha events, and gamma events. For example, the electronic test source may generate beta test pulses that have a light pulse shape that emulates a light pulse shape produced by a scintillator as a result of radioactive decay of a beta emitter, thereby emulating light pulses produced by a beta event. Similarly, the electronic test source may generate alpha test pulses and gamma test pulses that emulate, respectively, light pulses produced by alpha and gamma events. In certain embodiments, the electronic test source comprises a programmable controller module and multiple selectable circuit paths that control an electronic pulse signal (e.g., a voltage; e.g., a current) applied to a first light emitting diode (LED), referred to herein as a "pulse LED". A user may thereby program the electronic test source to generate various combinations different emulated radioactive event test pulses in succession or a particular sequence (e.g., beta test pulses and alpha test pulses; e.g., beta test pulses and gamma test pulses; e.g., alpha test pulses and gamma test pulses; e.g. beta test pulses and after-pulse test pulses).

In certain embodiments, in this manner, the electronic test source can be used to calibrate electronics of a liquid scintillation counter and/or associated software for distinguishing between light pulses originating from different kinds of radioactive events (e.g., beta events; e.g., alpha events; e.g., gamma events). In particular, described herein are liquid scintillation counters that use one or more discriminators to differentiate between light pulses originating from different kinds of radioactive events. In certain embodiments, the discriminators are implemented in hardware—via electronic circuitry, as discriminator circuits. In certain embodiments, the discriminators are implemented via software routines, and/or as combinations of hardware and software. In order to effectively distinguish between various kinds of radioactive event light pulses, discriminator circuits and/or software routines are first calibrated. The various types of emulated radioactive event test pulses that can be generated by the electronic test source described herein can be used for calibration of discriminators.

For example, appropriate combinations of beta test pulses, alpha test pulses, and gamma test pulses can be used to calibrate beta/gamma discriminator circuits (e.g., that are used to discriminate between light pulses produced by beta and gamma events) and alpha/gamma discriminator circuits (e.g., that are used to discriminate between light pulses produced by alpha and gamma events). Combinations of test pulses may also be used to calibrate discriminators that are implemented as software routines (e.g., to adjust one or more parameters in a software routine) that distinguish between light pulses produced by beta, alpha, and/or gamma events. An example approach for classifying different detected light pulses as originating from different radioactive events is described in U.S. patent application Ser. No. 15/337,885, filed Oct. 28, 2016, the entire content of which is hereby incorporated by reference.

Accordingly, the electronic test source described herein can be used to calibrate electronics and/or software routines for discriminating between light pulses produced by different types of radioactive events in place of radioactive materials. This approach is particularly relevant for calibration of liquid scintillation counters in the field, since it obviates the need for expensive, potentially hazardous, and heavily restricted (e.g., alpha sources require special licenses to transport) transportation radioactive materials.

In certain embodiments, the electronic test source described herein features the ability to adjust intensities of emulated radioactive event test pulses. Adjusting the intensity of emulated radioactive event test pulses allows for light pulses produced by different energy events (e.g., from 0 keV to 2000 keV) to be emulated (e.g., the energy of a radioactive event influences the intensity of the resultant light pulse produced by a scintillator). Multiple emulated radioactive event test pulses of different intensities may be generated to emulate a spectrum produced by a specific type of radioactive element, such as carbon-14 ($^{14}C$). Different intensity emulated radioactive event test pulses and emulated spectra may be used to validate the dynamic range of a liquid scintillation counter and/or perform a high voltage calibration.

The electronic test source described herein may also be used (e.g., programmed) to produce sequences of emulated radioactive event test pulses. A sequence of radioactive event test pulses may be generated at a fixed rate (e.g., up to 2 million per minute) or as a pseudorandom sequence. Sequences of emulated radioactive event test pulses may be used to test the count rate linearity of a liquid scintillation counter and/or a dead-time correction of the liquid scintillation counter.

The electronic test source may also use sequences of emulated radioactive event test pulses from the pulse LED to calibrate and/or test time-resolved liquid scintillation counting (TRLSC) electronics and/or software. In certain embodiments, TRLSC counts after-pulses that follow an initial, primary pulse to determine whether the primary pulse is the result of a radioactive event originating from the sample, such as a beta event, or the result of an external gamma event, such as a cosmic ray. By generating a fast sequence of test pulses from the pulse LED shortly after a primary emulated radioactive event test pulse from the pulse LED, the electronic test source can emulate the initial pulses resulting from a sample radioactive event and/or an external gamma event along with their associated after-pulses. These emulated primary and after pulses can be detected and used to calibrate and/or test TRLSC electronics and/or software. Approaches for TRLSC are described, for example, in U.S. Pat. No. 4,651,006, issued Mar. 17, 1987, the entire content of which is hereby incorporated by reference.

In certain embodiments, in addition to emulated radioactive event test pulses, the electronic test source described herein also provides for generation of emulated background light (e.g., corresponding to background luminescence). Emulated background light may be generated via a second LED, referred to herein as a "lumi LED". An electronic lumi signal (e.g., a voltage; e.g., a current) may be applied to the lumi LED to result in emission of emulated background light comprises a sufficiently small number of photons so as to emulate single photon events corresponding to background luminescence. For example, a programmable source controller module (e.g., a microcontroller) may adjust the intensity of the emulated background light emitted from a lumi LED, for example, by adjusting a fixed signal (e.g., dc voltage, e.g., constant current) applied across the lumi LED or adjusting a pulse width-modulated signal (e.g., voltage or current) applied to the lumi LED.

In certain embodiments, emulated background light may be used to calibrate and/or test, for example, a luminescence correction utility (e.g., software, e.g., circuit) of a liquid scintillation counter. For example, an electronic test source may generate emulated radioactive event test pulses from the pulse LED in combination with background light from the lumi LED to emulate background luminescence and/or after-pulses. This approach can be used to calibrate and/or test electronics and/or software for rejecting background luminescence while capturing desired pulses corresponding to radioactive decay events.

Accordingly, the systems and methods described herein provide for flexible calibration and/or testing of liquid scintillation counters via an electronic test source that replaces radioactive calibration materials and volatile chemicals. In this manner, the systems and methods described herein dramatically facilitate the calibration and/or testing of liquid scintillation counters.

In one aspect, the invention is directed to a method for calibrating and/or testing a liquid scintillation counter using an electronic test source, the method comprising: (a) generating, from a pulse light emitting diode (LED) of the electronic test source, a plurality of emulated radioactive event test pulses (e.g., of the same kind or of different kinds), wherein each emulated radioactive event test pulse is of a kind selected from the group consisting of: (A) a beta test pulse having a light pulse shape (e.g., intensity as a function of time) that emulates a light pulse shape produced by a scintillator as a result of radioactive decay of a beta emitter [e.g., the beta test pulse having a light pulse shape that emulates that of a light pulse produced by emission (e.g., luminescence) from a liquid scintillator (e.g., 2,5-diphenyloxazole (PPO)) as result of radioactive decay of a beta emitter {e.g., the beta test pulse having a pulse peak occurring approximately 5 to 20 ns (e.g., approximately 15 ns) after a start of the pulse and a pulse tail length of approximately 20 to 60 ns (e.g., approximately 40 ns)}]; (B) an alpha test pulse having a light pulse shape (e.g., intensity as a function of time) that emulates a light pulse shape produced by a scintillator as a result of radioactive decay of an alpha emitter [e.g., the alpha test pulse having a light pulse shape that emulates that of a light pulse produced by emission from a liquid scintillator (e.g., 2,5-diphenyloxazole (PPO)) as result of radioactive decay of an alpha emitter {e.g., the alpha test pulse having a pulse peak occurring approximately 5 to 20 ns (e.g., approximately 15 ns) after a start of the pulse and a pulse tail length greater than or approximately equal to 60 ns (e.g., approximately 60 to 100 ns; e.g., approximately 80 ns)}]; and (C) a gamma test pulse, having a light pulse shape (e.g., intensity as a function of time) that emulates a light pulse shape produced by a scintillator as a result of radioactive decay of a gamma emitter [e.g., the gamma test pulse having a light pulse shape that emulates that of a light pulse produced by emission from a solid scintillator (e.g., bismuth germinate oxide (BGO)) as a result of radioactive decay of a gamma emitter {e.g., the gamma test pulse having a pulse peak occurring approximately 90 ns or more after a start of the pulse and a pulse tail length of approximately 150 ns or more}; e.g., the gamma test pulse having a light pulse shape that emulates that of a light pulse produced by emission from a scintillator as a result of radioactive decay of a gamma emitter], wherein the plurality of emulated radioactive event test pulses comprises at least one beta test pulse and at least one alpha test pulse (e.g., wherein the plurality of emulated radioactive event test pulses comprises at least one beta test pulse, at least one alpha test pulse, and at least one gamma test pulse); and (b) detecting, by one or more detectors of the liquid scintillation counter, the plurality of emulated radioactive event test pulses (e.g., and identifying each of the detected plurality of emulated radioactive event test pulses by kind).

In certain embodiments, the method comprises calibrating one or more discriminators (e.g., an alpha/beta discriminators) of the liquid scintillation counter based on the detection of the at least one alpha test pulse and the at least one beta test pulse by the liquid scintillation counter.

In certain embodiments, the plurality of emulated radioactive event test pulses comprises at least one gamma test pulse [e.g., the gamma test pulse having a light pulse shape that emulates that of a light pulse produced by emission from a solid scintillator (e.g., bismuth germinate oxide (BGO)) as result of radioactive decay of a gamma emitter], and the method comprises calibrating one or more discriminators of the liquid scintillation counter based on (i) detection of the at least one alpha test pulse and/or the at least one beta test pulse and (ii) detection of the at least one gamma test pulse.

In certain embodiments, the electronic test source is sufficiently small to fit inside a scintillation vial (e.g., a 100 mL vial, e.g., a 50 mL vial, e.g., a 30 mL vial, e.g., a 20 mL vial, e.g., a 7 mL vial).

In another aspect, the invention is directed to a method for calibrating and/or testing a liquid scintillation counter using an electronic test source, the method comprising: (a) generating, from a pulse LED of the electronic test source, a plurality of emulated radioactive event test pulses (e.g., of the same kind or of different kinds), wherein each emulated radioactive event test pulse is of a kind selected from the group consisting of: (A) a beta test pulse having a light pulse shape (e.g., intensity as a function of time) that emulates a light pulse shape produced by a scintillator as a result of radioactive decay of an beta emitter [e.g., the beta test pulse having a light pulse shape that emulates that of a light pulse produced by emission (e.g., luminescence) from a liquid scintillator (e.g., 2,5-diphenyloxazole (PPO)) as result of radioactive decay of a beta emitter {e.g., the beta test pulse having a pulse peak occurring approximately 5 to 20 ns (e.g., approximately 15 ns) after a start of the pulse and a pulse tail length of approximately 20 to 60 ns (e.g., approximately 40 ns)}]; (B) an alpha test pulse having a light pulse shape (e.g., intensity as a function of time) that emulates a light pulse shape produced by a scintillator as a result of radioactive decay of an alpha emitter [e.g., the alpha test pulse having a light pulse shape that emulates that of a light pulse produced by emission from a liquid scintillator (e.g., 2,5-diphenyloxazole (PPO)) as result of radioactive decay of an alpha emitter {e.g., the alpha test pulse having a pulse peak occurring approximately 5 to 20 ns (e.g., approximately 15 ns) after a start of the pulse and a pulse tail length greater than or approximately equal to 60 ns (e.g., approximately 60 to 100 ns; e.g., approximately 80 ns)}]; and (C) a gamma test pulse, having a light pulse shape (e.g., intensity as a function of time) that emulates a light pulse shape produced by a scintillator as a result of radioactive decay of a gamma emitter [e.g., the gamma test pulse having a light pulse shape that emulates that of a light pulse produced by emission from a solid scintillator (e.g., bismuth germinate oxide (BGO)) as result of radioactive decay of a gamma emitter (e.g., the gamma test pulse having a pulse peak occurring approximately 90 ns or more after a start of the pulse and a pulse tail length of approximately 150 ns or more); e.g., the gamma test pulse having a light pulse shape that emulates that of a light pulse produced by emission from a liquid scintillator as a result of radioactive decay of a gamma emitter], (b) adjusting [e.g., using a programmable controller module (e.g., a microcontroller)] at least one of (i) and (ii) as follows: (i) an intensity of one or more of the emulated radioactive event test pulses [e.g., to generate emulated radioactive event test pulses at different intensities, thereby emulating light pulses produced by a scintillator as a result of radioactive decay events having different energies (e.g., to validate an energy path dynamic range of the liquid scintillation counter); e.g., to generate an emulated carbon-14 spectrum (e.g., to perform a high voltage calibration of the liquid scintillation counter)]; and (ii) a time interval between two or more emulated radioactive event test pulses [e.g., to generate a sequence of emulated radioactive event test pulses at a fixed rate (e.g., to test a count rate linearity of the liquid scintillation counter); e.g., to generate a pseudorandom sequence of emulated radioactive event test pulses (e.g., to test a dead-time correction of the liquid scintillation counter)]; and (c) detecting, by one or more detectors of the liquid scintillation counter, the plurality of emulated radioactive event test pulses [e.g., and comparing an amplitude of a detected signal with the intensities of the emulated radioactive event test pulses; e.g., and comparing a number of pulses detected (e.g., in a given time interval) with a number of pulses generated (e.g., within a given time interval)].

In certain embodiments, the plurality of emulated radioactive event test pulses comprises beta test pulses, step (b) comprises adjusting an intensity of one or more of the beta test pulses to produce a distribution of intensities that emulates a carbon-14 ($^{14}C$) spectrum, thereby generating an emulated $^{14}C$ spectrum, step (c) comprises detecting the emulated $^{14}C$ spectrum, and the method comprises calibrating and/or testing one or more high voltage settings of the liquid scintillation counter based on the detected emulated $^{14}C$ spectrum.

In certain embodiments, step (b) comprises adjusting an intensity of one or more of the emulated radioactive event test pulses to produce a plurality of emulated radioactive event test pulses having different intensities (e.g., progressively increasing intensities; e.g., the different intensities spanning a dynamic range of the liquid scintillation counter; e.g., up to an intensity corresponding to a 2000 keV event); and step (c) comprises detecting the plurality of emulated radioactive event test pulses having different intensities, and the method comprises calibrating and/or testing (e.g., validating) an energy path dynamic range of the liquid scintillation counter based on the intensities of the detected emulated radioactive event test pulses having different intensities.

In certain embodiments, step (b) comprises adjusting the time interval between the two or more emulated radioactive event test pulses to generate a sequence of emulated radioactive event test pulses emitted at a fixed rate (e.g., up to two million pulses per minute); step (c) comprises detecting the sequence of emulated radioactive event test pulses, and the method comprises calibrating and/or testing a count rate linearity of the liquid scintillation counter based on the detected sequence of emulated radioactive event test pulses [e.g., by comparing a number of pulses detected (e.g., in a given time interval) with a number of pulses generated (e.g., within a given time interval, based on the fixed rate)].

In certain embodiments, step (b) comprises repeatedly adjusting the time interval between consecutive radioactive event test pulses to generate a pseudorandom sequence of emulated radioactive event test pulses (e.g., such that the time intervals between different sets of consecutive pulses varies according to a pseudorandom function), step (c) comprises detecting the pseudorandom sequence of emulated radioactive event test pulses, and the method comprises calibrating and/or testing a dead-time correction of the liquid scintillation counter based on the detected pseudorandom sequence of emulated radioactive event test pulses [e.g., by comparing a number of pulses detected (e.g., in a given time interval) with a number of pulses generated (e.g., within a given time interval)].

In certain embodiments, the electronic test source is sufficiently small to fit inside a scintillation vial (e.g., a 100 mL vial, e.g., a 50 mL vial, e.g., a 30 mL vial, e.g., a 20 mL vial, e.g., a 7 mL vial).

In another aspect, the invention is directed to a method for calibrating and/or testing a liquid scintillation counter using an electronic test source, the method comprising: (a) generating, from a pulse LED of the electronic test source, a plurality of emulated radioactive event test pulses (e.g., of the same kind or of different kinds), wherein each emulated radioactive event test pulse is of a kind selected from the group consisting of: (A) a beta test pulse having a light pulse shape (e.g., intensity as a function of time) that emulates a light pulse shape produced by a scintillator as a result of radioactive decay of a beta emitter [e.g., the beta test pulse having a light pulse shape that emulates that of a light pulse produced by emission (e.g., luminescence) from a liquid scintillator (e.g., 2,5-diphenyloxazole (PPO)) as result of radioactive decay of a beta emitter {e.g., the beta test pulse having a pulse peak occurring approximately 5 to 20 ns (e.g., approximately 15 ns) after a start of the pulse and a pulse tail length of approximately 20 to 60 ns (e.g., approximately 40 ns)}]; (B) an alpha test pulse having a light pulse shape (e.g., intensity as a function of time) that emulates a light pulse shape produced by a scintillator as a result of radioactive decay of an alpha emitter [e.g., the alpha test pulse having a light pulse shape that emulates that of a light pulse produced by emission from a liquid scintillator (e.g., 2,5-diphenyloxazole (PPO)) as result of radioactive decay of an alpha emitter {e.g., the alpha test pulse having a pulse peak occurring approximately 5 to 20 ns (e.g., approximately 15 ns) after a start of the pulse and a pulse tail length greater than or approximately equal to 60 ns (e.g., approximately 60 to 100 ns; e.g., approximately 80 ns)}]; and (C) a gamma test pulse, having a light pulse shape (e.g., intensity as a function of time) that emulates a light pulse shape produced by a scintillator as a result of radioactive decay of a gamma emitter [e.g., the gamma test pulse having a light pulse shape that emulates that of a light pulse produced by emission from a solid scintillator (e.g., bismuth germinate oxide (BGO)) as result of radioactive decay of a gamma emitter (e.g., the gamma test pulse having a pulse peak occurring approximately 90 ns or more after a start of the pulse and a pulse tail length of approximately 150 ns or more; e.g., the gamma test pulse having a pulse width of approximately 200 ns to 600 ns); e.g., the gamma test pulse having a light pulse shape that emulates that of a light pulse produced by emission from a liquid scintillator as a result of radioactive decay of a gamma emitter], (b) generating, from a lumi LED of the electronic test source, emulated background light comprising a sufficiently small number of photons so as to emulate single photon events corresponding to background luminescence; and (c) detecting, by one or more detectors of the liquid scintillation counter, the plurality of emulated radioactive event test pulses and the emulated background light (e.g., and differentiating the emulated radioactive event test pulses from the emulated background light; e.g., and identifying one or more of the plurality of emulated radioactive event test pulses as false positive(s) based on detection of the one or more emulated radioactive event test pulses and emulated background light).

In certain embodiments, the method comprises generating the plurality of emulated radioactive event test pulses in the presence of the emulated background light (e.g., such that one or more of the plurality of emulated radioactive event test pulses are generated at approximately the same time as (e.g., approximately within the same time interval as) the emulated background); and calibrating and/or testing a luminescence correction utility of the liquid scintillation counter based on the detected emulated radioactive event test pulses and the detected emulated background light.

In certain embodiments, the method comprises generating a primary test pulse corresponding to at least one of: (i) a beta test pulse; and (ii) a gamma test pulse, wherein the gamma test pulse has a light pulse shape that emulates that of a light pulse produced by emission from a liquid scintillator as a result of radioactive decay of a gamma emitter; within approximately 75 ns to 5 microseconds following generation of the primary test pulse, generating the emulated background light, thereby emulating after-pulse radiation following the primary test pulse; at step (c), detecting the primary test pulse and emulated after-pulses; and calibrating and/or testing Time-Resolved Liquid Scintillation Counting (TRLSC) electronics and/or software of the liquid scintillation counter based on the detected primary test pulse and detected emulated after-pulse radiation.

In certain embodiments, the electronic test source is sufficiently small to fit inside a scintillation vial (e.g., a 100 mL vial, e.g., a 50 mL vial, e.g., a 30 mL vial, e.g., a 20 mL vial, e.g., a 7 mL vial).

In another aspect, the invention is directed to an electronic test source for calibrating and/or testing a liquid scintillation counter, the electronic test source comprising: (a) a pulse light emitting diode (LED) operable to emit one or more emulated radioactive event test pulses (e.g., of the same kind or of different kinds), each a result of a corresponding electronic pulse signal(s) applied to the pulse LED; and (b) circuitry for producing a plurality of electronic pulse signal(s) (of the same kind or of different kinds) and applying the electronic pulse signal(s) to the pulse LED, wherein each of the one or more electronic pulse signal(s) (e.g., a time varying voltage; e.g., a time varying current) has a selectable electronic pulse shape (e.g., voltage and/or current as a function of time) such that each electronic pulse signal, when applied to the pulse LED, results in emission of an emulated radioactive event test pulse corresponding to a kind of light pulse selected from the group consisting of: (A) a beta test pulse having a light pulse shape (e.g., intensity as a function of time) that emulates a light pulse shape produced by a scintillator as a result of radioactive decay of a beta emitter [e.g., the beta test pulse having a light pulse shape that emulates that of a light pulse produced by emission (e.g., luminescence) from a liquid scintillator (e.g., 2,5-diphenyloxazole (PPO)) as result of radioactive decay of a beta emitter {e.g., the beta test pulse having a pulse peak occurring approximately 5 to 20 ns (e.g., approximately 15 ns) after a start of the pulse and a pulse tail length of approximately 20 to 60 ns (e.g., approximately 40 ns)}]; (B) an alpha test pulse having a light pulse shape (e.g., intensity as a function of time) that emulates a light pulse shape produced by a scintillator as a result of radioactive decay of an alpha emitter [e.g., the alpha test pulse having a light pulse shape that emulates that of a light pulse produced by emission from a liquid scintillator (e.g., 2,5-diphenyloxazole (PPO)) as result of radioactive decay of an alpha emitter {e.g., the alpha test pulse having a pulse peak occurring approximately 5 to 20 ns (e.g., approximately 15 ns) after a start of the pulse and a pulse tail length greater than or approximately equal to 60 ns (e.g., approximately 60 to 100 ns; e.g., approximately 80 ns)}]; and (C) a gamma test pulse, having a light pulse shape (e.g., intensity as a function of time) that emulates a light pulse shape produced by a scintillator as a result of radioactive decay of a gamma emitter [e.g., the gamma test pulse having a light pulse shape that emulates that of a light pulse produced by emission from a solid scintillator (e.g., bismuth germinate oxide (BGO)) as result of radioactive decay of a gamma emitter (e.g., the gamma test pulse having a pulse peak occurring approximately 90 ns or more after a start of the pulse and a pulse tail length of approximately 150 ns or more; e.g., the gamma test pulse having a pulse width of approximately 200 ns to 600 ns); e.g., the gamma test pulse having a light pulse shape that emulates that of a light pulse produced by emission from a liquid scintillator as a result of radioactive decay of a gamma emitter], [e.g., wherein the circuitry is capable of producing at least (A) and (B) (e.g., wherein the circuitry is capable of producing any of (A), (B), and (C)]; and (c) a programmable source controller module (e.g., comprising a microcontroller) operable to select (e.g., via a selectable circuit path) the electronic pulse shape of each of the electronic pulse signal(s), thereby providing for programmable emission of the plurality of emulated radioactive event test pulses from the pulse LED of the electronic test source for calibration and/or testing of the liquid scintillation counter based on detection of the emulated radioactive event test pulses by the liquid scintillation counter [e.g., wherein the programmable source controller module is capable of selecting (e.g., via a selectable circuit path) at least (A) and (B) {e.g., wherein the programmable source controller module is capable of selecting any of (A), (B), and (C)}].

In certain embodiments, the circuitry comprises at least two selectable circuit paths (e.g., wherein each circuit path is associated with a transistor and a given circuit path is selectable by switching on the transistor with which it is associated): a first circuit path (e.g., associated with a first transistor) for producing an electronic pulse signal of a first kind having a first electronic pulse shape such that application of the electronic pulse signal to the pulse LED results in emission of an alpha test pulse; and a second circuit path (e.g., associated with a second transistor) for producing an electronic pulse signal of a second kind having a second electronic pulse shape such that application of the electronic pulse signal of the second kind to the pulse LED, results in emission of a beta test pulse.

In certain embodiments, the programmable source controller module is operable to, for each electronic pulse signal of the one or more electronic pulse signal(s), select the electronic pulse shape of the electronic pulse signal by selecting one or both of the first and second circuit paths (e.g., by applying a voltage to a base of the first transistor for selection of the first circuit path and/or applying a voltage to a base of the second transistor for selection of the second circuit path) wherein: when the first circuit path is selected, the electronic pulse signal of the first kind is produced and applied to the pulse LED, thereby resulting in emission of an alpha test pulse, when the second circuit path is selected, the electronic pulse signal of the second kind is produced and applied to the pulse LED, thereby resulting in emission of a beta test pulse, and when both the first and second circuit paths are selected, an electronic pulse signal of a third kind [e.g., corresponding to overlapped electronic pulse signals of the first and second kind, e.g., with a short delay (e.g., of about 100 ns)] having a third electronic pulse shape is produced and applied to the pulse LED, thereby resulting in emission of a gamma test pulse.

In certain embodiments, the electronic test source comprises: (d) a lumi light emitting diode (LED) operable to emit light emulating background light (e.g., luminescence) as a result of a corresponding electronic lumi signal applied to the lumi LED; and (e) circuitry for producing the electronic lumi signal and applying the electronic lumi signal to the lumi LED, wherein an amplitude and/or duty cycle of the electronic lumi signal is adjustable such that the electronic lumi signal, when applied to the lumi LED, results in emission of the emulated background light comprising a sufficiently small number of photons so as to emulate single photon events corresponding to background luminescence.

In certain embodiments, the programmable source controller module is operable to adjust the electronic lumi signal, thereby providing for programmable emission of the emulated background light and calibration and/or testing of the liquid scintillation counter based on (i) detection of the emulated radioactive event test pulses and (ii) detection of the emulated background light by the liquid scintillation counter.

In certain embodiments, the electronic test source is sufficiently small to fit inside a scintillation vial (e.g., a 100 mL vial, e.g., a 50 mL vial, e.g., a 30 mL vial, e.g., a 20 mL vial, e.g., a 7 mL vial).

In certain embodiments, the programmable source controller module is operable to adjust intensities of the emulated radioactive event test pulses by adjusting an amplitude (e.g., a peak voltage; e.g., a peak current amplitude) of corresponding electronic pulse signals that are applied to the pulse LED [e.g., thereby providing for generation of emulated radioactive event test pulses at different intensities, thereby emulating light pulses produced by a scintillator as a result of radioactive decay events having different energies (e.g., to validate an energy path dynamic range of the liquid scintillation counter); e.g., thereby providing for generation of an emulated carbon-14 spectrum (e.g., to perform a high voltage calibration of the liquid scintillation counter)].

In certain embodiments, the programmable source controller module is operable to adjust a time interval between two or more emulated radioactive event test pulses by varying a time interval between two or more corresponding electronic pulse signals that are applied to the pulse LED [e.g., thereby providing for generation of a sequence of emulated radioactive event test pulses at a fixed rate (e.g., to test a count rate linearity of the liquid scintillation counter); e.g., thereby providing for generation of a pseudorandom sequence of emulated radioactive event test pulses (e.g., to test a dead-time correction of the liquid scintillation counter); e.g., thereby providing for generation of a primary emulated radioactive event test pulse followed by a series of emulated after-pulse test pulses (e.g., to test the TRLSC system of the liquid scintillation counter)].

In another aspect, the invention is directed to an electronic test source for calibrating and/or testing a liquid scintillation counter, the electronic test source comprising: (a) a pulse light emitting diode (LED) operable to emit a plurality of emulated radioactive event test pulses, each a result of a corresponding electronic pulse signal(s) applied to the pulse LED; (b) circuitry comprising: a first selectable circuit comprising a first capacitor; a first electronic switching component (e.g., a transistor) associated with the first selectable circuit path; a second selectable circuit comprising a second capacitor; a second electronic switching component (e.g., a transistor) associated with the second selectable circuit path; and a pulse LED connection circuit path connecting the pulse LED to the first and second selectable circuit paths; wherein: the first electronic switching component is operable to switch between a first state (e.g., an off state) and a second state (e.g., an on state) such that switching of the first electronic switching component to the second state causes selection of the first selectable circuit path, selection of the first circuit path causes discharge of the first capacitor thereby producing an electronic pulse signal of a first kind having a first electronic pulse shape based at least in part on a capacitance of the first capacitor (e.g., the first electronic pulse shape having a decaying exponential form; e.g., wherein a first pulse tail length of the electronic pulse signal of the first kind is based at least in part on the capacitance of the first capacitor), the second electronic switching component is operable to switch between a first state (e.g., an off state) and a second state (e.g., an on state) such that switching of the second electronic switching component to the second state causes selection of the second selectable circuit path, selection of the second circuit path causes discharge of the second capacitor thereby producing an electronic pulse signal of a second kind having a second electronic pulse shape based at least in part on a capacitance of the second capacitor (e.g., the second electronic pulse shape having a decaying exponential form; e.g., wherein a second pulse tail length of the electronic pulse signal of the second kind is based at least in part on the capacitance of the second capacitor), the pulse LED connection circuit path that connects the pulse LED to the first and second selectable circuit paths allows electronic pulse signals of the first and/or second kind, when produced by the first and second selectable circuit paths, to be applied to the pulse LED, the electronic pulse signal of the first kind, when applied to the pulse LED, results in emission of an alpha test pulse having a light pulse shape (e.g., intensity as a function of time) that emulates a light pulse shape produced by a scintillator as a result of radioactive decay of an alpha emitter [e.g., the alpha test pulse having a light pulse shape that emulates that of a light pulse produced by emission from a liquid scintillator (e.g., 2,5-diphenyloxazole (PPO)) as result of radioactive decay of an alpha emitter {e.g., the alpha test pulse having a pulse peak occurring approximately 5 to 20 ns (e.g., approximately 15 ns) after a start of the pulse and a pulse tail length greater than or approximately equal to 60 ns (e.g., approximately 60 to 100 ns; e.g., approximately 80 ns)}], and the electronic pulse signal of the second kind, when applied to the pulse LED, results in emission of a beta test pulse having a light pulse shape (e.g., intensity as a function of time) that emulates a light pulse shape produced by a scintillator as a result of radioactive decay of a beta emitter [e.g., the beta test pulse having a light pulse shape that emulates that of a light pulse produced by emission (e.g., luminescence) from a liquid scintillator (e.g., 2,5-diphenyloxazole (PPO)) as result of radioactive decay of a beta emitter {e.g., the beta test pulse having a pulse peak occurring approximately 5 to 20 ns (e.g., approximately 15 ns) after a start of the pulse and a pulse tail length of approximately 20 to 60 ns (e.g., approximately 40 ns)}]; and (c) a programmable source controller module (e.g., comprising a microcontroller) operable to apply a first control signal to the first electronic switching component and a second control signal to the second electronic switching component, thereby providing for selection of the electronic pulse shape of each of the plurality of electronic pulse signal(s), thereby providing for programmable emission of the plurality of emulated radioactive event test pulses from the pulse LED of the electronic test source for calibration and/or testing of the liquid scintillation counter based on detection of the emulated radioactive event test pulses by the liquid scintillation counter.

In certain embodiments, the electronic test source comprises: (d) a lumi light emitting diode (LED) operable to emit light emulating background light (e.g., luminescence) as a result of a corresponding electronic lumi signal applied to the lumi LED; and (e) circuitry for producing the electronic lumi signal and applying the electronic lumi signal to the lumi LED, wherein an amplitude and/or duty cycle of the electronic lumi signal is adjustable such that the electronic lumi signal, when applied to the lumi LED, results in emission of the emulated background light comprising a sufficiently small number of photons so as to emulate single photon events corresponding to background luminescence.

In certain embodiments, the programmable source controller module is operable to adjust the electronic lumi signal, thereby providing for programmable emission of the emulated background light and calibration and/or testing of the liquid scintillation counter based on (i) detection of the emulated radioactive event test pulses and (ii) detection of the emulated background light by the liquid scintillation counter.

In certain embodiments, the electronic test source is sufficiently small to fit inside a scintillation vial (e.g., a 100 mL vial, e.g., a 50 mL vial, e.g., a 30 mL vial, e.g., a 20 mL vial, e.g., a 7 mL vial).

In certain embodiments, the programmable source controller module is operable to adjust intensities of the emulated radioactive event test pulses by adjusting an amplitude (e.g., a peak voltage; e.g., a peak current amplitude) of corresponding electronic pulse signals that are applied to the pulse LED [e.g., thereby providing for generation of emulated radioactive event test pulses at different intensities, thereby emulating light pulses produced by a scintillator as a result of radioactive decay events having different energies (e.g., to validate an energy path dynamic range of the liquid scintillation counter); e.g., thereby providing for generation of an emulated carbon-14 spectrum (e.g., to perform a high voltage calibration of the liquid scintillation counter)].

In certain embodiments, the programmable source controller module is operable to adjust a time interval between two or more emulated radioactive event test pulses by varying a time interval between two or more corresponding electronic pulse signals that are applied to the pulse LED [e.g., thereby providing for generation of a sequence of emulated radioactive event test pulses at a fixed rate (e.g., to test a count rate linearity of the liquid scintillation counter); e.g., thereby providing for generation of a pseudorandom sequence of emulated radioactive event test pulses (e.g., to test a dead-time correction of the liquid scintillation counter); e.g., thereby providing for generation of a primary emulated radioactive event test pulse followed by a series of emulated after-pulse test pulses (e.g., to test the TRLSC system of the liquid scintillation counter)].

In another aspect, the invention is directed to an electronic test source for calibrating and/or testing a liquid scintillation counter, the electronic test source comprising: (a) a pulse light emitting diode (LED) operable to emit a plurality of emulated radioactive event test pulses, each a result of a corresponding electronic pulse signal(s) applied to the pulse LED; (b) a lumi LED operable to emit light emulating background light (e.g., luminescence) as result of a corresponding electronic lumi signal applied to the lumi LED; (c) circuitry for (i) producing a plurality of electronic pulse signal(s) (of the same kind or of different kinds) and applying the electronic pulse signal(s) to the pulse LED and (ii) producing the electronic lumi signal and applying the electronic lumi signal to the lumi LED; and (d) a programmable source controller module (e.g., comprising a microcontroller) operable to adjust (i) the electronic pulse signal(s) (e.g., via selection of an electronic pulse shape of each of the electronic pulse signal(s)) and/or (ii) the electronic lumi signal, thereby providing for programmable emission of the plurality of emulated radioactive event test pulses from the pulse LED of the electronic test source, and, optionally emulated background light, for calibration and/or testing of the liquid scintillation counter based on detection of the emulated radioactive event test pulses by the liquid scintillation counter.

In certain embodiments, each of the electronic pulse signal(s) (e.g., a time varying voltage; e.g., a time varying current) has a selectable electronic pulse shape (e.g., voltage and/or current as a function of time) such that each electronic pulse signal, when applied to the pulse LED, results in emission of an emulated radioactive event test pulse corresponding to a kind of light pulse selected from the group consisting of: (A) a beta test pulse having a light pulse shape (e.g., intensity as a function of time) that emulates a light pulse shape produced by a scintillator as a result of radioactive decay of a beta emitter [e.g., the beta test pulse having a light pulse shape that emulates that of a light pulse produced by emission (e.g., luminescence) from a liquid scintillator (e.g., 2,5-diphenyloxazole (PPO)) as result of radioactive decay of a beta emitter {e.g., the beta test pulse having a pulse peak occurring approximately 5 to 20 ns (e.g., approximately 15 ns) after a start of the pulse and a pulse tail length of approximately 20 to 60 ns (e.g., approximately 40 ns)}]; (B) an alpha test pulse having a light pulse shape (e.g., intensity as a function of time) that emulates a light pulse shape produced by a scintillator as a result of radioactive decay of an alpha emitter [e.g., the alpha test pulse having a light pulse shape that emulates that of a light pulse produced by emission from a liquid scintillator (e.g., 2,5-diphenyloxazole (PPO)) as result of radioactive decay of an alpha emitter {e.g., the alpha test pulse having a pulse peak occurring approximately 5 to 20 ns (e.g., approximately 15 ns) after a start of the pulse and a pulse tail length greater than or approximately equal to 60 ns (e.g., approximately 60 to 100 ns; e.g., approximately 80 ns)}]; and (C) a gamma test pulse, having a light pulse shape (e.g., intensity as a function of time) that emulates a light pulse shape produced by a scintillator as a result of radioactive decay of a gamma emitter [e.g., the gamma test pulse having a light pulse shape that emulates that of a light pulse produced by emission from a solid scintillator (e.g., bismuth germinate oxide (BGO)) as result of radioactive decay of a gamma emitter (e.g., the gamma test pulse having a pulse peak occurring approximately 90 ns or more after a start of the pulse and a pulse tail length of approximately 150 ns or more; e.g., the gamma test pulse having a pulse width of approximately 200 ns to 600 ns); e.g., the gamma test pulse having a light pulse shape that emulates that of a light pulse produced by emission from a liquid scintillator as a result of radioactive decay of a gamma emitter], [e.g., wherein the circuitry is capable of producing at least (A) and (B) (e.g., wherein the circuitry is capable of producing any of (A), (B), and (C)].

In certain embodiments, the circuitry comprises at least two selectable circuit paths (e.g., wherein each circuit path is associated with a transistor and a given circuit path is selectable by switching on the transistor with which it is associated): a first circuit path (e.g., associated with a first transistor) for producing an electronic pulse signal of a first kind having a first electronic pulse shape such that application of the electronic pulse signal to the pulse LED results in emission of an alpha test pulse; and a second circuit path (e.g., associated with a second transistor) for producing an electronic pulse signal of a second kind having a second electronic pulse shape such that application of the electronic pulse signal of the second kind to the pulse LED, results in emission of a beta test pulse.

In certain embodiments, the programmable source controller module is operable to, for each electronic pulse signal, select the electronic pulse shape of the electronic pulse signal by selecting one or both of the first and second circuit paths (e.g., by applying a voltage to a base of the first transistor for selection of the first circuit path and/or applying a voltage to a base of the second transistor for selection of the second circuit path) wherein: when the first circuit path is selected, the electronic pulse signal of the first kind is produced and applied to the pulse LED, thereby resulting in emission of an alpha test pulse, when the second circuit path is selected, the electronic pulse signal of the second kind is produced and applied to the pulse LED, thereby resulting in emission of a beta test pulse, and when both the first and second circuit paths are selected, an electronic pulse signal of a third kind [e.g., corresponding to overlapped electronic pulse signals of the first and second kind, e.g., with a short delay (e.g., of about 100 ns)] having a third electronic pulse shape is produced and applied to the pulse LED, thereby resulting in emission of a gamma test pulse.

In certain embodiments, the programmable controller module is operable to adjust an amplitude and/or duty cycle of the electronic lumi signal such that the electronic lumi signal, when applied to the lumi LED, results in emission of the emulated background light comprising a sufficiently small number of photons so as to emulate single photon events corresponding to background luminescence.

In certain embodiments, the electronic test source is sufficiently small to fit inside a scintillation vial (e.g., a 100 mL vial, e.g., a 50 mL vial, e.g., a 30 mL vial, e.g., a 20 mL vial, e.g., a 7 mL vial).

In certain embodiments, the programmable source controller module is operable to adjust one or more intensities of the emulated radioactive event test pulses by adjusting an amplitude (e.g., a peak voltage; e.g., a peak current amplitude) of corresponding electronic pulse signals that are applied to the pulse LED [e.g., thereby providing for generation of emulated radioactive event test pulses at different intensities, thereby emulating light pulses produced by a scintillator as a result of radioactive decay events having different energies (e.g., to validate an energy path dynamic range of the liquid scintillation counter); e.g., thereby providing for generation of an emulated carbon-14 spectrum (e.g., to perform a high voltage calibration of the liquid scintillation counter)].

In certain embodiments, the programmable source controller module is operable to adjust a time interval between two or more emulated radioactive event test pulses by varying a time interval between two or more corresponding electronic pulse signals that are applied to the pulse LED [e.g., thereby providing for generation of a sequence of emulated radioactive event test pulses at a fixed rate (e.g., to test a count rate linearity of the liquid scintillation counter); e.g., thereby providing for generation of a pseudorandom sequence of emulated radioactive event test pulses (e.g., to test a dead-time correction of the liquid scintillation counter); e.g., thereby providing for generation of a primary emulated radioactive event test pulse followed by a series of emulated after-pulse test pulses (e.g., to test the TRLSC system of the liquid scintillation counter)].

In another aspect, the invention is directed to a system for calibrating and/or testing a liquid scintillation counter, the system comprising: a detector (e.g., a liquid scintillation counter comprising one or more photomultiplier tubes) for producing a pulse signal corresponding to each of a plurality of detected radioactive events in a test sample (e.g., a liquid sample comprising a solvent for the test sample and a scintillator (e.g., a fluor), wherein the sample comprises a radionuclide that undergoes radioactive decay, whereby the decay energy causes excitation of the scintillator and release of light that is detected); an electronic test source comprising a pulse LED, circuitry, a programmable source controller module, and, optionally, a lumi LED (e.g., the electronic test source of as described above); a processor; and a memory having instructions stored thereon, wherein the instructions, when executed by the processor, cause the processor to perform the calibration and/or testing of the detector (e.g., the liquid scintillation counter).

In certain embodiments, the instructions the processor to perform the calibration and/or testing of the detector using the electronic test source and the method of any of the methods described herein.

In certain embodiments, the electronic test source is the electronic test source of any of the aspects or embodiments described herein.

Embodiments described with respect to one aspect of the invention may be, applied to another aspect of the invention (e.g., features of embodiments described with respect to one independent claim are contemplated to be applicable to other embodiments of other independent claims).

BRIEF DESCRIPTION OF THE FIGURES

The foregoing and other objects, aspects, features, and advantages of the present disclosure will become more apparent and better understood by referring to the following description taken in conjunction with the accompanying drawings, in which.

Figure 1:
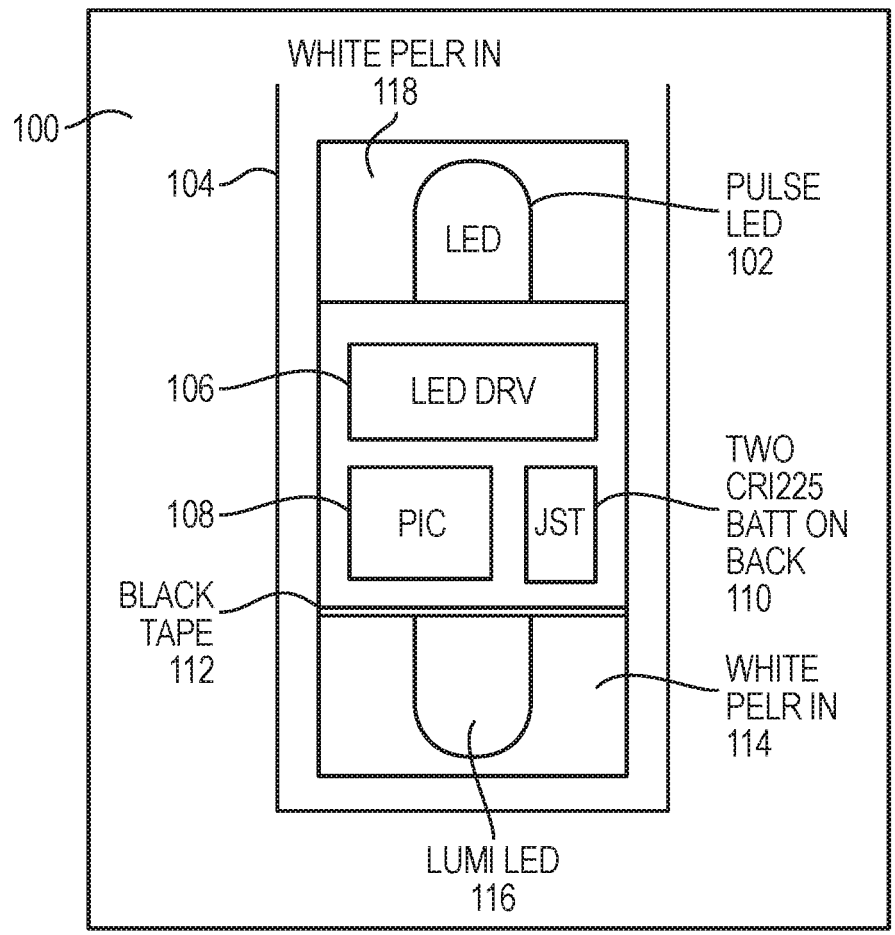
FIG. 1 is a diagram of an electronic test source for calibration and/or testing of a liquid scintillation counter, according to an illustrative embodiment.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

Definitions

In this application, unless otherwise clear from context, (i) the term "a" may be understood to mean "at least one"; (ii) the term "or" may be understood to mean "and/or"; (iii) the terms "comprising" and "including" may be understood to encompass itemized components or steps whether presented by themselves or together with one or more additional components or steps; and (iv) the terms "about" and "approximately" may be understood to permit standard variation as would be understood by those of ordinary skill in the art.

Approximately: As used herein, the term "approximately" or "about," as applied to one or more values of interest, refers to a value that is similar to a stated reference value. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context and except where such number would exceed 100% of a possible value.

Alpha pulse: As used herein, the term "alpha pulse" refers to a light pulse produced by a scintillator as a result of the radioactive decay of an alpha emitter. As used herein, an "alpha pulse" is sometimes referred to as a "'real' alpha pulse."

Alpha test pulse: As used herein, the term "alpha test pulse" refers to an emulated radioactive event test pulse with a light pulse shape that emulates a light pulse shape produced by a scintillator as a result of radioactive decay of an alpha emitter.

Beta pulse: As used herein, the term "beta pulse" refers to a light pulse produced by a scintillator as a result of the radioactive decay of a beta emitter. As used herein, an "beta pulse" is sometimes referred to as a "'real' beta pulse."

Beta test pulse: As used herein, the term "beta test pulse" refers to an emulated radioactive event test pulse with a light pulse shape that emulates a light pulse shape produced by a scintillator as a result of radioactive decay of a beta emitter.

Electronic lumi signal: As used herein, the term "electronic lumi signal" refers to an electronic signal (e.g., a voltage or current) applied to an LED such that the LED receiving the electronic pulse signal emits a burst of light. The electronic lumi signal is generated such that the resultant light emitted from the lumi LED comprises a sufficiently small number of photons so as to emulate single photon events corresponding to background luminescence. For example, an "electronic lumi signal" may be a constant voltage or current produced by the circuitry of an electronic test source and applied to a lumi LED of the electronic test source. For example, an "electronic lumi signal" may be a pulse-width modulated (PWM) voltage or current signal produced by the circuitry of an electronic test source and applied to a lumi LED of the electronic test source. For example, an amplitude and/or duty cycle of an "electronic lumi signal" may be adjustable to control the intensity of light emitted by a lumi LED of an electronic test source.

Electronic pulse signal: As used herein, the term "electronic pulse signal" refers to an electronic pulse signal (e.g., a time-varying voltage or current) applied to an LED such that the LED receiving the electronic pulse signal emits a pulse of light.

Apply: As used herein, the term "apply", when used in reference to a given electronic signal, such as an electronic lumi signal or an electronic pulse signal, to a particular electronic or electro-optical component, such as an LED, refers to applying a voltage across or applying a current to (e.g., passing a current through) the particular electronic or electro-optical component.

Gamma pulse: As used herein, the term "gamma pulse" refers to a light pulse produced by a scintillator as a result of the radioactive decay of a gamma emitter. As used herein, an "gamma pulse" is sometimes referred to as a "'real' gamma pulse."

Gamma test pulse: As used herein, the term "gamma test pulse" refers to an emulated radioactive event test pulse with a light pulse shape that emulates a light pulse shape produced by a scintillator as a result of radioactive decay of a gamma emitter.

Light pulse shape: As used herein, the term "light pulse shape" refers to a shape of a light pulse. The light pulse shape of a given light pulse characterizes the variation in light intensity or power versus time of the given light pulse. A light pulse shape may be characterized various metrics, such as a pulse height, pulse width, and pulse tail length, as described in the following.

Electronic pulse shape: As used herein, the term "electronic pulse shape" refers to a shape of an electronic pulse. An electronic pulse corresponds to a time varying electronic signal, such as a voltage or current, produced by an electronic circuit. The electronic pulse shape of a given electronic pulse characterizes the variation in the electronic signal, such as the voltage or current, of the electronic pulse.

An electronic pulse shape may be characterized by various metrics, such as a pulse height, a pulse width, and a pulse tail length, as described in the following.

Pulse amplitude, pulse height, pulse peak: As used herein, the terms "pulse amplitude," "pulse height," and "pulse peak" are used interchangeably to refer to a maximum amplitude of a pulse such as a light pulse or an electronic pulse. For example, when used in reference to a given light pulse, the terms pulse amplitude, pulse height, and pulse peak refer to a maximum intensity or power of the light pulse. When used in reference to a given electronic pulse, the terms pulse amplitude, pulse height, and pulse peak refer to a maximum voltage or current that the electronic signal reaches over the duration of the electronic pulse.

Pulse length, pulse width: As used herein, the terms "pulse width," and "pulse length" are used interchangeably to refer to a measure of a duration of a given light pulse or electronic pulse. For example, a pulse width or a pulse length of a given light pulse may be measured as the time between when an intensity or power of the light pulse (i) rises above and (ii) falls below a particular threshold intensity or power. In certain embodiments, the threshold intensity or power is a specific fraction of the pulse height of the given light pulse, such as a specific percentage (e.g., 5% of the pulse height) or a multiple of $1/e$ (e.g., $1/e$; e.g., $1/e^2$). Analogously, a pulse width or a pulse length of a given electronic pulse may be measured as the time between when an current or voltage of the electronic pulse (i) rises above and (ii) falls below a particular threshold current or voltage. In certain embodiments, the threshold current or voltage is a specific fraction of the pulse height of the given electronic pulse, such as a specific percentage (e.g., 5% of the pulse height) or a multiple of $1/e$ (e.g., $1/e$; e.g., $1/e^2$).

Pulse tail length: As used herein, the term "pulse tail length" refers to a measure of how long a light pulse or an electronic pulse lasts after it reaches its peak value. For example, pulse tail length of a given light pulse may be measured by integrating a measured light pulse intensity or power for a period of time (an integration time) following its pulse peak. The integration time is selected to be larger than the expected time for the measured light pulse intensity or power to drop to approximately 0 (e.g., several hundred nanoseconds). In this manner, the pulse tail length is measured as the value of the integrated intensity or power. In certain embodiments, a pulse tail length of a given light pulse is measured as a time from when the given light pulse reaches its pulse peak to when its intensity falls approximately equal to or below a specific threshold value. In certain embodiments, the threshold value is a specific fraction of the pulse height of the given light pulse, such as a specific percentage (e.g., 5% of the pulse height) or a multiple of $1/e$ (e.g., $1/e$; e.g., $1/e^2$). Analogously, in certain embodiments, a pulse tail length of a given electronic pulse may be measured by integrating the electronic signal or measured as a time from when the given electronic pulse reaches its pulse peak to when its voltage or current falls approximately equal to or below a specific threshold value. In certain embodiments, the threshold value is a specific fraction of the pulse height of the given light pulse, such as a specific percentage (e.g., 5% of the pulse height) or a multiple of $1/e$ (e.g., $1/e$; e.g., $1/e^2$).

DETAILED DESCRIPTION

It is contemplated that systems, architectures, devices, methods, and processes of the claimed invention encompass variations and adaptations developed using information from the embodiments described herein. Adaptation and/or modification of the systems, architectures, devices, methods, and processes described herein may be performed, as contemplated by this description.

Throughout the description, where articles, devices, systems, and architectures are described as having, including, or comprising specific components, or where processes and methods are described as having, including, or comprising specific steps, it is contemplated that, additionally, there are articles, devices, systems, and architectures of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

Headers are provided for the convenience of the reader— the presence and/or placement of a header is not intended to limit the scope of the subject matter described herein.

Liquid scintillation counter systems, such as the Quantulus™ GCT LSC and TriCarb® LSC product lines, manufactured by PerkinElmer headquartered in Waltham, Mass., are useful for highly precise quantification of radionuclides in test samples. Presented herein are systems and methods that address the calibration and/or testing of such systems using an electronic test source without requiring radioactive materials and/or volatile chemicals.

In certain embodiments, the system and methods simultaneously emulate a light pulse shape produced by a scintillator as a result of the radioactive decay of an alpha, beta, and/or gamma emitter in the sample, while, optionally, emulating background light (e.g., light related to luminescence, after-pulses, or other sources not associated with radionuclide(s) in a sample).

Electronic Test Source

FIG. 1 shows an example of an electronic test source 100 for calibrating and/or testing a liquid scintillation counter. Electronic test source 100 comprises a pulse LED 102 for generating emulated radioactive event test pulses. Programmable source controller module (e.g., microcontroller, e.g., reprogrammable PIC microprocessor) 108 of electronic test source 100 is operable to select the electronic pulse shape of an electronic pulse signal (e.g., voltage or current) applied to pulse LED 102, providing for the programmable emission of emulated radioactive event test pulses. In certain embodiments, the pulse LED may be green or blue LED. In certain embodiments, the pulse LED may be an LED of any color or size. The color or emission wavelength of the LED may be selected to match the wavelength at which the photomultiplier tubes (PMTs) of a liquid scintillation of counter are most sensitive, e.g., approximately 420 nm wavelength. The color or emission wavelength of the LED may be selected to match that of a particular scintillator (e.g., a primary scintillator and/or secondary scintillator).

In certain embodiments, the electronic test source 100 is sufficiently small to fit inside a standard 20 mL glass scintillation vial 104 such that the electronic test source may be placed inside common liquid scintillation counters (e.g., the Quantulus™ GCT LSC and TriCarb® LSC product lines, manufactured by PerkinElmer headquartered in Waltham, Mass.) without modification. In some embodiments, the electronic test source may, for example, be powered by an LED driver 106 and batteries, allowing the system to remain powered and operable within a liquid scintillation counter without external wiring. In certain embodiments, electronic connections may be made in the relatively small space inside a standard scintillation vial used in liquid scintillation counters (e.g., a 100 mL vial, e.g., a 50 mL vial, e.g., a 30 mL vial, e.g., a 20 mL vial, e.g., a 7 mL vial).

Generation of Emulated Radioactive Event Test Pulses

In some embodiments, the electronic test source 100 provides for generation of a plurality of emulated radioactive event test pulses emitted from the pulse LED 102. The emulated radioactive event test pulses are generated with specific light pulse shapes so as to emulate light pulses produced by a scintillator as a result of radioactive decay of a particular kind of emitter. In particular, beta, alpha, and gamma test pulses are generated to have light pulse shapes that emulate those of light pulses produced by a scintillator as a result of radioactive decay of beta, alpha, and gamma emitters, respectively. In certain embodiments, pulse LED 102 may be surrounded by optically diffusive material 118 (e.g., Delrin®).

In certain embodiments, a light pulse shape of a light pulse emitted by a scintillator as a result of radioactive decay of a particular kind of emitter depends on, not only the particular kind of emitter (e.g., beta, alpha, gamma), but also on the specific scintillator used.

Figure 2A:
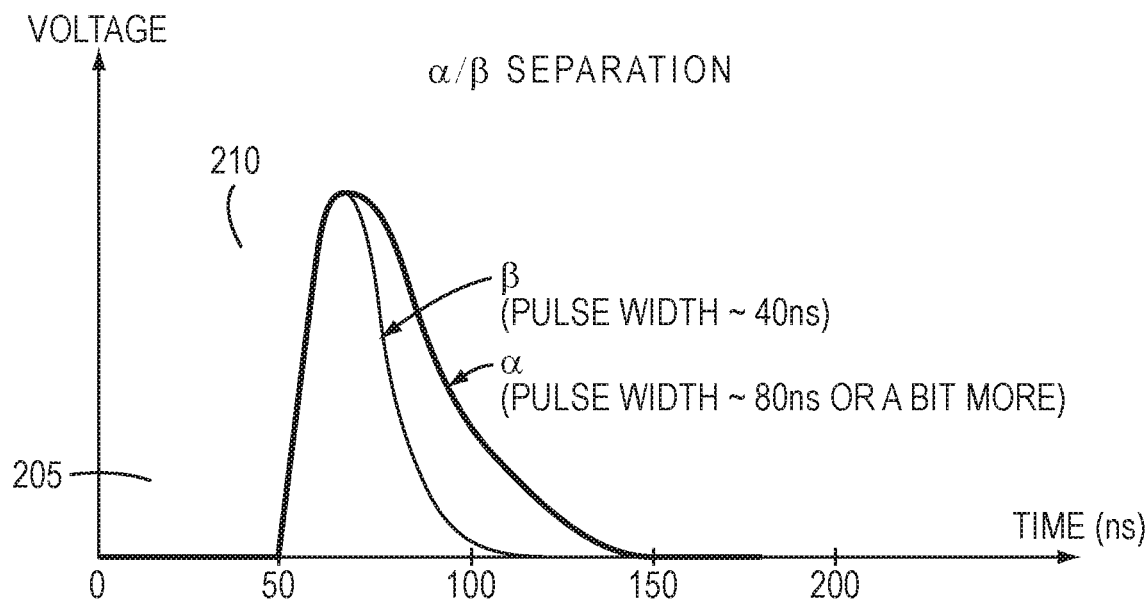
FIG. 2A is a graph showing exemplary voltage versus time traces of detected radioactive event test pulses resulting from beta and alpha events, according to an illustrative embodiment.

For example, alpha and beta events are often detected using a fast liquid scintillator, such as 2,5-diphenyloxazole (PPO). Illustrative examples of light pulse shapes of detected alpha and beta pulses emitted from a PPO scintillator are shown in FIG. 2A. A light pulse, when detected (e.g., by PMTs of a liquid scintillation counter) produces an electronic signal, such as a voltage, that is approximately proportional to the intensity of the detected light pulse. Accordingly, the graphs in FIG. 2A represent the detected light pulses as voltage versus time traces. As shown in FIG. 2A, a beta pulse 205 produced by a PPO scintillator reaches its pulse peak approximately 15 ns (e.g., between approximately 5 and 20 ns) after the start of the pulse and subsequently decays in intensity, with a pulse tail length of approximately 40 ns (e.g., between approximately 20 to 60 ns). An alpha pulse 210 produced by a PPO scintillator also reaches its pulse peak approximately 15 ns (e.g., between approximately 5 and 20 ns) after the start of the pulse and subsequently decays in intensity, but with a longer pulse tail length—approximately 80 ns (e.g., between approximately 60 to 100 ns) than the pulse tail length of the beta pulse.

Accordingly, beta test and alpha test pulses generated by the electronic test source described herein may have light pulse shapes that emulate those of real beta and alpha pulses produced by fast liquid scintillators, such as PPO. For example, the electronic test source may use specifically designed circuitry, as described in the following, to provide for generation of beta test pulses that reach their pulse peaks approximately 15 ns (e.g., between approximately 5 and 20 ns) after the start of the pulses and subsequently decay in intensity, with a pulse tail lengths of approximately 40 ns (e.g., between approximately 20 to 60 ns), thereby emulating a real beta pulse produced by a PPO scintillator. Similarly, the electronic test source may also include circuitry that provides for generation of alpha test pulses that reach their pulse peaks approximately 15 ns (e.g., between approximately 5 and 20 ns) after the start of the pulses and subsequently decay in intensity, with a pulse tail lengths of approximately 80 ns (e.g., between approximately 60 to 100 ns), thereby emulating a real alpha pulse produced by a PPO scintillator.

Figure 2B:
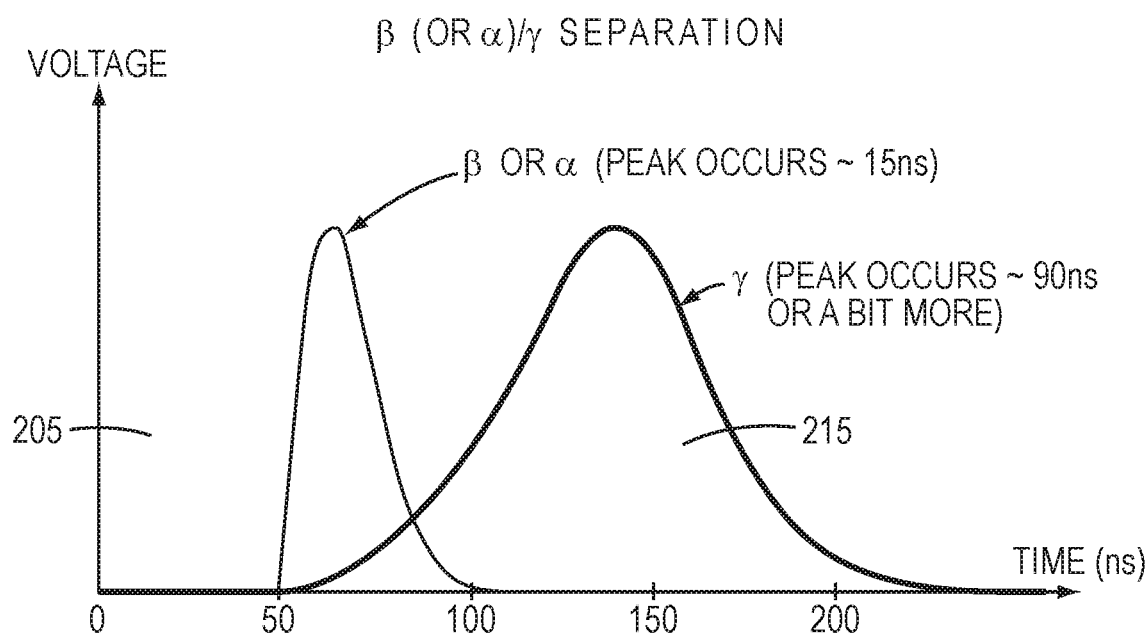
FIG. 2B is a graph showing exemplary voltage versus time traces of detected radioactive event test pulses resulting from beta and gamma events, according to an illustrative embodiment.

In certain embodiments, gamma pulses resulting from gamma emitters may be produced by a solid scintillator, such as bismuth germinate oxide (BGO), or may be produced by a fast liquid scintillator, such as PPO. FIG. 2B shows an example of a gamma pulse 215 produced by a BGO scintillator in comparison with a beta pulse 205 produced by a PPO scintillator. As with FIG. 2A, the detected light pulses are represented as voltage versus time traces. The gamma test pulse 215 produced by the BGO scintillator reaches its pulse peak approximately 90 ns or more after the start of the pulse and has a pulse tail length of approximately 150 ns or more. Gamma pulses may also be produced by a gamma ray striking a liquid scintillator, such as PPO, that is intended for detection of alpha and beta events in a sample. Such gamma pulses often result from external gamma rays, such as cosmic rays, and have light pulse shapes that are similar to those of beta pulses.

In certain embodiments, a gamma test pulse generated by the electronic test source has a light pulse shape that emulates that of a light pulse produced by emission from a solid scintillator, such as BGO. A gamma test pulse emulating emission from BGO as a result of a gamma event reaches its pulse peak approximately 90 ns or more after the start of the pulse and has a pulse tail length of approximately 150 ns or more. As described below, circuitry of the electronic test source is used to generate gamma test pulses that emulate emission from a solid scintillator such as BGO. The electronic test source may also generate a gamma test pulse that emulates emission from a fast liquid scintillator (e.g., PPO) as a result of a gamma event. The gamma test pulse that emulates emission from a fast liquid scintillator (e.g., PPO) as a result of a gamma event may be the same or approximately the same as the beta test pulse, and may be generated in the same manner as the beta test pulse.

Examples of liquid scintillators also include, without limitation, 2-phenyl-5-biphenyl-1,3,4,-oxadiazole (PBD), 2-(4-tert-butylphenyl)-5(4-biphenylyl)-1,3,4-oxadiazole (butyl-PBD), and 2,5,-bis-2-(tert-butylbenzoxazolyl)-thiophene (BBOT) and naphthalene. Scintillators such as PBD, butyl-PBD, and BBOT produce radioactive event pulses (e.g., alpha pulses, beta pulses, gamma pulses) with similar light pulse shapes (e.g., reaching pulse peaks at similar times after the start of the light pulse and/or having similar pulse tail lengths) to those produced by PPO. Scintillators such as PPO, PBD, butyl-PBD, BBOT and naphthalene are referred to as primary scintillators. Secondary scintillators, such as 1,4-(di-2-(5-phenyloxazolyl)-benzyl (POPOP) and p-bis-(ortho-methylstyryl)-benzene (Bis-MSB) may also be used to shift a wavelength of a light pulse generated from a primary scintillator to a wavelength where the PMTs of a liquid scintillation counter are most sensitive.

Accordingly, alpha, beta, and gamma pulses produced by PBD, butyl-PBD, and BBOT may be adequately emulated by the same beta test pulses, alpha test pulses, and gamma test pulses used to emulate emission from PPO as described above, or the electronic test source may generate slightly different types of pulses, depending on a particular scintillator (e.g., primary or secondary scintillator) that it is designed to emulate. The electronic test source may also generate multiple kinds of beta, alpha, and/or gamma pulses (e.g., via multiple circuits) to emulate emission from multiple specific types of scintillators.

In certain embodiments, in order to produce a particular kind of emulated radioactive event test pulse, the electronic test source applies a specific kind of electronic pulse signal to the pulse LED. A given electronic pulse signal, when applied to the pulse LED, causes emission of a corresponding emulated radioactive event test pulse from the pulse LED. The light pulse shape of the emulated radioactive event test is based on the electronic pulse shape of the given electronic pulse signal applied to the pulse LED. For example, a first kind of electronic pulse signal, when applied to the pulse LED, results in emission of an alpha test pulse (e.g., an alpha test pulse that emulates a light pulse produced by a fast liquid scintillator, such as PPO), while a second kind of electronic pulse signal, when applied to the pulse LED results in emission of a beta test pulse (e.g., a beta test pulse that emulates a light pulse produced by a fast liquid scintillator, such as PPO). A third kind of electronic pulse signal may be applied to the pulse LED to produce a gamma test pulse. In certain embodiments, the gamma test pulse generated via the third kind of electronic pulse signal emulates a gamma pulse resulting from a solid scintillator, such as BGO. A gamma pulse resulting from emission from a fast liquid scintillator may be produced in the same fashion as the beta test pulse, for example by applying the first kind of electronic pulse signal to the pulse LED.

In certain embodiments, the electronic test source uses circuitry comprising multiple selectable circuit paths to produce the different kinds of electronic pulse signals, and thereby provide for generation of alpha, beta, and gamma test pulses. An embodiment of circuitry used to generate the three kinds of electronic pulse signals and apply them to the pulse LED is shown in FIG. 13B, FIG. 13C, and FIG. 13D. The circuitry comprises two selectable circuit paths 1340a and 1340b. The first kind of electronic pulse signal is produced and applied to the pulse LED via selection of a first selectable circuit path 1340a and the second kind of electronic pulse signal is produced and applied to the pulse LED via selection of the second circuit path 1340b. The third kind of electronic pulse signal is produced by overlapping the first and second kinds of electronic pulse signals, with a short (e.g., approximately 100 ns) in between them. This is achieved via selection of the first circuit path, followed by selection of the second circuit path. The particular circuitry will be described in greater detail in the following, and, as will also be described, other embodiments may be used to produce other light pulse shapes (e.g., such as the embodiment shown in FIG. 14A).

Figure 3:
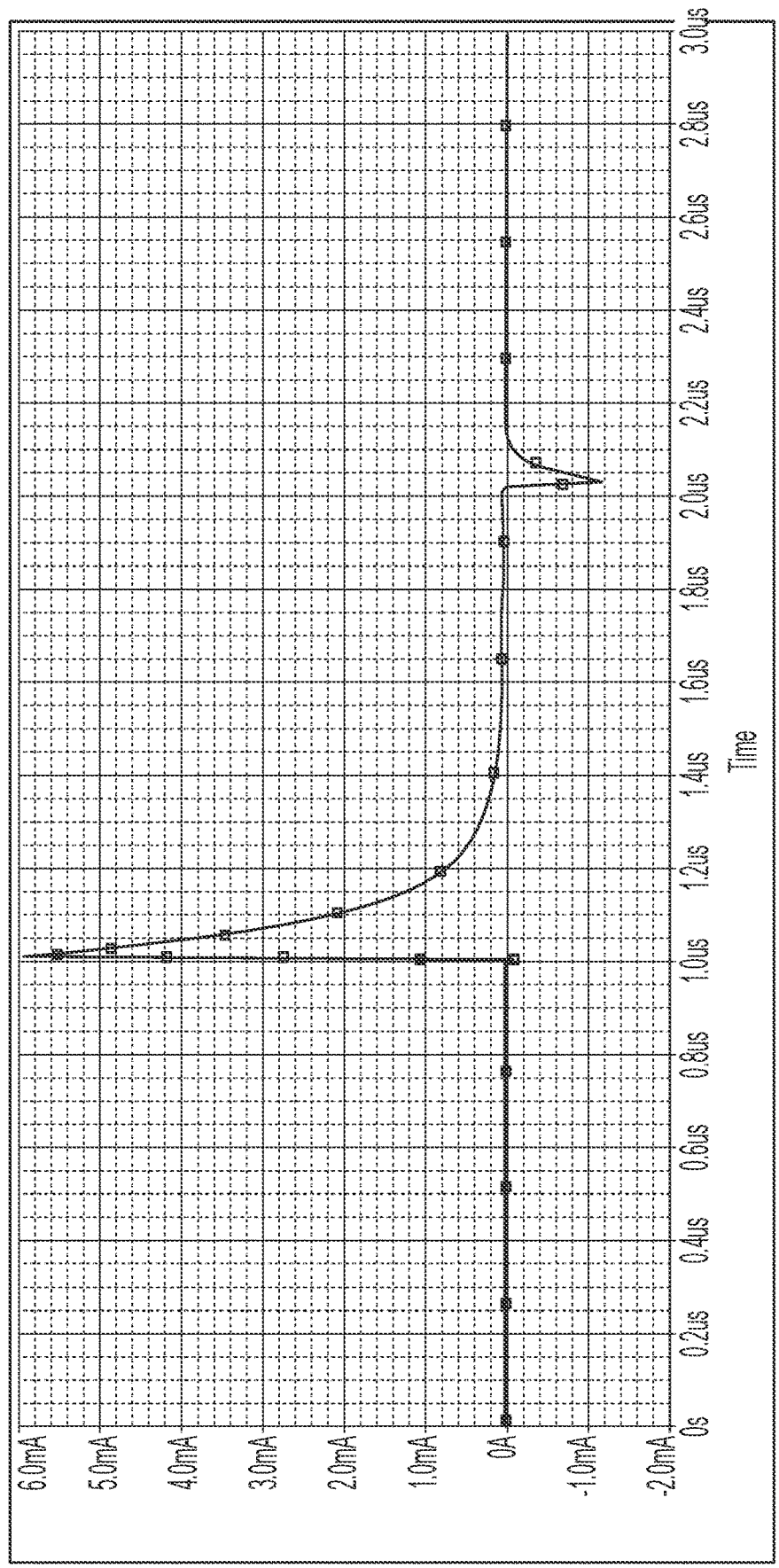
FIG. 3 is a graph showing a simulated current versus time trace of a first kind of electronic pulse signal used for generating an alpha test pulse, according to an illustrative embodiment.
Figure 4:
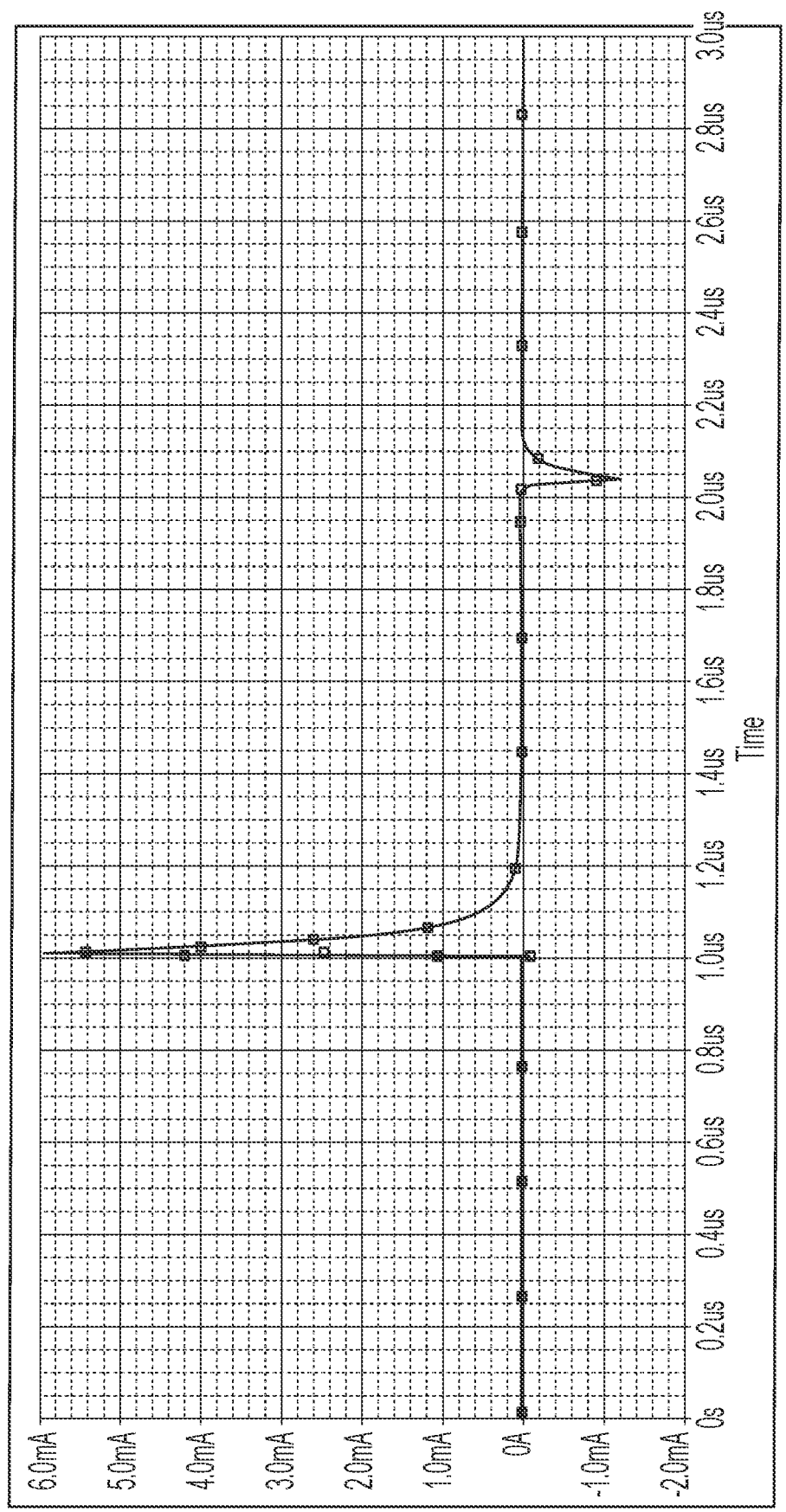
FIG. 4 is a graph showing a simulated current versus time trace of a second kind of electronic pulse signal used for generating a beta test pulse, according to an illustrative embodiment.
Figure 5:
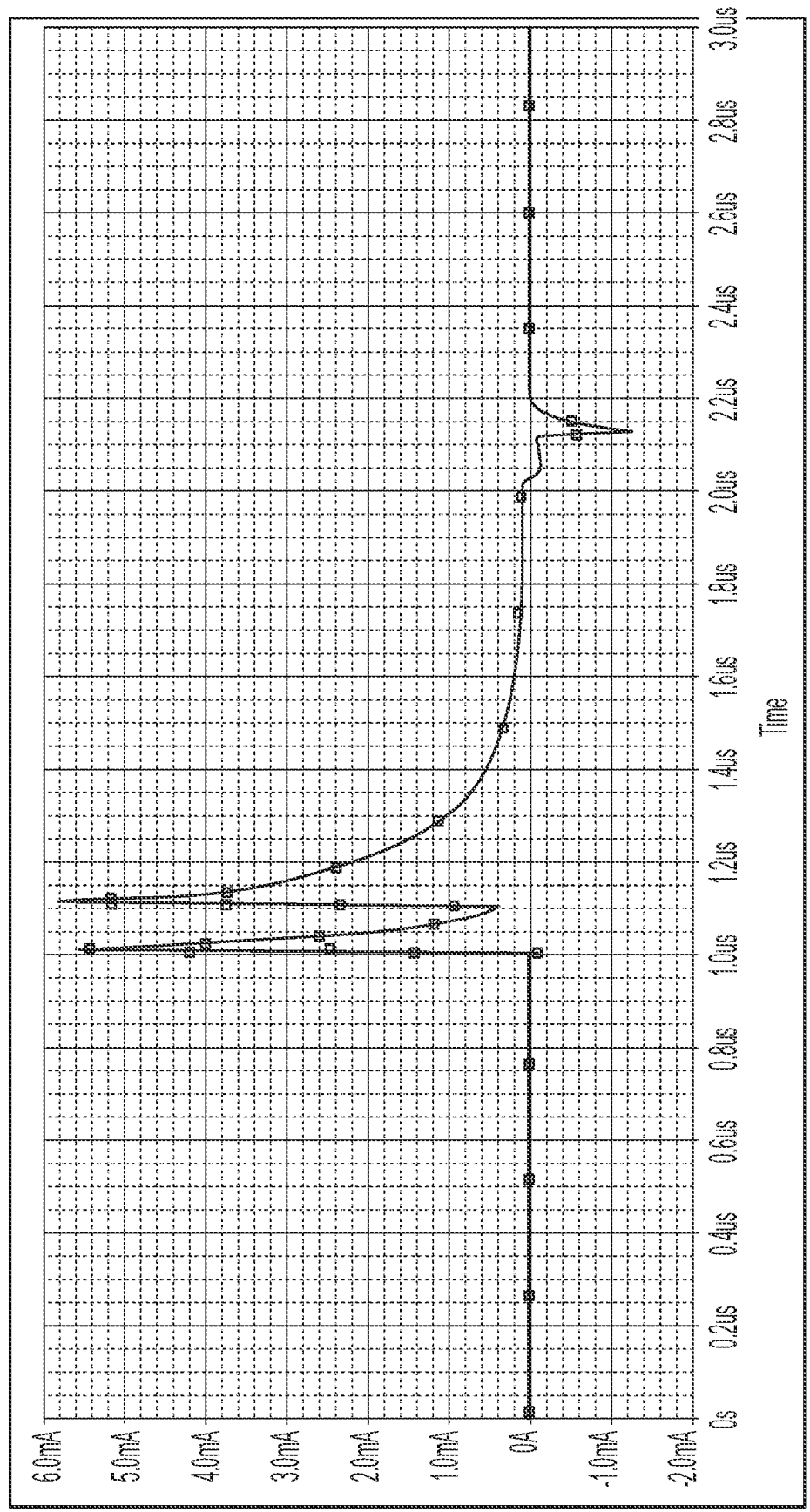
FIG. 5 is a graph showing a simulated current versus time trace of a third kind of electronic pulse signal used for generating a gamma test pulse, according to an illustrative embodiment

FIG. 3, FIG. 4, and FIG. 5 show simulated examples of the first, second, and third kinds of electronic pulse signals generated via the circuitry shown in FIG. 13B, FIG. 13C, and FIG. 13D as described above. An example of the first kind of electronic pulse signal that results in emission of an alpha test pulse is shown in FIG. 3. FIG. 4 shows an example of the second kind of electronic pulse signal, which, when applied to the pulse LED, results in emission of a beta test pulse. An example of a third kind of electronic pulse signal is shown in FIG. 5. The third kind of electronic pulse signal shown in FIG. 5, when applied to the pulse LED, causes emission of a gamma test pulse that emulates a gamma pulse resulting from a solid scintillator, such as BGO.

Accordingly, by virtue of its capability to produce emulated radioactive event test pulses in this manner, the electronic test source may be used to calibrate and/or test a liquid scintillation counter to improve performance without requiring radioactive materials and/or volatile chemicals. In particular, an electronic test source may be used, for example, to calibrate and/or test discriminators of a liquid scintillation counter. For example, appropriate combinations of beta test pulses, alpha test pulses and gamma test pulses may be used to calibrate beta/gamma discriminator circuits (e.g., that are used to discriminate between light pulses produced by beta and gamma events) and alpha/gamma discriminator circuits (e.g., that are used to discriminate between light pulses produced by alpha and gamma events). Calibration and/or testing of an alpha/beta discriminator circuit of a liquid scintillation counter may be based on, for example differences in the pulse shapes and/or tail lengths of an alpha test pulse and a beta test pulse (e.g., as shown in the illustrative example of FIG. 2A). Other discriminator circuits, such as beta/gamma, and alpha/gamma discriminator circuits may be calibrated similarly. Combinations of alpha test pulses, beta test pulses, and gamma test pulses may also be used to calibrate discriminators that are implemented as software routines (e.g., to adjust one or more parameters in a software routine) that distinguish between light pulses produced by beta, alpha, and/or gamma events. Notably, existing methods of calibrating and/or testing an alpha/beta discriminators (e.g., alpha/beta discriminator circuits; e.g., software routines that are used to distinguish between alpha and beta pulses) of a liquid scintillation counter require radioactive alpha and beta emitters, which, as described herein, may be difficult to obtain and/or hazardous to handle.

Figure 17A:
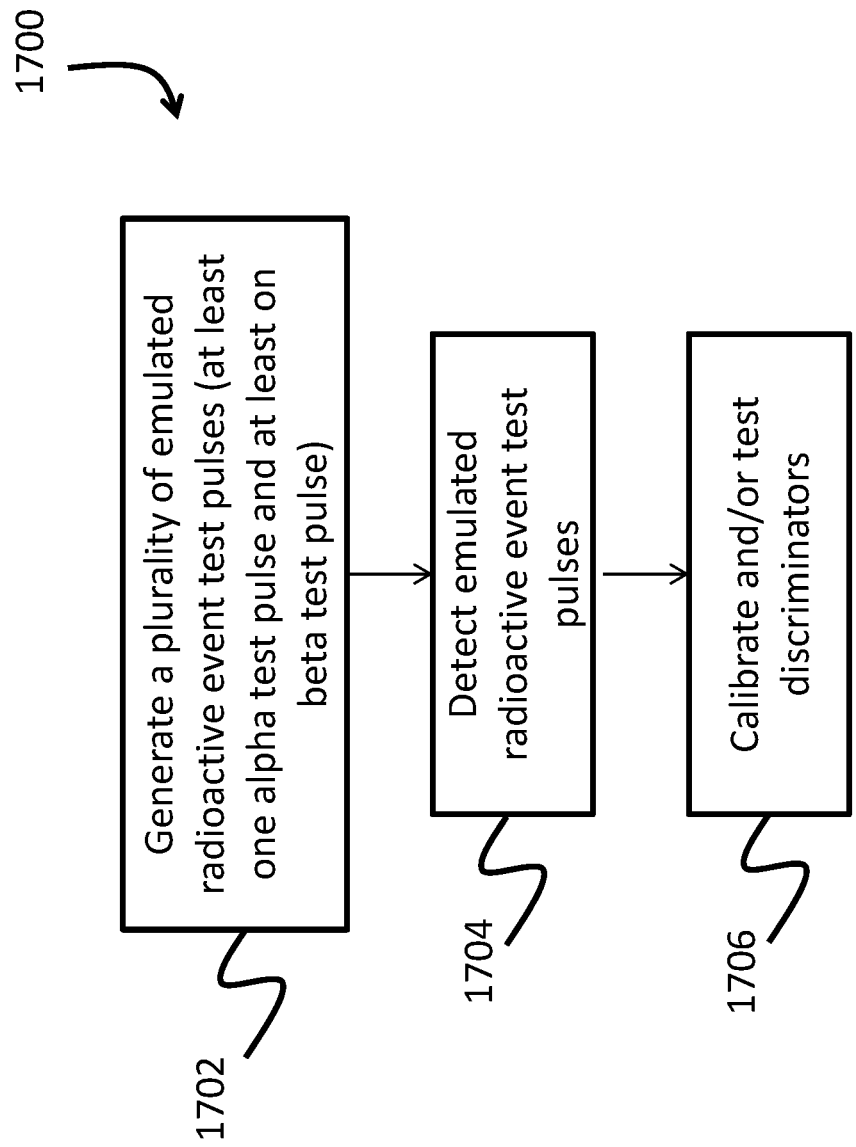
FIG. 17A is a block flow diagram of a process for calibrating and/or testing a liquid scintillation counter using an electronic test source, according to an illustrative embodiment.

FIG. 17A shows an example process 1700 wherein alpha test pulses and beta test pulses are generated by an electronic test source for calibration and/or testing of a liquid scintillation counter. Alpha and beta test pulses are generated 1702 by the electronic test source and detected 1702 by the liquid scintillation counter. The detected alpha and beta test pulses can be used for calibration and/or testing of discriminators 1706. In certain embodiments, as discussed above, gamma test pulses are also generated and used for calibration and/or testing of discriminators.

Figure 17B:
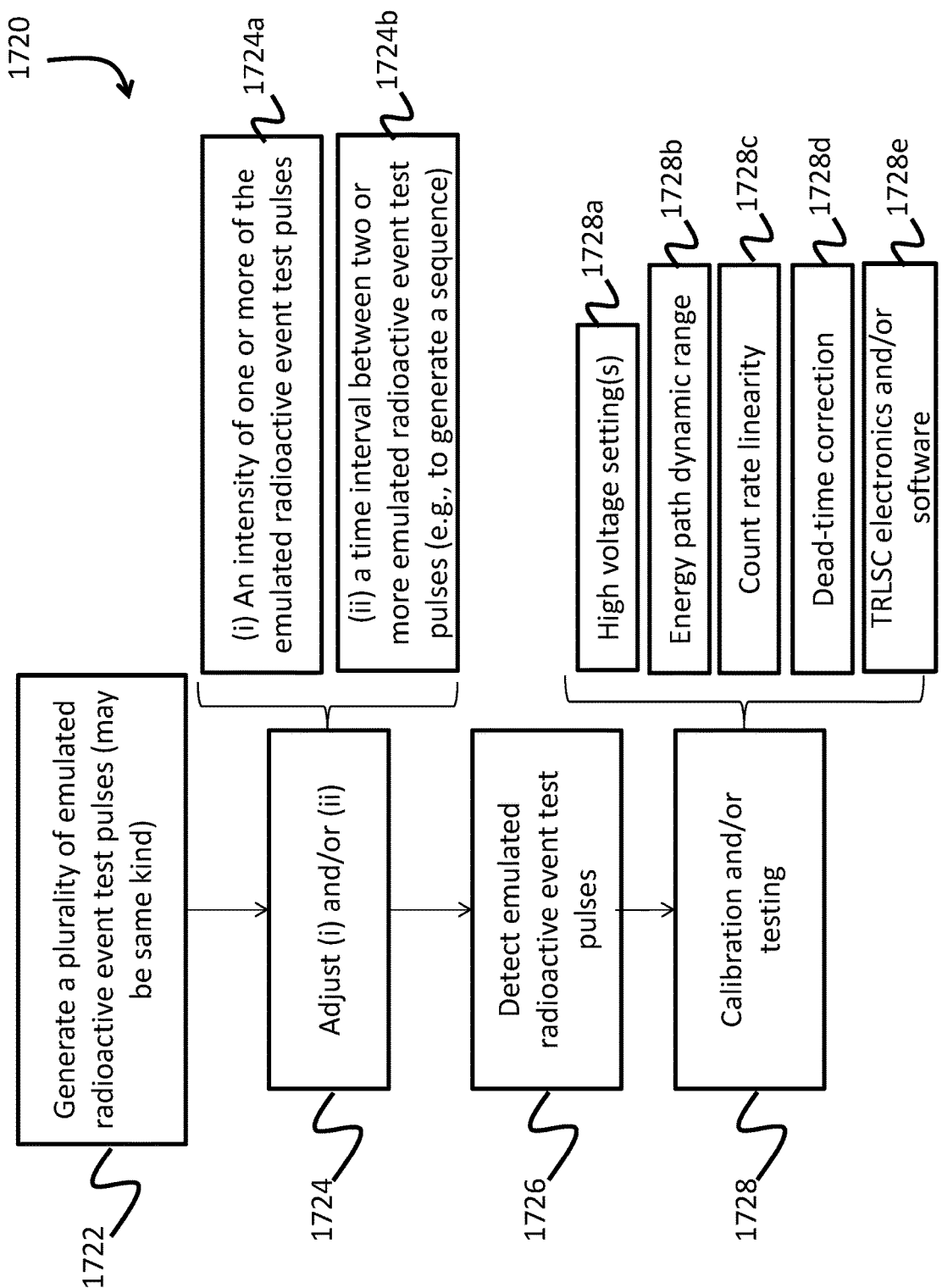
FIG. 17B is a block flow diagram of a process for calibrating and/or testing a liquid scintillation counter using an electronic test source by adjusting (i) an intensity of one or more emulated radioactive event test pulses and/or (ii) a time interval between two or more emulated radioactive event test pulses, according to an illustrative embodiment.

Programmable Emission of Emulated Radioactive Event Test Pulses—Amplitude, Rate, and After-Pulses In certain embodiments, the electronic test source provides for programmable emission of emulated radioactive event test pulses of different intensities and/or at various time intervals. Programmable emission of emulated radioactive event test pulses in this manner can be used for calibration and/or testing of a variety of features of a liquid scintillation counter. FIG. 17B shows an example process 1720 for using an electronic test source to adjust intensities and/or time intervals between emulated radioactive event test pulses for calibration and/or testing of a liquid scintillation counter. The electronic test source is used to generate a plurality of emulated radioactive event test pulses 1722. The intensities and/or time intervals between the emulated radioactive event test pulses may be adjusted 1724a and 1724b (collectively 1724) by the electronic test source in order to, for example, generate a emulated radioactive event test pulses at different intensities, or generate sequences of emulated radioactive event test pulses. The emulated radioactive event test pulses are detected 1726 by the liquid scintillation counter, and calibration and/or testing is performed 1728 based on the detected emulated radioactive event test pulses. In particular, emulated radioactive event test pulses of different intensities and/or particular sequences of emulated radioactive event test pulses may be used for calibration and/or testing of high voltage settings 1728a, an energy path dynamic range 1728b, count rate linearity 1728c, a dead-time correction utility 1728d of the liquid scintillation counter, and the instrument's TRLSC system 1728e.

In certain embodiments, the intensity of emulated radioactive event test pulses may be adjusted 1724a, for example, by the programmable controller module (e.g., microcontroller) (108) of an electronic test source (100), such as that shown in the illustrative embodiment of FIG. 1. For example, an electronic test source may generate (e.g., emit) emulated radioactive event test pulses at different intensities, thereby emulating light pulses produced by a scintillator as a result of radioactive decay events with different energies (e.g., from 0 keV to 2000 keV). Emulated radioactive event test pulses corresponding to radioactive decay events with different energies may be used, for example, to calibrate and/or test (e.g., validate) an energy path dynamic range of a liquid scintillation counter (1728b). For example, the detector of a liquid scintillation counter may be calibrated and/or tested by comparing the amplitude of a signal detected by the detector of a liquid scintillation counter to the intensity of the emulated radioactive event test pulses.

Figure 8A:
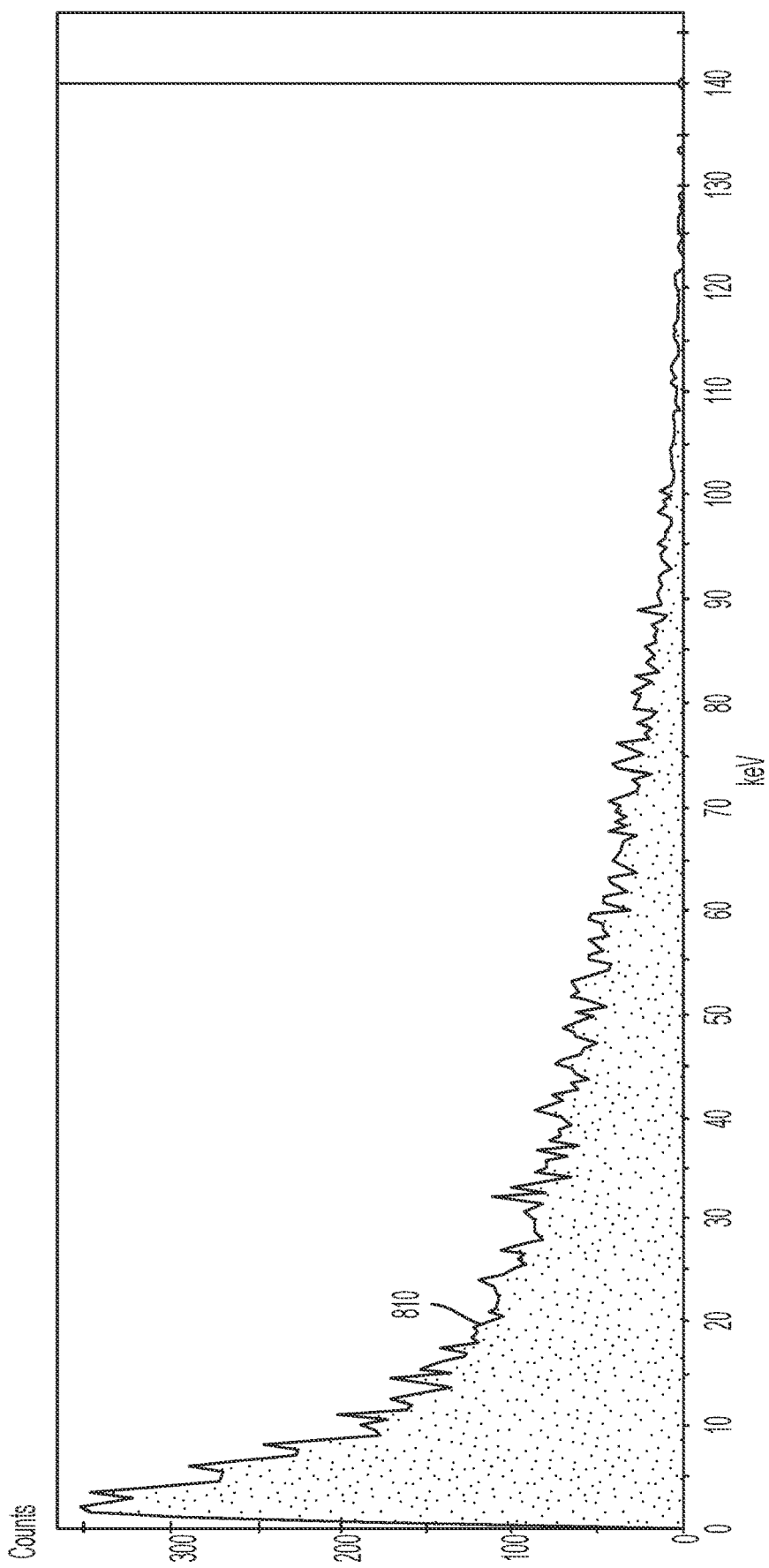
FIG. 8A is a graph showing an emulated $^{14}C$ spectrum generated by an electronic test source and measured with a liquid scintillation counter, according to an illustrative embodiment.

In certain embodiments, emulated radioactive event test pulses corresponding to radioactive decay events having different energies may be used, for example, to generate an emulated spectrum corresponding to one or more known radioactive emitters (e.g., $^{14}C$, as shown in the illustrative example of FIG. 8A). Such emulated spectra (e.g., emulated spectra of any alpha, beta, and/or gamma emitters, e.g., an emulated spectrum of $^{14}C$) may be used to perform a high voltage calibration and/or test of a liquid scintillation counter (1728a). In certain embodiments, emulated radioactive event test pulses corresponding to radioactive decay events having different energies may be used, for example, to calibrate and/or test the energy path dynamic rage of a liquid scintillation counter.

In certain embodiments, the time interval between a plurality of emulated radioactive event test pulses may be adjusted 1724b, for example, by the programmable controller module (e.g., a microcontroller) (108) of an electronic test source (100), such as that shown in the illustrative embodiment of FIG. 1. For example, emulated radioactive event test pulses generated at a fixed (e.g., constant) rate may be used to calibrate and/or test the count rate linearity of a liquid scintillation counter (1728c) (e.g., as described in Example 5 herein). For example, an electronic test source may be operable to generate a pseudorandom sequence of emulated radioactive event test pulses. A pseudorandom sequence of emulated radioactive event test pulses may, for example, be used to calibrate and/or test a dead-time correction of a liquid scintillation counter (1728d) [e.g., by comparing the number of pulses detected by a liquid scintillation counter (e.g., in a given time interval) to the number of pulses generated by an electronic test source (e.g., in a given time interval)]. Also, for example, by generating a fast sequence of test pulses from the pulse LED shortly after a primary emulated radioactive event test pulse from the pulse LED, the electronic test source can emulate the initial pulses resulting from a sample radioactive event and/or an external gamma event along with their associated after-pulses. These emulated primary and after pulses can be detected and used to calibrate and/or test TRLSC electronics and/or software (1728e).

In certain embodiments, an electronic test source may be used to emit emulated background light from a pulse LED which corresponds to after-pulses occurring immediately after (e.g., substantially soon after, e.g., within 75 ns to 5 µs of) the emission of an emulated radioactive event test pulse from the pulse LED. In certain embodiments, generating background light corresponding to after pulses after an initial, primary emulated radioactive event test pulse allows for the calibration and/or testing of a circuitry and/or software for time-resolved liquid scintillation counting (TRLSC). In certain embodiments, TRLSC count afterpulses that follow an initial, primary pulse to determine whether the primary pulse is the result of a radioactive event originating from the sample, such as a beta event, or the result of an external gamma event, such as a cosmic ray. By generating a fast sequence of test pulses from the pulse LED shortly after a primary emulated radioactive event test pulse from the pulse LED, the electronic test source can emulate the initial pulses resulting from a sample radioactive event and/or an external gamma event along with their associated after-pulses. These emulated primary and after pulses can be detected and used to calibrate and/or test TRLSC electronics and/or software (1728*e*). Approaches for TRLSC are described, for example, in U.S. Pat. No. 4,651,006, issued Mar. 17, 1987, the entire content of which is hereby incorporated by reference.

Example 1. Emulated Spectrum of an Alpha Emitter

Figure 6:
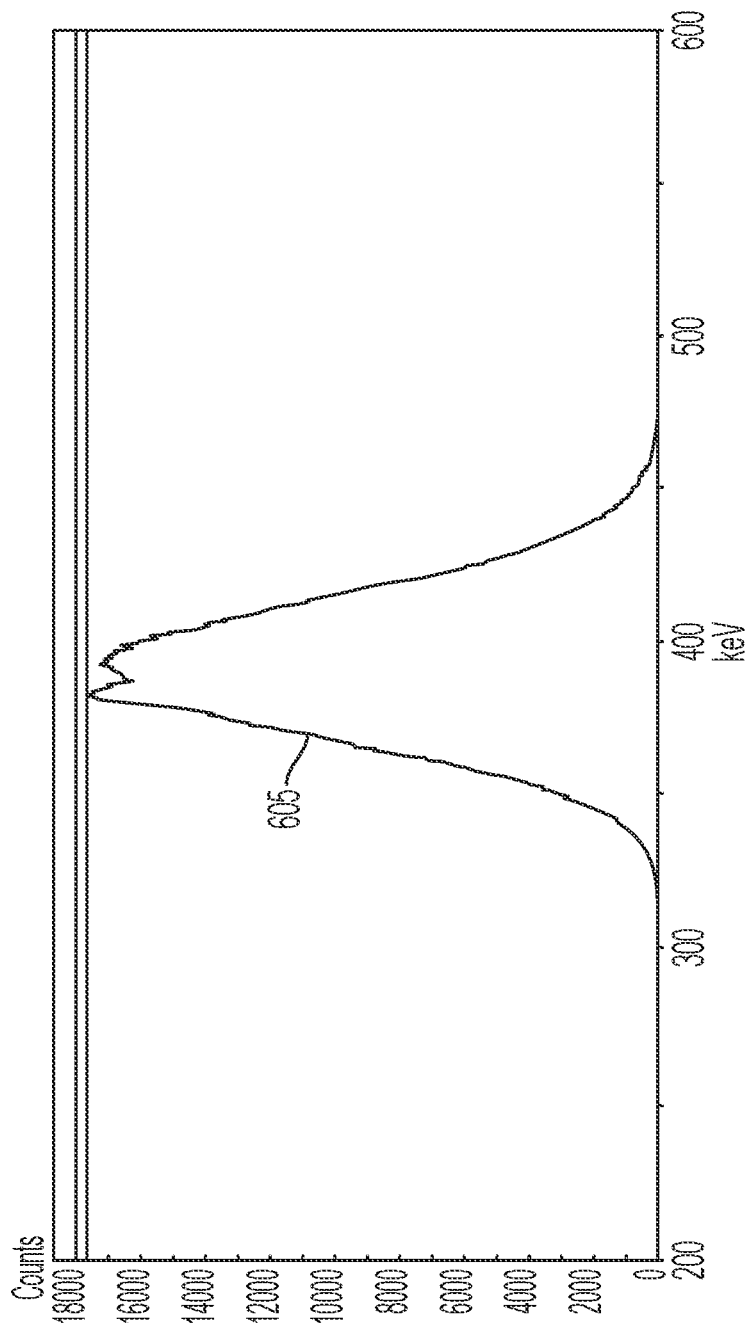
FIG. 6 is a graph showing a spectrum generated by an electronic test source emitting alpha test pulses and measured with a liquid scintillation counter, according to an illustrative embodiment.

FIG. 6 shows an energy distribution spectrum 605 produced by a liquid scintillation counter detecting alpha test pulses emitted from a prototype version of the electronic test source described herein. As shown in the example spectrum, the generated alpha test pulses are identified, by the liquid scintillation counter as corresponding to alpha events.

Accordingly, this example demonstrate the capability of the electronic test source to generate alpha test pulses that accurately emulate real alpha pulses, and are detected as such. This example also demonstrates the capability of the electronic test source to generate emulated radioactive event test pulses having different energies.

Example 2. Emulated Spectrum of Beta Test Pulses with Different Energies

Figure 7:
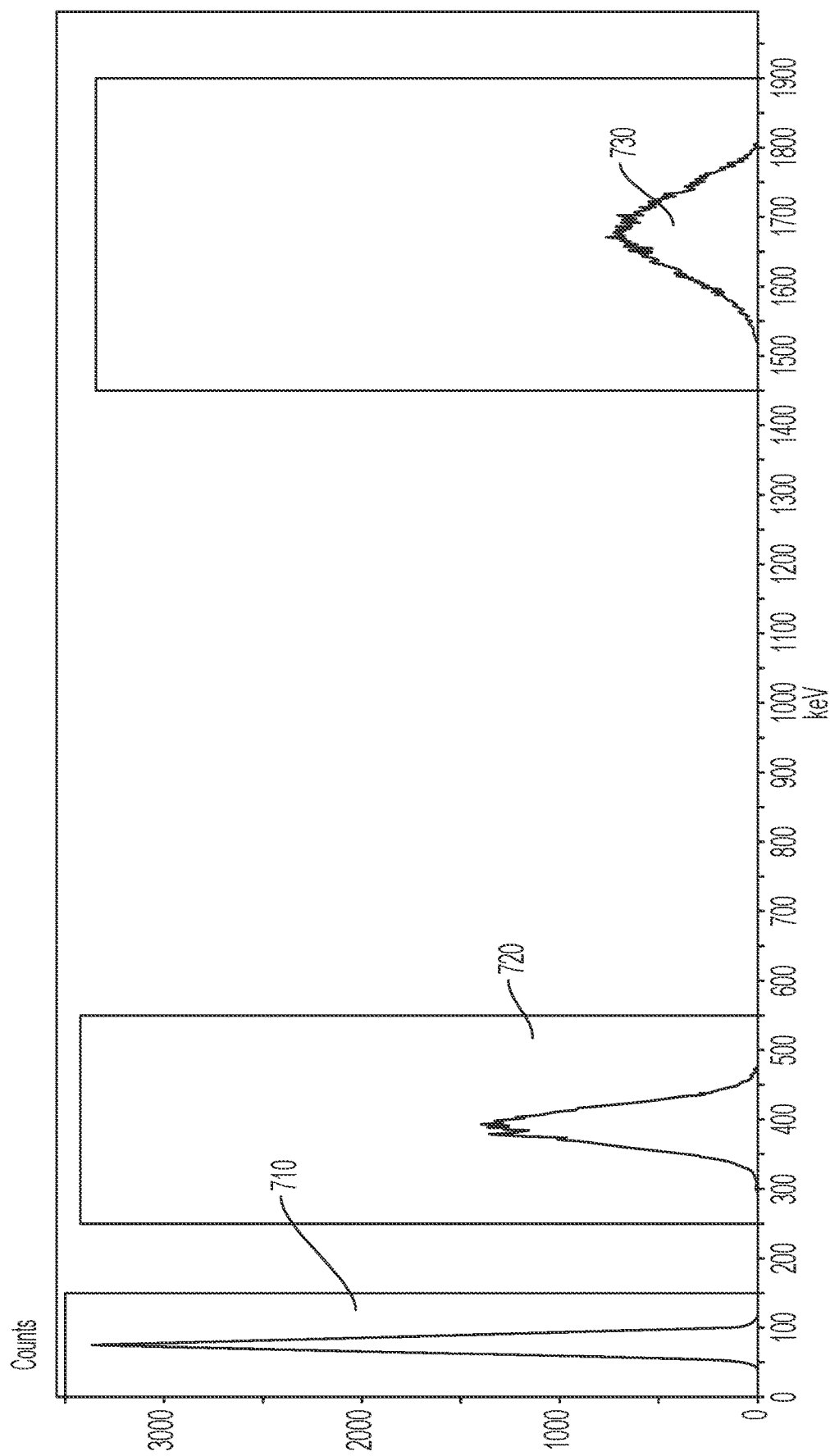
FIG. 7 is a graph showing a spectrum generated by an electronic test source emitting beta test pulses corresponding to radioactive decay events having different energies and measured with a liquid scintillation counter, according to an illustrative embodiment.

FIG. 7 shows an energy distribution spectrum measured by a liquid scintillation counter detecting beta test pulses with different intensities emitted from a prototype version of the electronic test source described herein. The emulated spectrum comprises multiple energy peaks 710, 720, and 730 resulting from beta test pulses generated from the pulse LED with intensities corresponding to energies centered at about 75 keV, 400 keV, and 1700 keV, respectively.

Such beta test pulses emitted by the pulse LED of an electronic test source may be used, for example, to calibrate and/or test a liquid scintillation counter (e.g., the alpha/beta discriminator circuit of a liquid scintillation counter, e.g., the beta/gamma discriminator circuit of a liquid scintillation counter; e.g., a discriminator implemented as a software routine that distinguished between alpha and beta pulses; e.g., an energy path dynamic range of the liquid scintillation counter).

Example 3. Emulated Spectrum of $^{14}$C

FIG. 8A shows an energy distribution spectrum measured by a liquid scintillation counter detecting the emulated radioactive event test pulses emitted from the pulse LED of an electronic test source programmed to emulate a $^{14}$C spectrum.

Figure 8B:
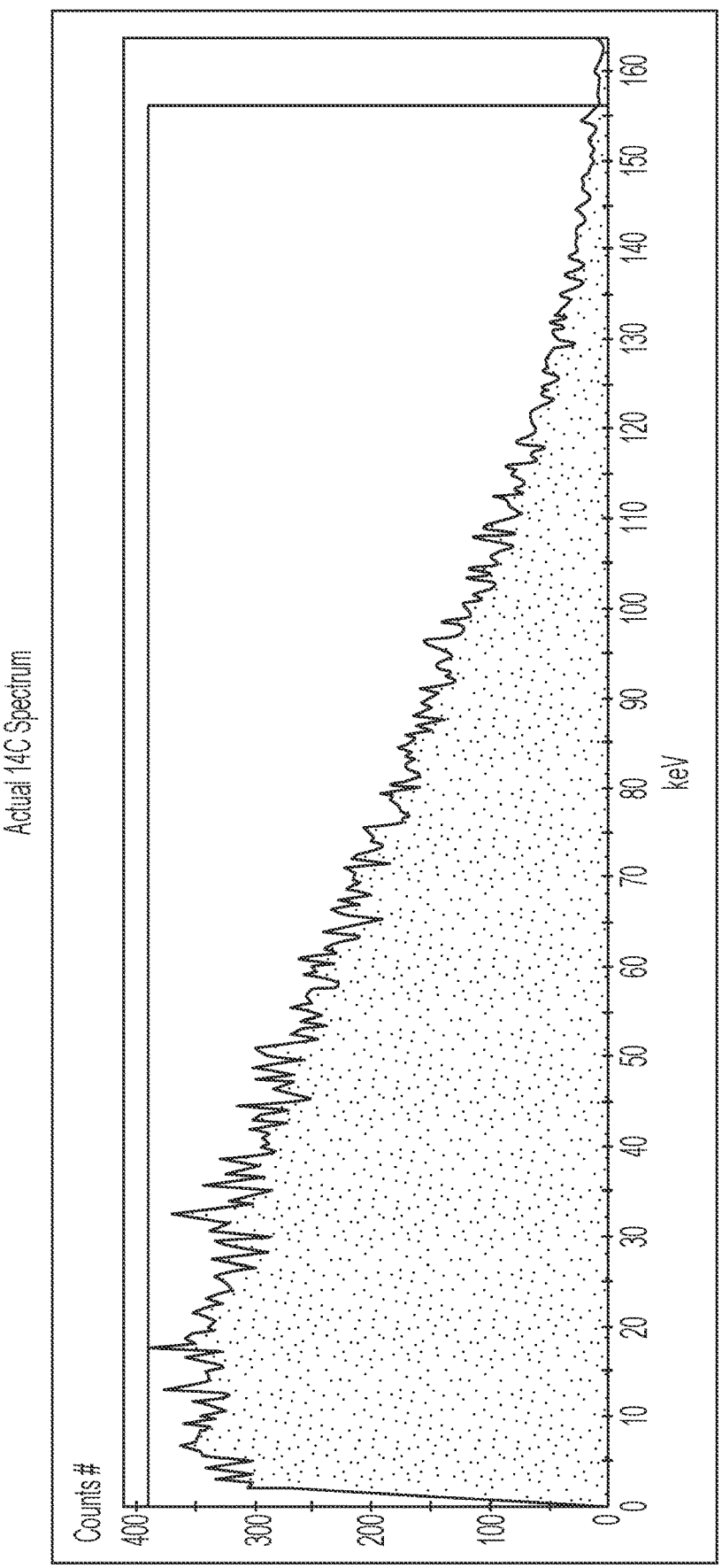
FIG. 8B is a graph showing a spectrum of a liquid sample containing $^{14}C$ measured with a liquid scintillation counter, according to an illustrative embodiment.

For comparison, FIG. 8B shows a spectrum recorded by a liquid scintillation counter for a sample containing $^{14}$C. Accordingly, the emulated spectrum of $^{14}$C 810 produced by the electronic test source (e.g., as shown in FIG. 8A) is very similar to a "real" spectrum of $^{14}$C 820 (e.g., as shown in FIG. 8B) (e.g., the spectrum produced when $^{14}$C is measured in a liquid scintillation counter, e.g., the spectrum of light emitted by a scintillator as a result of the radioactive decay of $^{14}$C). The spectrum of $^{14}$C is commonly used to calibrate and/or test the high voltage settings of a liquid scintillation counter. Therefore, using the electronic test source, such calibration and/or testing may be performed without $^{14}$C.

The programmable controller module (a PIC microcontroller in the prototype electronic test source used in this example) of the electronic test source was programmed to apply electronic pulse signals to the pulse LED in order to produce the emulated $^{14}$C spectrum. An example of pseudo-code used to program the electronic test source's programmable controller module is shown in the following:

```
// CREATE TRIANGULAR SHAPED SPECTRUM TO SIMULATE 14C
NUM_COUNTS = 32;
ENERGY = 5; // THIS SETS UP VDAC TO CONTROL PULSE AMPL
WHILE (TRUE) {
    FOR (X=1; X <= NUM_COUNTS; X++){
        PULSE_LED;
        WAIT 600US;
    }
    ENERGY = ENERGY + 5; // INCREASE PULSE AMPL BY 5 KEV
    NUM_COUNTS = NUM_COUNTS - 1;
    IF (NUM_COUNTS == 0){
        NUM_COUNTS = 32;
        ENERGY = 5;
    }
}
```

A look-up table may also be used to emulate the spectrum of $^{14}$C, such that the pulse LED of the electronic test source emits the number of radioactive event test pulses (e.g., counts detected by a liquid scintillation counter) at each energy level corresponding to the "real" spectrum of $^{14}$C.

Example 4. Emulated Spectrum of Alpha and Gamma Pulses

Figure 9:
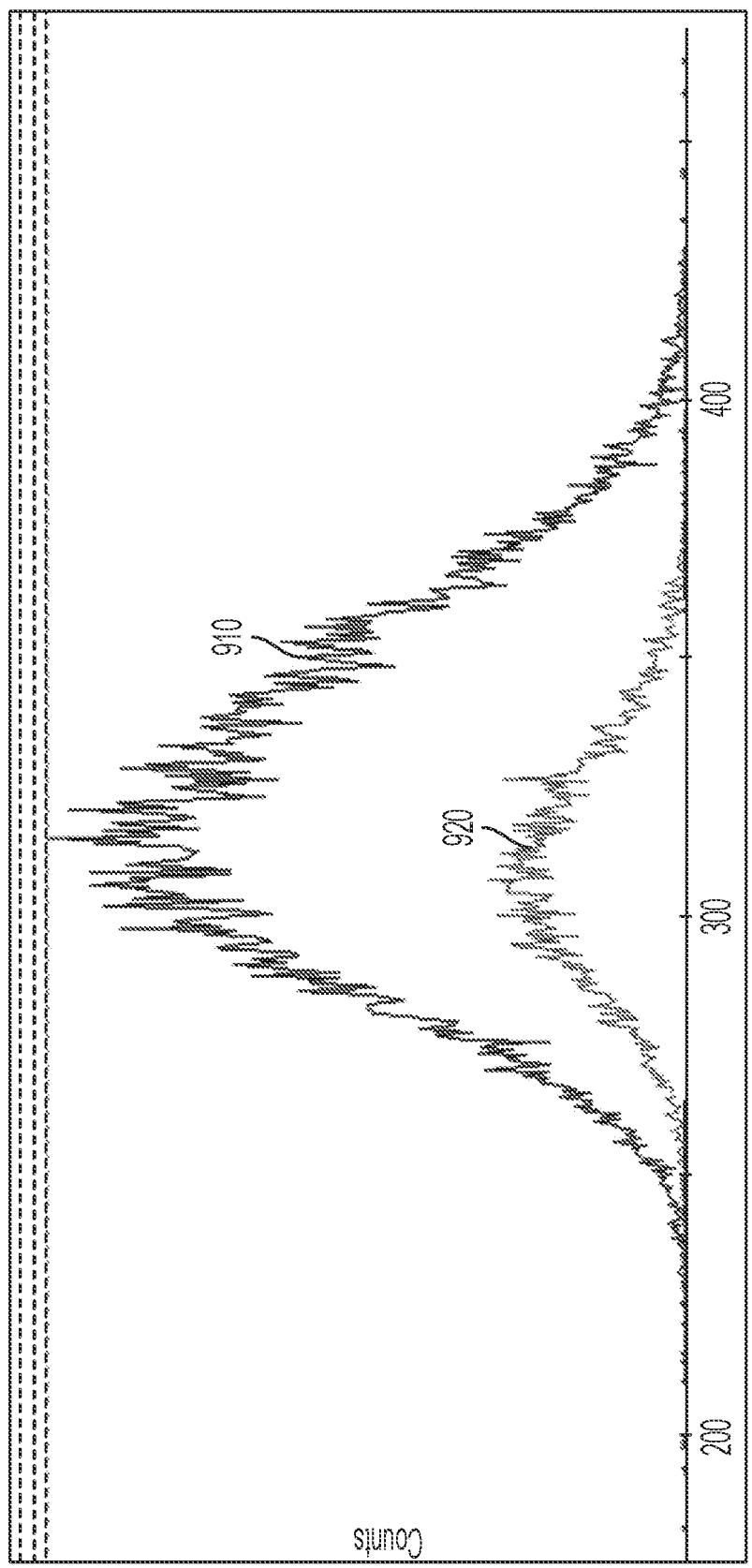
FIG. 9 is a graph showing a spectrum generated by an electronic test source emitting alpha test pulses and gamma test pulses and measured with a liquid scintillation counter, according to an illustrative embodiment.

FIG. 9 shows an energy distribution spectrum produced by a liquid scintillation counter by detecting alpha test pulses and gamma test pulses emitted from a prototype version of the electronic test source described herein. The emulated spectra of an alpha emitter 910 and of a gamma emitter 920 as measured by the liquid scintillation counter are shown in FIG. 9. The example shows the emitted alpha and gamma test pulses were correctly identified as corresponding to alpha events and gamma events, respectively, by the liquid scintillation counter.

Accordingly, in this example, the alpha test pulses detected by the liquid scintillation counter were distinguishable from the gamma test pulses. Therefore, an electronic test source may emit gamma test pulses (e.g., corresponding to the gamma test pulses used to generate the emulated spectrum of a gamma emitter 920) to calibrate and/or test a discriminator and/or signal correction utility (e.g., software) of a liquid scintillation counter (e.g., to reject a detected signal corresponding to gamma events while retaining a detected signal corresponding to desired [e.g., alpha or beta] pulses).

Example 5. Testing Count Rate Linearity

To evaluate the count rate linearity of a liquid scintillation counter, count rates were measured for a $^{14}$C radioactive calibration standard that undergoes 500,000 disintegrations per minute (500K DPM $^{14}$C) and an electronic test source operating in two different modes: (i) fixed time interval between pulses and (ii) a varied (e.g., pseudorandom) time interval between pulses. The 500K DPM $^{14}$C standard was prepared under the appropriate conditions to produce an expected (e.g., theoretical) count rate of 500,000 counts per minute (CPM). An electronic test source was similarly programmed to emit light pulses at the same rate of 500,000 CPM.

Table 1 shows the count rates and percent errors (e.g., percent error compared to the target count rate of 500,000 CPM). Percent error was calculated as:

$$\text{Error}(\%) = 100 \times \frac{(500{,}000 \ CPM - \text{measured } CPM)}{500{,}000 \ CPM}$$

TABLE 1

Counts per minute (CPM) for 500 K DPM using 14C standard and SS sources

| Sample | CPM (1/min) | Error (%) |
|---|---|---|
| $^{14}$C standard | 447083 | −10.6 |
| (i) Scintillation emulator-constant pulse period | 500401 | 0.1 |
| (ii) Scintillation emulator-varied pulse period | 500399 | 0.1 |

The electronic test source emitted pulses nearer the desired count rate of a 500,000 CPM with a much lower error (0.1%) than was achieved using the conventional $^{14}$C calibration standard (−10.6%).

The relatively large error of the $^{14}$C calibration standard may have resulted from, for example, human error during sample preparation (e.g., pipetting and/or measurement errors), sample quenching (e.g., chemicals or other materials interfering with the conversion of the radioactive decay events to light or light detection), instrument inefficiencies (e.g., the low optical inefficiency of a liquid scintillation counter configured to count the low-energy pulses of $^{14}$C in the energy range from 0 keV to 156 keV).

In mode (i) of this example test, the electronic test source was operated with a fixed time interval between pulses of about 120 μs. In mode (ii), the electronic test source was programmed to emit pulses with an initial pulse interval of 5 μs. The time interval between pulses was then gradually increased up to a maximum of about 200 μs over the span of 235 pulses, at which point this pulse sequence was repeated.

Figure 10:
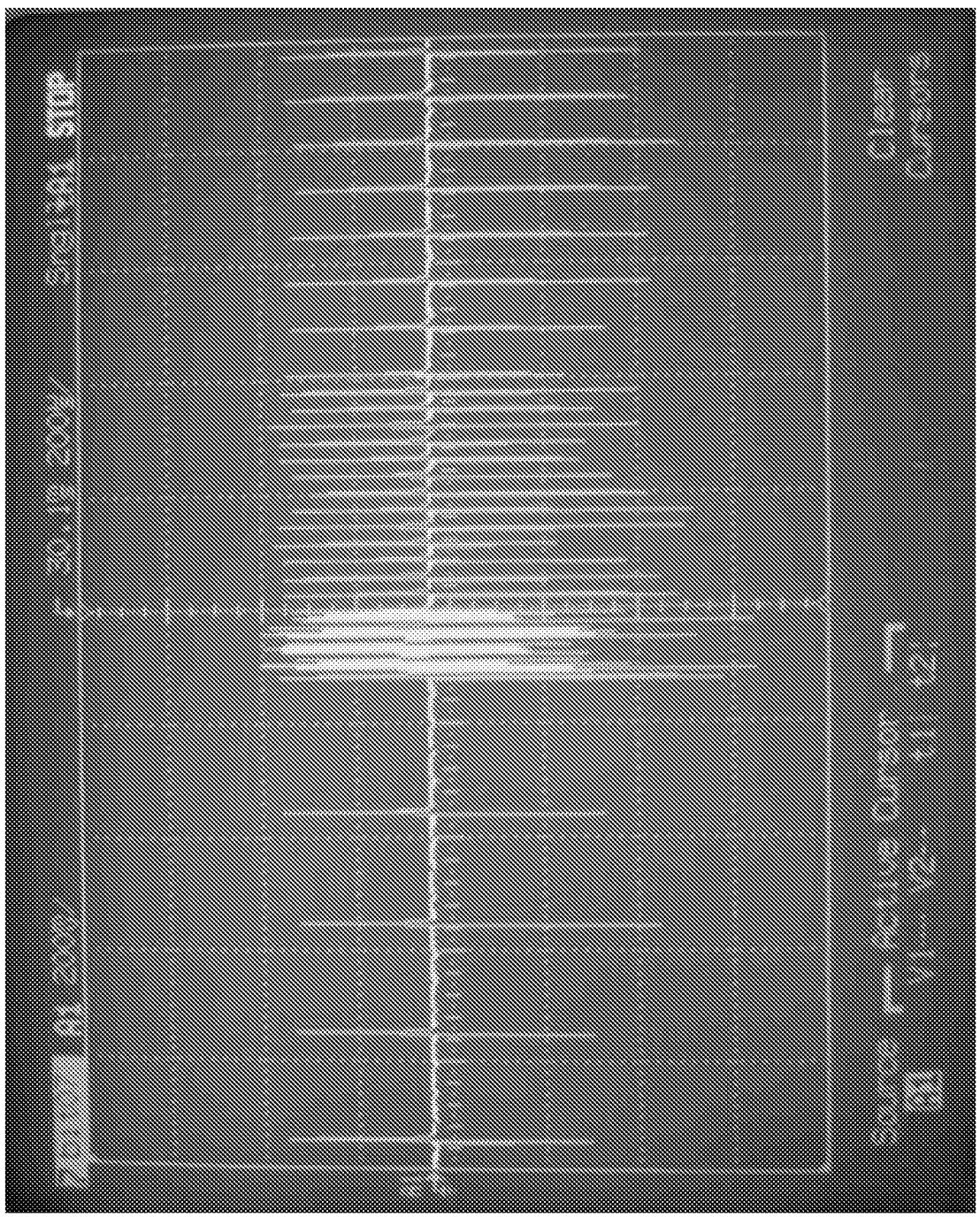
FIG. 10 is a graph showing a voltage versus time trace of a pseudorandom sequence of electronic pulse signals that are applied to a pulse LED of an electronic test source to generate a pseudorandom sequence of emulated radioactive event test pulses, according to an illustrative embodiment.

FIG. 10 shows the electronic pulse signals (e.g., pulse sequence) applied to the pulse LED of the electronic test source during count rate testing in mode (ii), as presented above. The intensity of the light emitted by the pulse LED corresponds to an energy of about 900 keV.

Using this example method for testing count rate linearity, problems caused by human error during sample preparation (e.g., pipetting and/or measurement errors), sample quenching (e.g., chemicals or other materials interfering with the conversion of the radioactive decay events to light or light detection), and instrument inefficiencies (e.g., the low optical inefficiency of a liquid scintillation counter configured to count the low energy pulses of $^{14}$C in the energy range from 0 keV to 156 keV) may be prevented.

Generation of Emulated Background Light—Luminescence

In certain embodiments, electronic test source 100 of FIG. 1 may include lumi LED 116, as shown in the illustrative embodiment of FIG. 1, for generating emulated background light comprising a sufficiently small number of photons so as to emulate single photon events corresponding to background luminescence. In certain embodiments, lumi LED 116 may be optically separated from the top pulse LED 102 by opaque surface 112 (e.g., a surface covered with black tape). In certain embodiments, the lumi LED may be an LED of various colors and/or sizes. In certain embodiments, the color of the lumi LED is selected such that the color (wavelength) approximately matches the wavelength at which the PMTs of a given liquid scintillation counter are most sensitive, often in the green and blue region of the visible spectrum. Accordingly, the lumi LED may be a green LED. The color (e.g., emission wavelength) of the lumi LED may be selected to match emission wavelengths of common sources of background luminescence. In certain embodiments, lumi LED 116 may be surrounded by optically diffusive material 114 (e.g., Delrin®).

In certain embodiments, an electronic lumi signal applied to a lumi LED of an electronic test source determined the intensity of the emulated background light emitted by the lumi LED. For example, the amplitude of an electronic lumi signal (e.g., a fixed electronic lumi signal) may be adjusted (e.g., using the programmable controller module [e.g., microcontroller] of an electronic test source) such that the electronic lumi signal, when applied to the lumi LED, results in the emission of emulated background light with a controllable intensity. For example, the duty cycle of an electronic lumi signal (e.g., a pulse-width modulated (PWM) electronic lumi signal) may be adjusted (e.g., using the programmable controller module [e.g., microcontroller] of an electronic test source) such that the electronic lumi signal, when applied to the lumi LED, results in the emission of emulated background light with a controllable intensity.

Figure 17C:
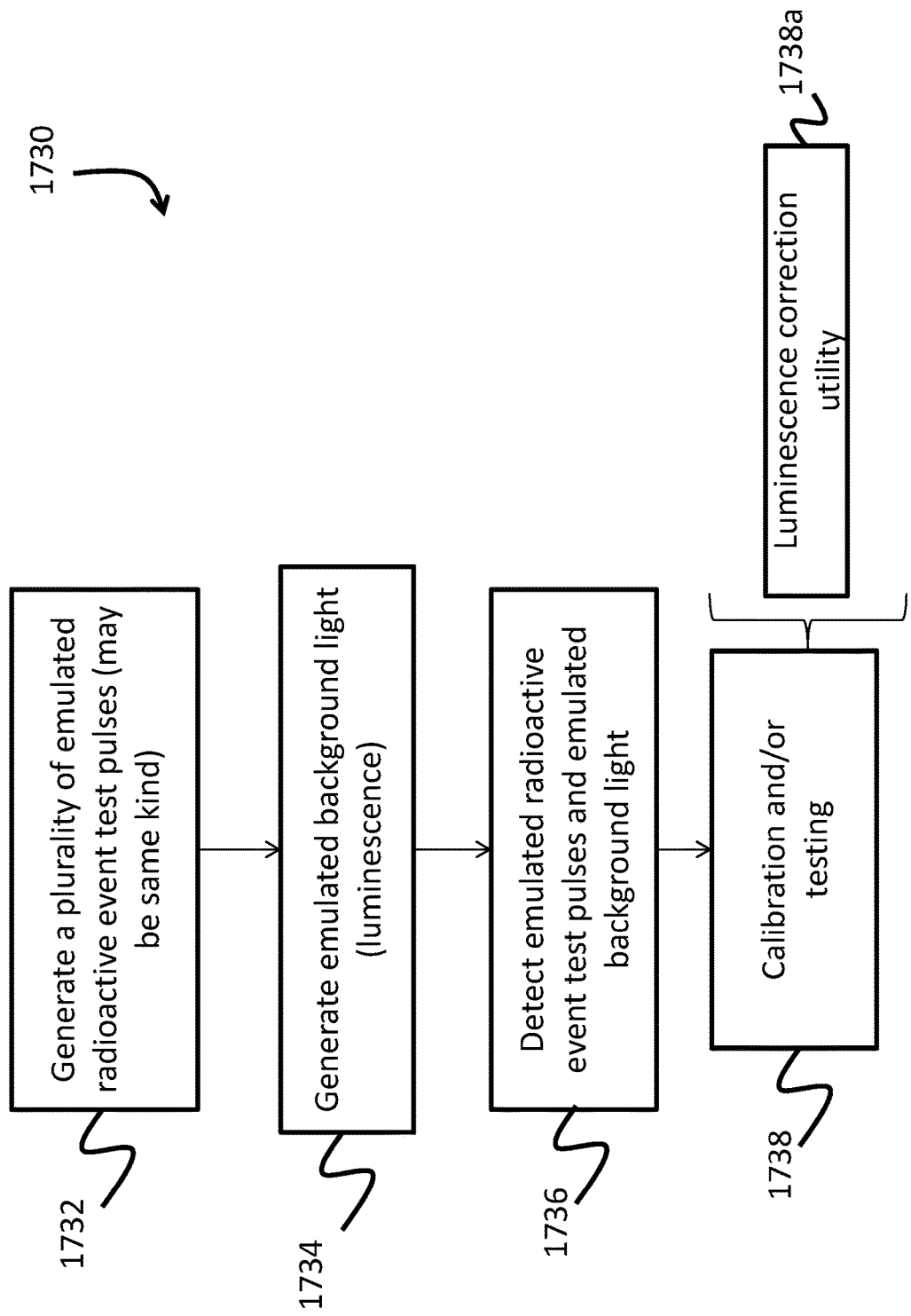
FIG. 17C is a block flow diagram of a process for calibrating and/or testing a liquid scintillation counter using emulated radioactive event test pulses and emulated background light generated by an electronic test source, according to an illustrative embodiment.

In certain embodiments, the emulated background light may be used, along with generated emulated radioactive event test pulses for calibration and/or testing of a liquid scintillation counter. FIG. 17C shows an example process 1730 for calibration and/or testing of a liquid scintillation counter via generation of emulated radioactive event test pulses along with emulated background light. In particular, emulated radioactive event test pulses are generated 1732 along with emulated background light 1734 by the electronic test source. The emulated radioactive event test pulses and emulated background light are detected 1736 by the liquid scintillation counter, and used for calibration and/or testing of the liquid scintillation counter 1738. In particular, as described in the following, calibration and/or testing of a luminescence correction utility (1738a) may be performed using this approach.

In certain embodiments, an electronic test source 100 may simultaneously emit emulated radioactive event test pulses from a pulse LED 102 and background light from a lumi LED 116. Accordingly, the electronic test source may be used to calibrate and/or test a luminescence correction utility that rejects luminescence while capturing desired light pulses corresponding to radioactive events. The luminescence correction utility may be electronic circuitry and/or software routines. For example, a luminescence correction utility may be implemented as a combination of hardware and software, wherein the hardware component comprises electronics that measure an amount of luminescence present, and the software component subtracts the measured luminescence in post-processing.

Example 6. Emulated Spectrum of a Beta Emitter with Emulated Background Light

Figure 11:
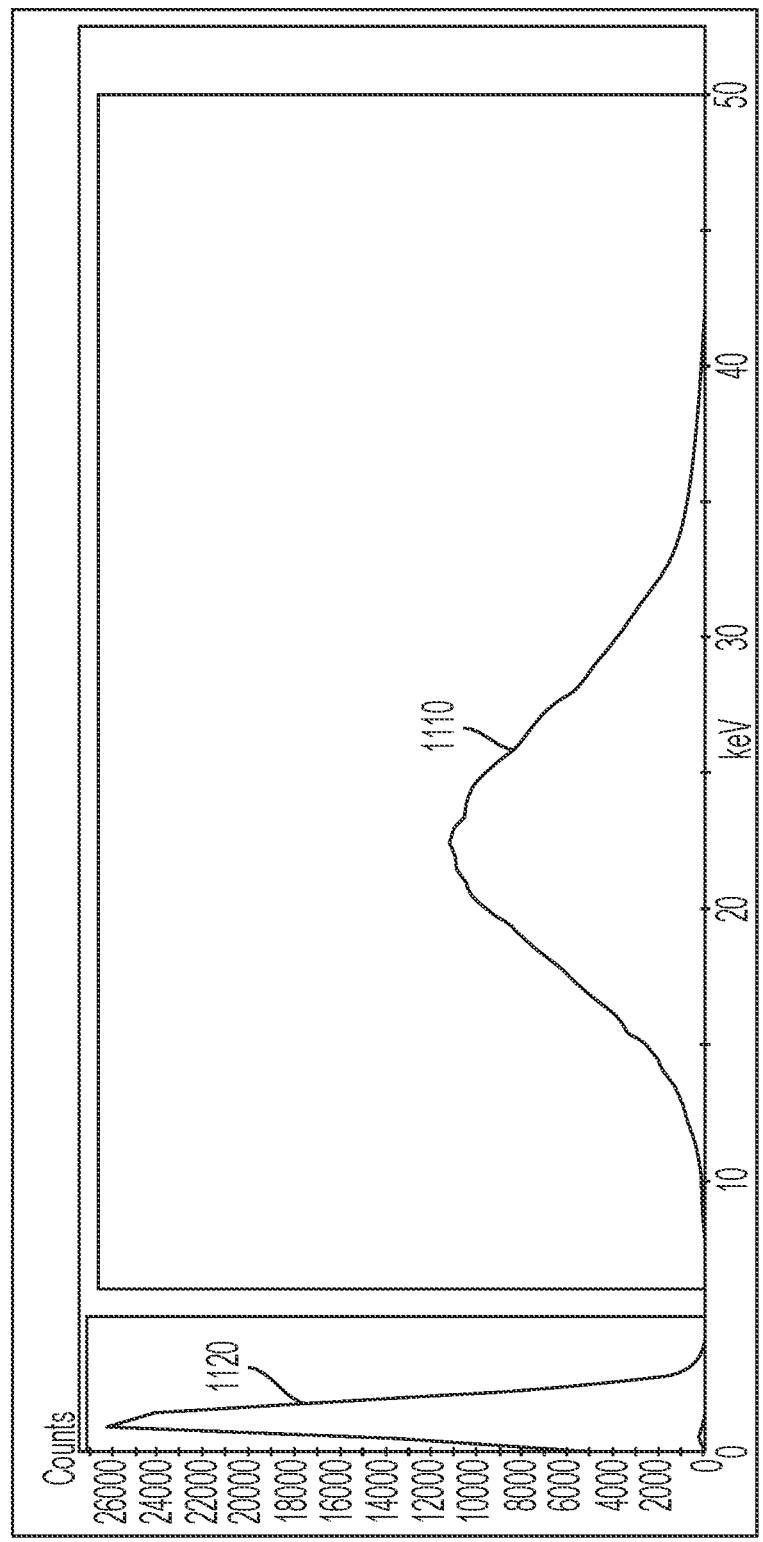
FIG. 11 is a graph showing spectra of detected emulated radioactive event test pulses in the presence of emulated background light corresponding to luminescence, according to an illustrative embodiment.

FIG. 11 shows an energy distribution spectrum measured by a liquid scintillation counter by detecting beta test pulses in the presence of emulated background light. The beta test pulses and emulated background light were generated by a prototype version of the electronic test source described herein. In this example, the peaks in the emulated spectrum of beta test pulses were identified as corresponding to a beta emitter—shown as peak 1110 in FIG. 11. The emulated background light corresponding to peak 1120 in FIG. 11 was identified as background light.

Accordingly, such beta test pulses and emulated background light may be used, for example, to calibrate and/or test a liquid scintillation counter (e.g., the luminescence correction software and/or circuitry used to reject luminescence while capturing desired pulses corresponding to radioactive decay events).

Figure 12:
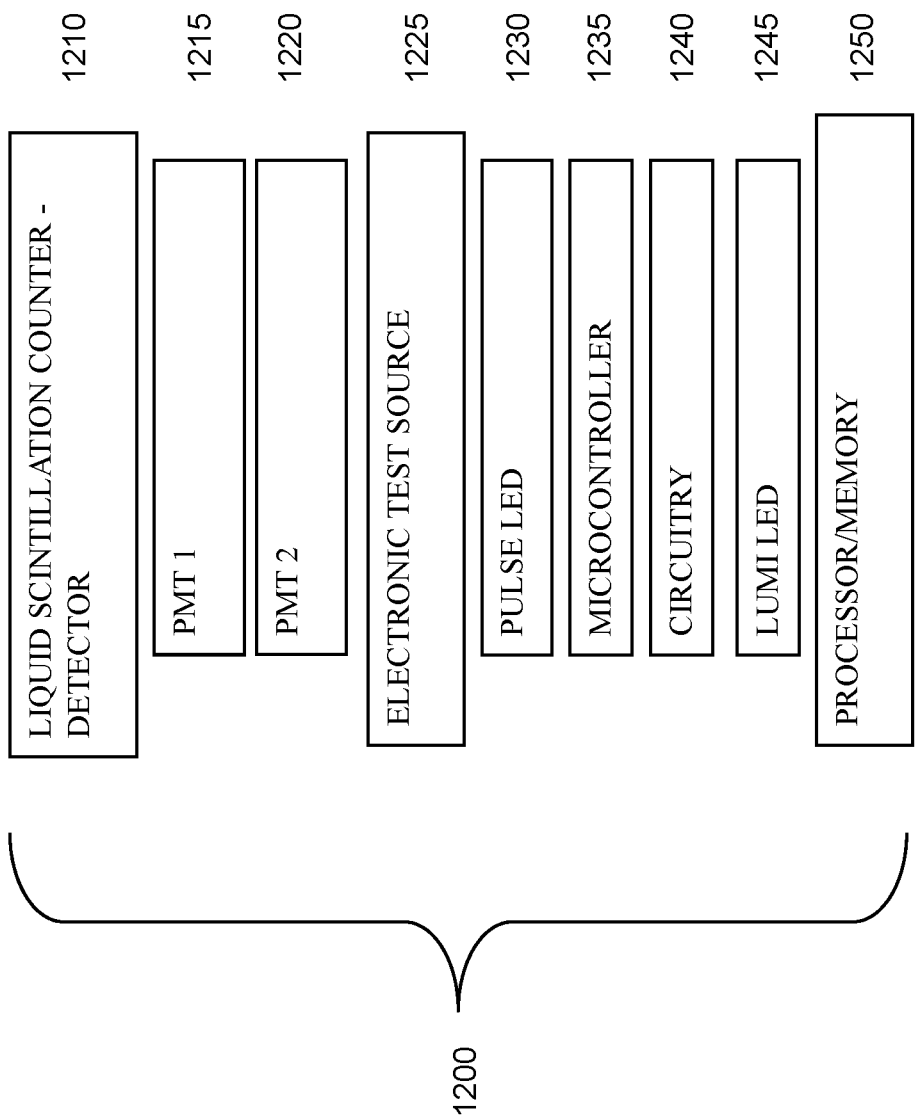
FIG. 12 is a block diagram of a system for testing and/or calibrating a liquid scintillation counter, according to an illustrative embodiment

Programmable Control of the Electronic Test Source for Calibration and/or Testing of a Liquid Scintillation Counter FIG. 12 shows a block diagram of a system for testing and/or calibrating a liquid scintillation counter. For example, an electronic test source (1225) comprising a pulse LED (1230) capable of emitting emulated radioactive test pulses, a programmable source controller module (e.g., a microcontroller) (1235), circuitry (1240), and a lumi LED (1245) for emitting emulated background light. The electronic test source may be placed in a 20 mL vial (or other container), which may be placed in the detector of a liquid scintillation counter (1210) comprising one or more photomultiplier tubes (PMTs). In FIG. 12, two PMTs are shown, 1215 and 1220. The light pulse shapes of emulated radioactive event test pulses can be used to calibrate and/or test the liquid scintillation counter. A programmable source controller module (e.g., microcontroller) 108 of the electronic test source 100 of FIG. 1 may, for example, have flash memory and a processor (1250) which allows it to be programmed for multiple purposes and reprogrammed for new purposes. This processor and memory (1250) may have instructions stored thereon, wherein the instructions, when executed by the processor, cause the processor to perform the calibration and/or testing methods described herein.

In some embodiments, the electronic test source is controlled manually with a DIP switch, allowing the electronic test source to be configured by a user prior to its being placed inside a liquid scintillation counter for calibration and/or testing. In some embodiments, the electronic test source is controlled remotely with a wireless signal (e.g., an infrared sensor and remote), allowing the electronic test source to be configured and reconfigured without removing the electronic test source from the liquid scintillation counter. The use of either a DIP switch or wireless signal to configure and operate an electronic test source may, for example, improve ease-of-use and allow the electronic test source to be efficiently incorporated into workflows for calibration and/or testing. In certain embodiments, the programmable controller module (e.g., microcontroller) may be reprogrammed remotely using a wireless signal.

In some embodiments, the device may include a miniature piezo speaker (e.g., a buzzer) to provide an audible indication (e.g., through a pattern of "beeps") to indicate the current operating mode, or to indicate an error, or to indicate the need for user intervention (e.g., when replacement batteries are needed).

In some embodiments, the electronic test source comprises a built-in temperature sensor (e.g., thermistor or thermocouple) to correct for the temperature-dependent luminance of the LEDs.

In some embodiments, buffers powered by a regulator may be added in series with the signals which drive the base of the pulse transistors so that the transistor action is not affected by changes in battery voltage.

Circuitry

Figure 13A:
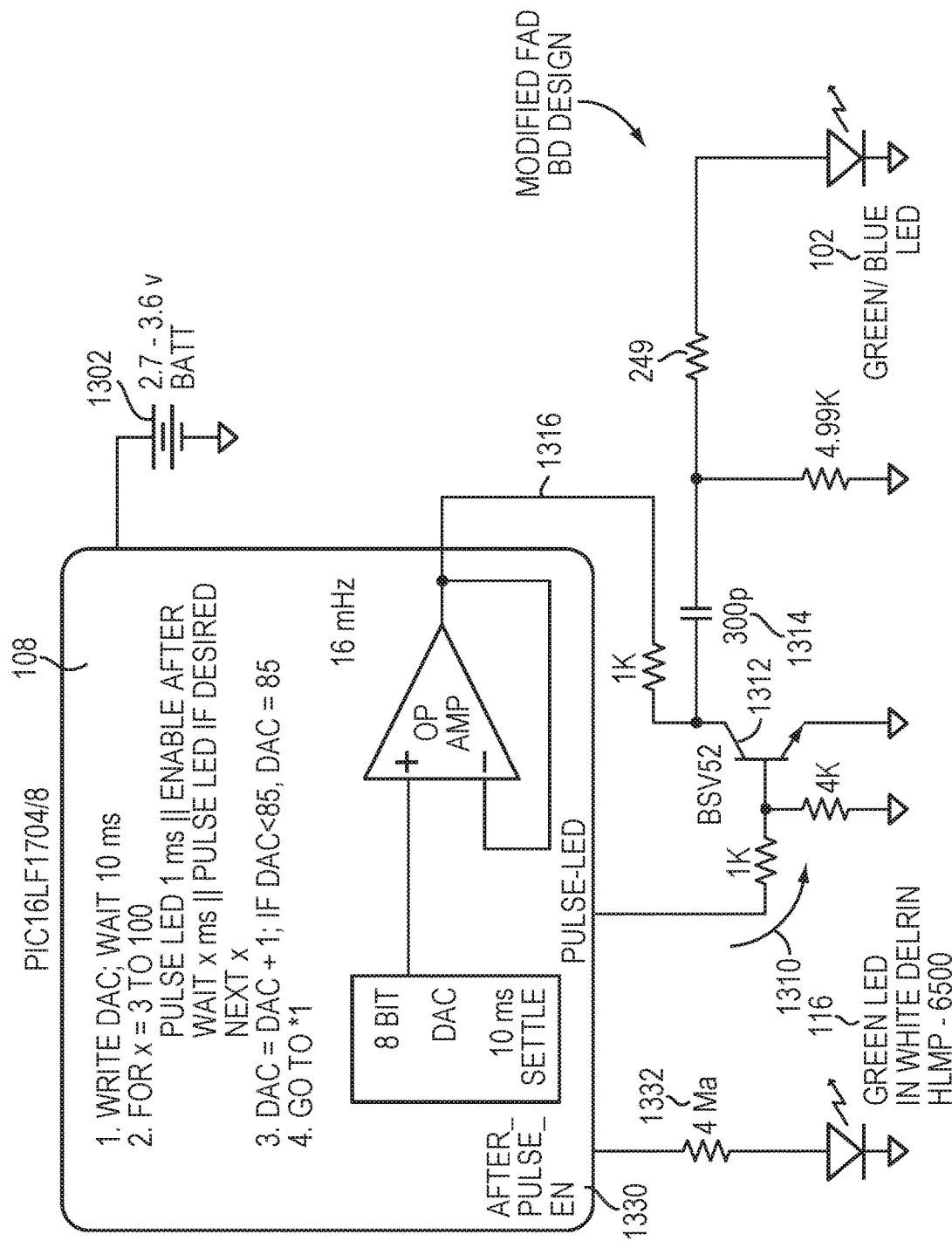
FIG. 13A is a diagram of the circuitry of an electronic test source, according to an illustrative embodiment.
Figure 13B:
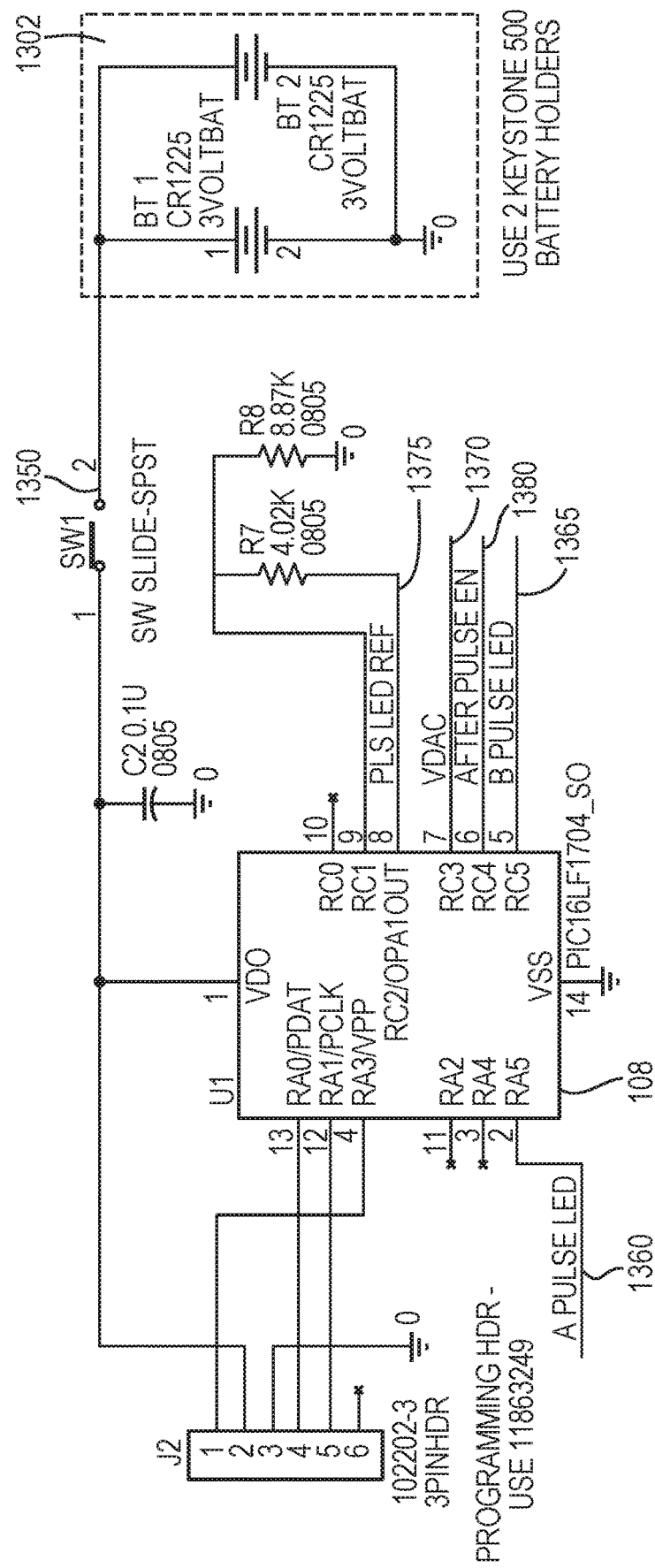
FIG. 13B is a diagram of a portion of the circuitry of an electronic test source, including connections to a programmable controller module, according to an illustrative embodiment.
Figure 13C:
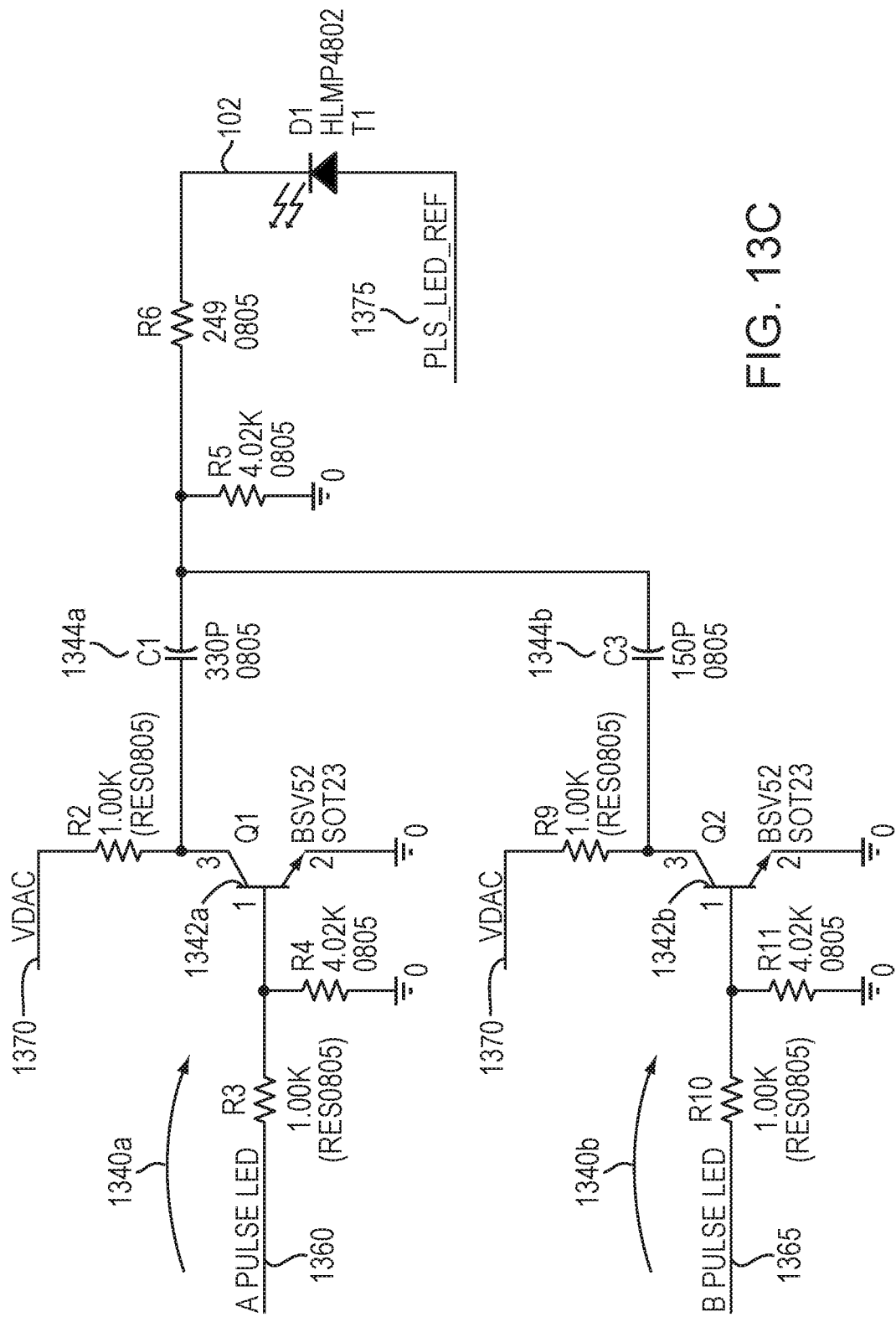
FIG. 13C is a diagram of a portion of the circuitry of an electronic test source for generating alpha, beta, and/or gamma test pulses, according to an illustrative embodiment.
Figure 13D:
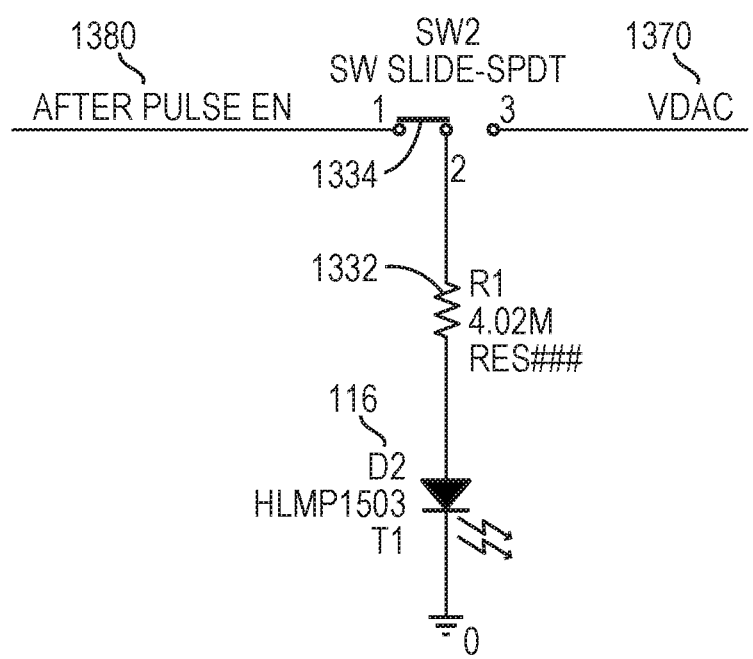
FIG. 13D is a diagram of a portion of the circuitry of an electronic test source for generating emulated background light, according to an illustrative embodiment.

FIG. 13A shows a diagram of the circuitry of an electronic test source, according to an illustrative embodiment. Programmable source controller module (e.g., microcontroller) 108, for example, may include an 8-bit digital-to-analog converter 1304 (DAC) and operational amplifier 1306 and be powered by one or more batteries 1302 (e.g., 2.7 V to 3.6 V batteries). In some embodiments, an electronic test source for calibrating and/or testing a liquid scintillation counter may employ a 10-bit or 12-bit DAC 1304 to produce electronic pulse signals with a higher temporal resolution.

The electronic test source may, for example, be programmed to adjust an electronic pulse signal (e.g., current, e.g., voltage) applied to pulse LED 102. For example, programmable source controller module (e.g., microcontroller) 108 of the electronic test source may be programmed to select circuit path 1310 corresponding to pulse LED 102. Voltage 1316 may, for example, charge capacitor 1314 between transistor 1312 and pulse LED 102. Circuit path 1310 may then be selected, for example, by "switching on" an electronic switching component (e.g., by applying a voltage to the base of transistor 1312). Selection of circuit path 1310 may cause capacitor 1314 to be rapidly discharged through pulse LED 102. The pulse shape of an emulated radioactive event test pulse emitted from pulse LED 102 may, for example, be determined at least in part by the capacitance of capacitor 1314 (e.g., a higher capacitance corresponds to a longer pulse width).

In certain embodiments, an electronic test source may be programmed to adjust an electronic lumi signal (e.g., a fixed current or voltage, e.g., a pulse-width modulated current or voltage) applied to lumi LED 116. For example, programmable source controller module (e.g., microcontroller) 108 of the electronic test source may be programmed to apply control signal 1330 to adjust the electronic lumi signal applied to lumi LED 116.

FIG. 13B shows a diagram of the circuitry of an electronic test source, according to an illustrative embodiment. For example, switch 1350 may act as a power switch for programmable source controller module (e.g., microcontroller) 108, such that the electronic test source is powered by batteries 1302 when switch 1350 is closed. Control signals 1360 and 1365 may be used to select circuit paths corresponding to the emission of alpha test pulses and beta test pulses, respectively. Voltage 1370 may be adjusted, for example, to charge the capacitor of each circuit path, and pulse reference voltage 1375 may, for example, be adjusted to adjust the dynamic range of the emulated radioactive test pulses emitted by the electronic test source. Control signal 1380 may be adjusted to emit emulated background light from the lumi LED of an electronic test source.

FIG. 13C shows a portion of the circuitry of an electronic test source for generating alpha, beta, and/or gamma test pulses from pulse LED 102, according to an illustrative embodiment. The circuitry of FIG. 13C is connected to control signals 1360 and 1370, voltage 1370, and pulse reference voltage 1375 of the circuit shown in FIG. 13B.

The circuitry of an electronic test source may be used, for example, to produce an electronic pulse signal of a first kind corresponding to the emission of an alpha test pulse. For example, programmable source controller module (e.g., microcontroller) 108 (of FIG. 13B) may be programmed to apply a control signal (e.g., current or voltage) 1360 to select circuit path 1340*a* corresponding to the emission of an alpha test pulse from pulse LED 102. Voltage 1370 may charge capacitor 1344a between transistor 1342a and pulse LED 102. Circuit path 1340a may then be selected, for example, by "switching on" an electronic switching component (e.g., by applying a voltage to the base of transistor 1342a). Selection of circuit path 1340a causes capacitor 1344a to be rapidly discharged through pulse LED 102. The pulse shape of an emulated radioactive event test pulse emitted from pulse LED 102 may, for example, be determined at least in part by the capacitance of capacitor 1344a (e.g., a higher capacitance corresponds to a longer pulse width). Pulse LED 102 may be biased by pulse reference voltage 1375, such that pulse LED 102 may emit light with the application of a lower magnitude electronic pulse signal, extending the dynamic range of energies (e.g., from 0 keV to 2000 keV) of alpha test pulses emitted by the electronic test source.

Similarly, in certain embodiments, the circuitry of the electronic test source produces an electronic pulse signal of a second kind, which, when applied to the pulse LED causes emission of a beta test pulse. For example, programmable source controller module (e.g., microcontroller) 108 of FIG. 13B may be programmed to apply a control signal (e.g., voltage, e.g., current) 1365 to select circuit path 1340b corresponding to the emission of a beta test pulse from pulse LED 102. Voltage 1370 charges capacitor 1344b between transistor 1342b and pulse LED 102. Circuit path 1340b may be selected, for example, by "switching on" an electronic switching component (e.g., by applying a voltage to the base of transistor 1342b). Selection of circuit path 1340b causes capacitor 1344b to be rapidly discharged through pulse LED 102. The pulse shape of an emulated radioactive event test pulse emitted from pulse LED 102 may, for example, be determined at least in part by the capacitance of capacitor 1344a (e.g., a higher capacitance corresponds to a longer pulse width). In certain embodiments, pulse LED 102 may be biased by pulse reference voltage 1375, such that pulse LED 102 may emit light with the application of a lower magnitude electronic pulse signal, extending the dynamic range of energies of beta test pulses emitted by the electronic test source.

In certain embodiments, both a first circuit path (e.g., circuit path 1340a) and a second circuit path (e.g., circuit path 1340b) may be selected simultaneously to produce an electronic pulse signal of a third kind, which, when applied to the pulse LED, results in emission of a gamma test pulse that has a light pulse shape that emulates that of a light pulse produced by a solid scintillator, such as BGO. For example, an electronic pulse signal of a third kind may correspond to overlapped electronic pulse signals of the first and second kind. In certain embodiments, the electronic pulse signal of the second kind may be produced with a short delay (e.g., of about 100 ns to 1000 ns) to produce a gamma test pulse that is broader (e.g. has a larger pulse width and/or a longer pulse tail length) and reaches its pulse peak later in comparison with alpha and beta test pulses. In this manner, a gamma test pulse is generated that has a light pulse shape that emulates that of a light pulse produced by a solid scintillator, such as BGO.

As discussed above, gamma pulses that are similar to beta pulses may also be emitted by a liquid scintillator, for example as a result of an external gamma ray (e.g., a cosmic ray) striking the liquid scintillator. Gamma test pulses that represent these shorter gamma pulses may be generated via the same, or similar circuitry used to generate beta test pulses as described above, with reference to FIG. 13C and below with reference to FIG. 14A.

FIG. 13D shows a portion of the circuitry of an electronic test source for generating emulated background light from lumi LED 116, according to an illustrative embodiment. For example, switch 1334 may be used to select control signals corresponding to the emulation of luminescence or after-pulses. When switch 1334 is in the left position, for example, control signal 1380 may be applied through resistor 1332 to lumi LED 116 in order to generate emulated luminescence or after-pulses. Control signal 1380 may comprise, for example, a fixed signal (e.g., a dc voltage) or a pulse-width modulated signal.

In certain embodiments, control signal 1380 may be applied to the circuitry of FIG. 13D simultaneously with control signal(s) 1360 and/or 1365 to circuit path(s) 1340a and/or 1340b of FIG. 13C, respectively. Accordingly, in certain embodiments, an electronic test source may emit emulated background light and emulated radioactive event test pulses simultaneously, allowing a broader range of calibration and testing methods to be performed than were previously possible using conventional approaches (e.g., by using radioactive materials and/or volatile chemicals as calibration standards).

In certain embodiments, programmable source controller module 108 of FIG. 13B may be programmed such that electronic lumi signal(s) are generated shortly after electronic pulse signal(s) (e.g., in a synchronized fashion) in order to emulated after pulses that occur after a light pulse resulting from a radioactive event. For example, emulated radioactive event test pulses (e.g., via control signal 1365 for generating a beta test pulse) may prompt the application of control signal 1380 for the generation of emulated after-pulses. For example, a beta test pulse may be emitted by pulse LED 102 followed by 5 ns to 5 μs of after-pulses from lumi LED 116. In this way, light emitted from an electronic test source may emulate light pulses emitted by a scintillator as the result of excitation by an external gamma ray (e.g., cosmic ray).

Referring to FIG. 13D, when switch 1334 is in the right position, the programmable source controller module 108 may vary voltage 1370 to vary the intensity of the luminescence produced by lumi LED 116.

Figure 14A:
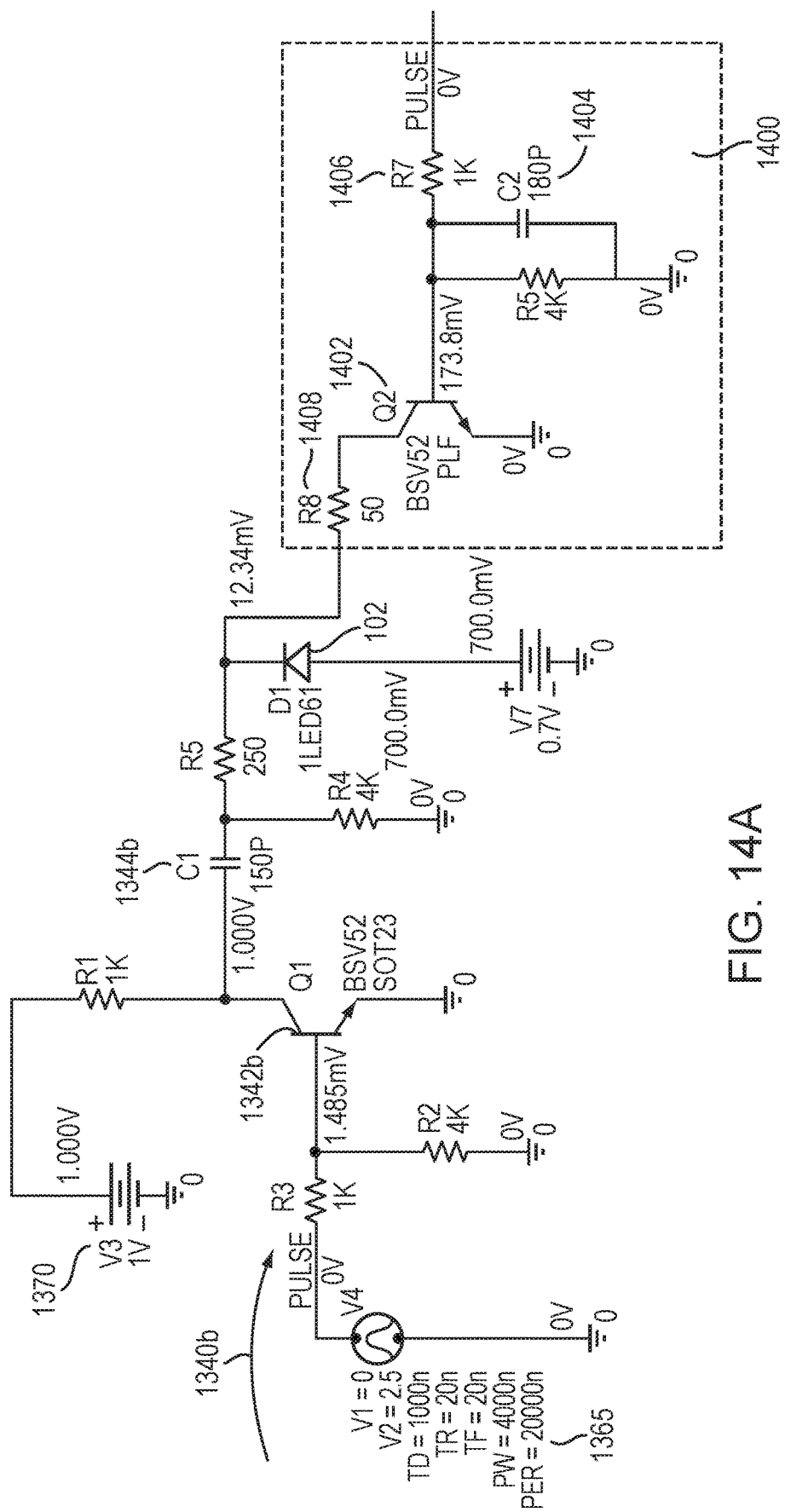
FIG. 14A is a diagram of a portion of the circuitry of an electronic test source, according to an illustrative embodiment.

Example 6. Alternate Circuitry for Generating Alpha or Beta Test Pulse with a Controlled Pulse Width and Tail Length FIG. 14A shows a circuit diagram for a modified version of circuit path 1340b of FIG. 13C for generating alpha or beta test pulses with controlled pulse widths and tail lengths. As in circuit path 1340b of FIG. 14A, programmable source controller module (e.g., microcontroller) 108 of FIG. 13B may be programmed to apply a control signal (e.g., voltage, e.g., current) 1365 to select circuit path 1340b corresponding to the emission of an alpha or beta test pulse from pulse LED 102. Voltage 1370 may charge capacitor 1344b. Circuit path 1340b may be selected, for example, by "switching on" an electronic switching component (e.g., by applying a voltage to the base of transistor 1342b). Selection of circuit path 1340b may cause capacitor 1344b to be rapidly discharged through pulse LED 102 and through pulse-shortening circuit 1400. Capacitor 1404 may cause an electronic switching component (e.g., transistor) 1402 to be "switched on" with a short delay (e.g., of tens of nanoseconds) following the activation of transistor 1342b. The resistance of resistor 1406 may, for example, be varied (e.g., using a potentiometer) to adjust the pulse width of an electronic pulse signal applied to pulse LED 102. In this example, the pulse shape of an emulated radioactive event test pulse emitted from pulse LED 102 may, for example, be determined at least in part by the capacitance of capacitor 1344b, the capacitance of capacitor 1404, and the resistance of resistor (or potentiometer) 1406.

Figure 14B:
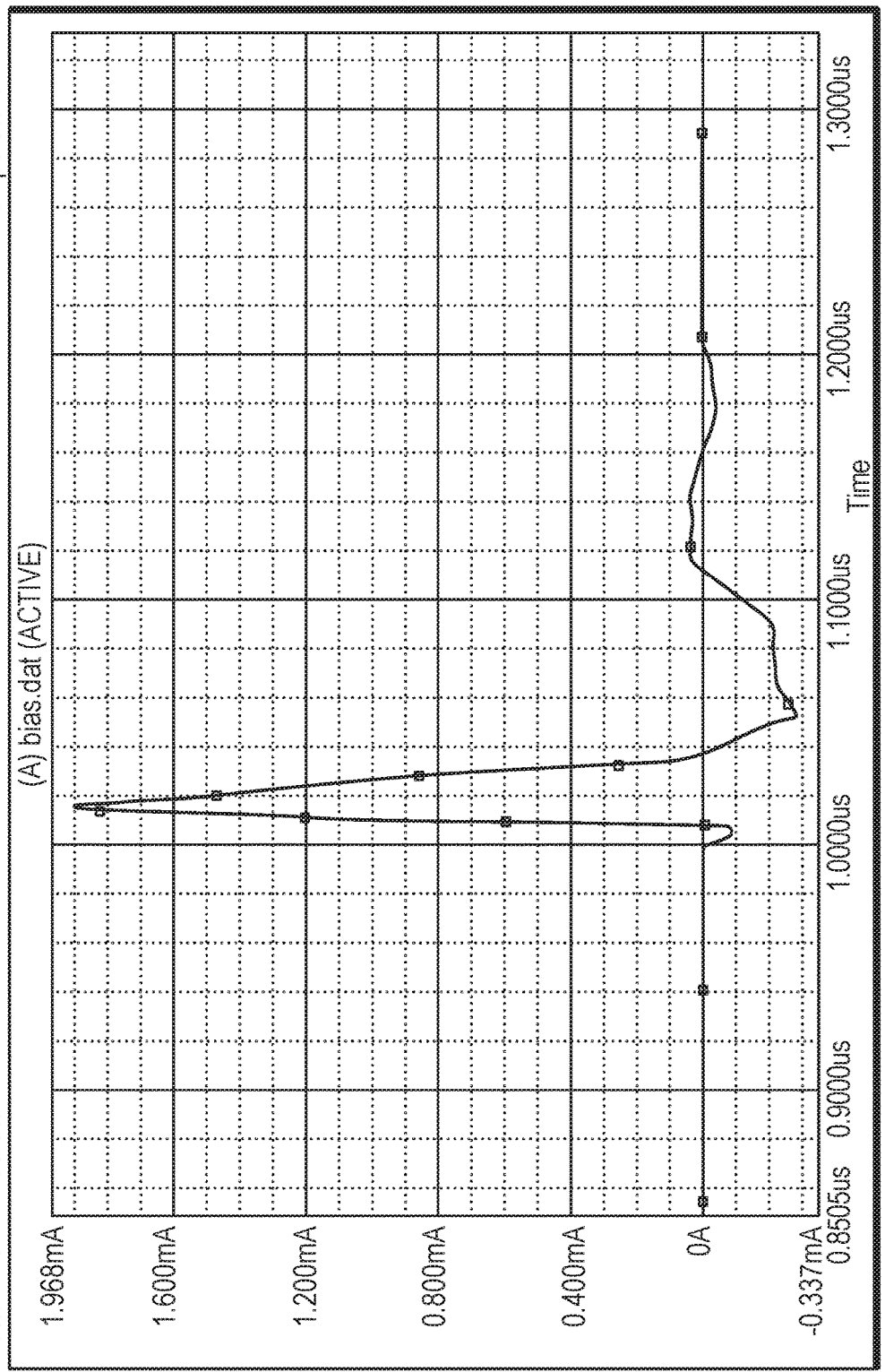
FIG. 14B is a graph showing a simulated current versus time trace of an electronic test pulse of a first kind used for generating a beta test pulse, wherein the electronic test pulse of the first kind is produced using the circuitry of FIG. 14A, according to an illustrative embodiment.

FIG. 14B shows electronic pulse signals applied to a pulse LED of an electronic test source comprising the circuitry shown in FIG. 14A to emit a shortened beta test pulse, according to an illustrative embodiment of the systems and methods described herein. The simulated electronic pulse signal shown in FIG. 14B, corresponds to an electronic pulse signal applied to a pulse LED through a second circuit path 1342b of the circuitry shown in FIG. 13C. The pulse height of the electronic pulse signal shown in FIG. 14B, which may, for example, be selected by a programmable source controller module of an electronic test source, is about 2 mA.

To create a pulse shape which more closely resembles that of an alpha pulse, resistor 1408 can be included. Values between 25 and 75 ohms lengthen the last half of the pulse tail in a way that closely emulates an actual alpha pulse.

Computer and Network

Figure 15:
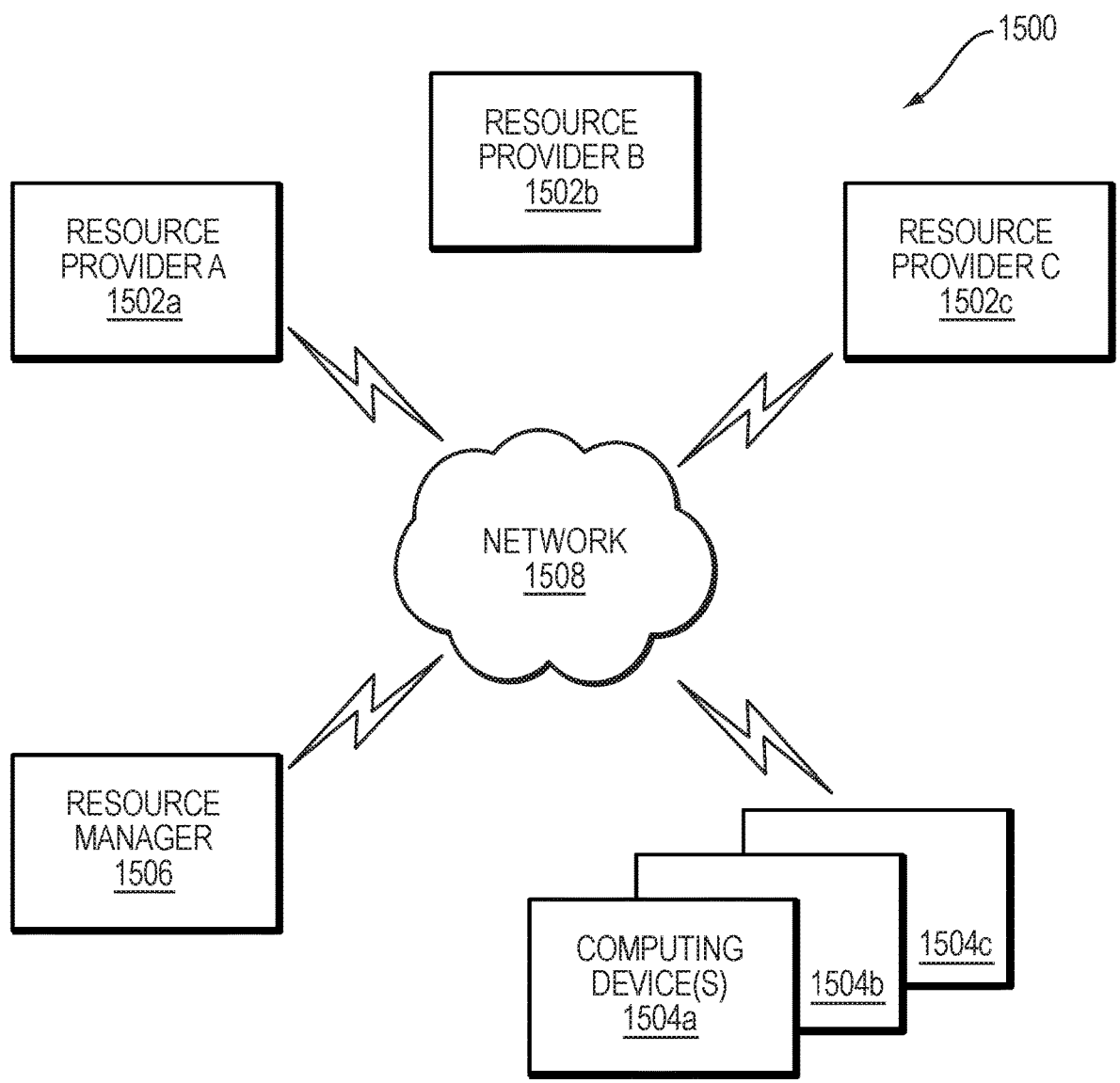
FIG. 15 is a block diagram of an exemplary cloud computing environment, used in certain embodiments.

As shown in FIG. 15, an implementation of a network environment 1500 for use in providing systems and methods, for calibrating and/or testing a liquid scintillation counter, as described herein, is shown and described. In brief overview, referring now to FIG. 15, a block diagram of an exemplary cloud computing environment 1500 is shown and described. The cloud computing environment 1500 may include one or more resource providers 1502a, 1502b, 1502c (collectively, 1502). Each resource provider 1502 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 1502 may be connected to any other resource provider 1502 in the cloud computing environment 1500. In some implementations, the resource providers 1502 may be connected over a computer network 1508. Each resource provider 1502 may be connected to one or more computing device 1504a, 1504b, 1504c (collectively, 1504), over the computer network 1508.

The cloud computing environment 1500 may include a resource manager 1506. The resource manager 1506 may be connected to the resource providers 1502 and the computing devices 1504 over the computer network 1508. In some implementations, the resource manager 1506 may facilitate the provision of computing resources by one or more resource providers 1502 to one or more computing devices 1504. The resource manager 1506 may receive a request for a computing resource from a particular computing device 1504. The resource manager 1506 may identify one or more resource providers 1502 capable of providing the computing resource requested by the computing device 1504. The resource manager 1506 may select a resource provider 1502 to provide the computing resource. The resource manager 1506 may facilitate a connection between the resource provider 1502 and a particular computing device 1504. In some implementations, the resource manager 1506 may establish a connection between a particular resource provider 1502 and a particular computing device 1504. In some implementations, the resource manager 1506 may redirect a particular computing device 1504 to a particular resource provider 1502 with the requested computing resource.

Figure 16:
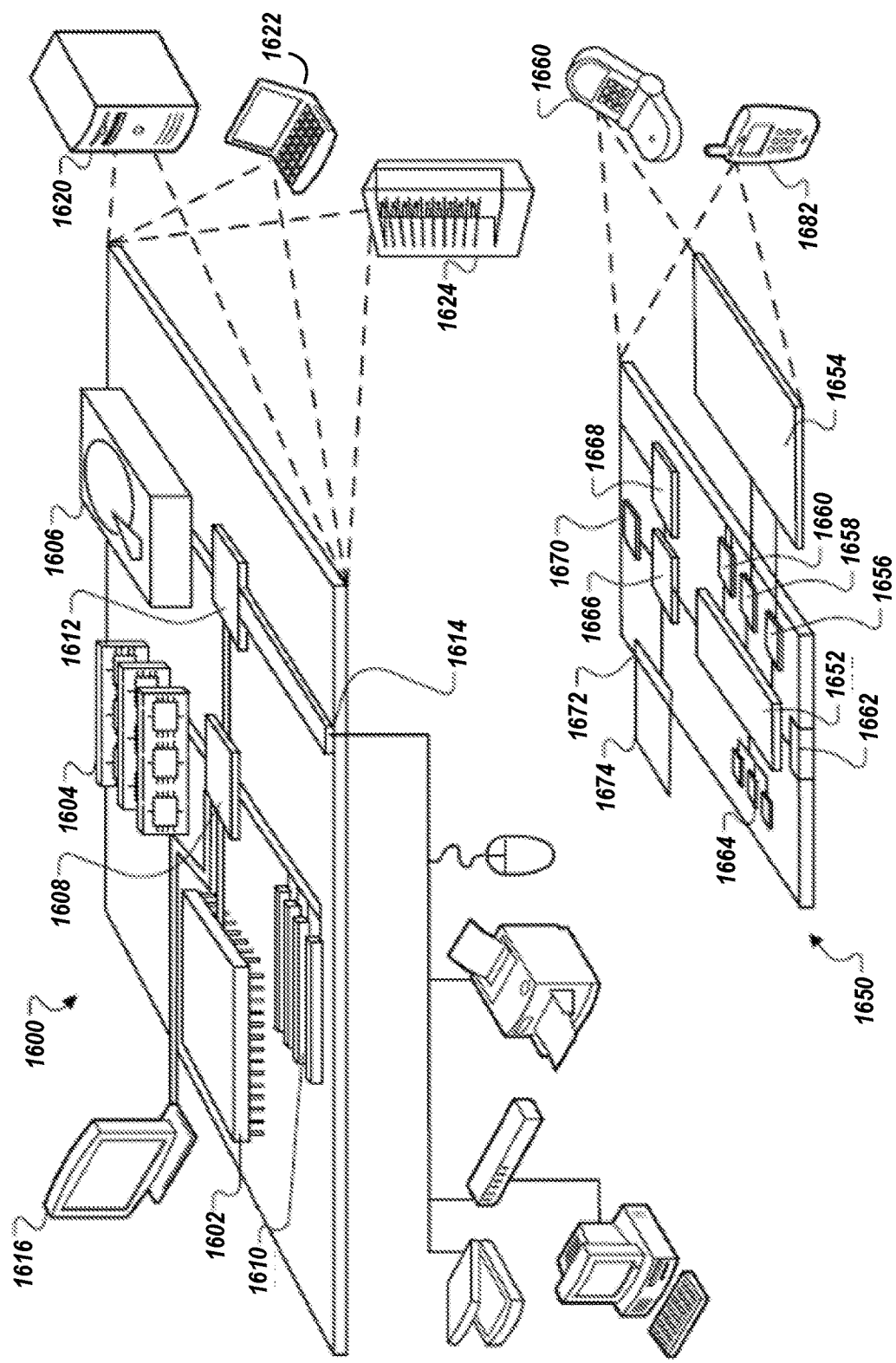
FIG. 16 is a block diagram of an example computing device and an example mobile computing device, used in certain embodiments.

FIG. 16 shows an example of a computing device 1600 and a mobile computing device 1650 that can be used to implement the techniques described in this disclosure. The computing device 1600 is intended to represent various forms of digital computers, such as laptops, desktops, workstations, personal digital assistants, servers, blade servers, mainframes, and other appropriate computers. The mobile computing device 1650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1600 includes a processor 1602, a memory 1604, a storage device 1606, a high-speed interface 1608 connecting to the memory 1604 and multiple high-speed expansion ports 1610, and a low-speed interface 1612 connecting to a low-speed expansion port 1614 and the storage device 1606. Each of the processor 1602, the memory 1604, the storage device 1606, the high-speed interface 1608, the high-speed expansion ports 1610, and the low-speed interface 1612, are interconnected using various busses, and may be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as a display 1616 coupled to the high-speed interface 1608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Thus, as the term is used herein, where a plurality of functions are described as being performed by "a processor", this encompasses embodiments wherein the plurality of functions are performed by any number of processors (one or more) of any number of computing devices (one or more). Furthermore, where a function is described as being performed by "a processor", this encompasses embodiments wherein the function is performed by any number of processors (one or more) of any number of computing devices (one or more) (e.g., in a distributed computing system).

The memory 1604 stores information within the computing device 1600. In some implementations, the memory 1604 is a volatile memory unit or units. In some implementations, the memory 1604 is a non-volatile memory unit or units. The memory 1604 may also be another form of computer-readable medium, such as a magnetic or optical disk.

The storage device 1606 is capable of providing mass storage for the computing device 1600. In some implementations, the storage device 1606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1602), perform one or more methods, such as those described above. The instructions can also be stored by one or more storage devices such as computer- or machine-readable mediums (for example, the memory 1604, the storage device 1606, or memory on the processor 1602).

The high-speed interface 1608 manages bandwidth-intensive operations for the computing device 1600, while the low-speed interface 1612 manages lower bandwidth-intensive operations. Such allocation of functions is an example only. In some implementations, the high-speed interface 1608 is coupled to the memory 1604, the display 1616 (e.g., through a graphics processor or accelerator), and to the high-speed expansion ports 1610, which may accept various expansion cards (not shown). In the implementation, the low-speed interface 1612 is coupled to the storage device 1606 and the low-speed expansion port 1614. The low-speed expansion port 1614, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1600 may be implemented in a number of different forms, as shown in the figure. For example, it may be implemented as a standard server 1620, or multiple times in a group of such servers. In addition, it may be implemented in a personal computer such as a laptop computer 1622. It may also be implemented as part of a rack server system 1624. Alternatively, components from the computing device 1600 may be combined with other components in a mobile device (not shown), such as a mobile computing device 1650. Each of such devices may contain one or more of the computing device 1600 and the mobile computing device 1650, and an entire system may be made up of multiple computing devices communicating with each other.

The mobile computing device 1650 includes a processor 1652, a memory 1664, an input/output device such as a display 1654, a communication interface 1666, and a transceiver 1668, among other components. The mobile computing device 1650 may also be provided with a storage device, such as a micro-drive or other device, to provide additional storage. Each of the processor 1652, the memory 1664, the display 1654, the communication interface 1666, and the transceiver 1668, are interconnected using various buses, and several of the components may be mounted on a common motherboard or in other manners as appropriate.

The processor 1652 can execute instructions within the mobile computing device 1650, including instructions stored in the memory 1664. The processor 1652 may be implemented as a chipset of chips that include separate and multiple analog and digital processors. The processor 1652 may provide, for example, for coordination of the other components of the mobile computing device 1650, such as control of user interfaces, applications run by the mobile computing device 1650, and wireless communication by the mobile computing device 1650.

The processor 1652 may communicate with a user through a control interface 1658 and a display interface 1656 coupled to the display 1654. The display 1654 may be, for example, a TFT (Thin-Film-Transistor Liquid Crystal Display) display or an OLED (Organic Light Emitting Diode) display, or other appropriate display technology. The display interface 1656 may comprise appropriate circuitry for driving the display 1654 to present graphical and other information to a user. The control interface 1658 may receive commands from a user and convert them for submission to the processor 1652. In addition, an external interface 1662 may provide communication with the processor 1652, so as to enable near area communication of the mobile computing device 1650 with other devices. The external interface 1662 may provide, for example, for wired communication in some implementations, or for wireless communication in other implementations, and multiple interfaces may also be used.

The memory 1664 stores information within the mobile computing device 1650. The memory 1664 can be implemented as one or more of a computer-readable medium or media, a volatile memory unit or units, or a non-volatile memory unit or units. An expansion memory 1674 may also be provided and connected to the mobile computing device 1650 through an expansion interface 1672, which may include, for example, a SIMM (Single In Line Memory Module) card interface. The expansion memory 1674 may provide extra storage space for the mobile computing device 1650, or may also store applications or other information for the mobile computing device 1650. Specifically, the expansion memory 1674 may include instructions to carry out or supplement the processes described above, and may include secure information also. Thus, for example, the expansion memory 1674 may be provide as a security module for the mobile computing device 1650, and may be programmed with instructions that permit secure use of the mobile computing device 1650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 1652), perform one or more methods, such as those described above. The instructions can also be stored by one or more storage devices, such as one or more computer- or machine-readable mediums (for example, the memory 1664, the expansion memory 1674, or memory on the processor 1652). In some implementations, the instructions can be received in a propagated signal, for example, over the transceiver 1668 or the external interface 1662.

The mobile computing device 1650 may communicate wirelessly through the communication interface 1666, which may include digital signal processing circuitry where necessary. The communication interface 1666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1668 using a radio-frequency. In addition, short-range communication may occur, such as using a Bluetooth®, Wi-Fi™, or other such transceiver (not shown). In addition, a GPS (Global Positioning System) receiver module 1670 may provide additional navigation- and location-related wireless data to the mobile computing device 1650, which may be used as appropriate by applications running on the mobile computing device 1650.

The mobile computing device 1650 may also communicate audibly using an audio codec 1660, which may receive spoken information from a user and convert it to usable digital information. The audio codec 1660 may likewise generate audible sound for a user, such as through a speaker, e.g., in a handset of the mobile computing device 1650. Such sound may include sound from voice telephone calls, may include recorded sound (e.g., voice messages, music files, etc.) and may also include sound generated by applications operating on the mobile computing device 1650.

The mobile computing device 1650 may be implemented in a number of different forms, as shown in the figure. For example, it may be implemented as a cellular telephone 1680. It may also be implemented as part of a smart-phone 1682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Elements of different implementations described herein may be combined to form other implementations not specifically set forth above. Elements may be left out of the processes, computer programs, databases, etc. described herein without adversely affecting their operation. In addition, the logic flows depicted in the figures do not require the particular order shown, or sequential order, to achieve desirable results. Various separate elements may be combined into one or more individual elements to perform the functions described herein. In view of the structure, functions and apparatus of the systems and methods described here, in some implementations.

Throughout the description, where apparatus and systems are described as having, including, or comprising specific components, or where processes and methods are described as having, including, or comprising specific steps, it is contemplated that, additionally, there are apparatus, and systems of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

While the invention has been particularly shown and described with reference to specific preferred embodiments, it should be understood by those skilled in the art that various changes in form and detail may be made therein without departing from the spirit and scope of the invention as defined by the appended claims.

What is claimed:

1. A method for calibrating and/or testing a liquid scintillation counter using an electronic test source, the method comprising:
    (a) generating, from a pulse light emitting diode (LED) of the electronic test source, a plurality of emulated radioactive event test pulses, wherein each emulated radioactive event test pulse is of a kind selected from the group consisting of:
        (A) a beta test pulse having a light pulse shape that emulates a light pulse shape produced by a scintillator as a result of radioactive decay of a beta emitter;
        (B) an alpha test pulse having a light pulse shape that emulates a light pulse shape produced by a scintillator as a result of radioactive decay of an alpha emitter; and
        (C) a gamma test pulse having a light pulse shape that emulates a light pulse shape produced by a scintillator as a result of radioactive decay of a gamma emitter,
    wherein the plurality of emulated radioactive event test pulses comprises at least one beta test pulse and at least one alpha test pulse;
    (b) detecting, by one or more detectors of the liquid scintillation counter, the plurality of emulated radioactive event test pulses; and
    (c) calibrating one or more discriminators of the liquid scintillation counter based on the detection of the at least one alpha test pulse and the at least one beta test pulse by the liquid scintillation counter.

2. The method of claim 1, wherein:
    the plurality of emulated radioactive event test pulses comprises at least one gamma test pulse, and
    the method comprises calibrating one or more discriminators of the liquid scintillation counter based on (i)

detection of the at least one alpha test pulse and/or the at least one beta test pulse and (ii) detection of the at least one gamma test pulse.

3. A method for calibrating and/or testing a liquid scintillation counter using an electronic test source, the method comprising:
(a) generating, from a pulse LED of the electronic test source, a plurality of emulated radioactive event test pulses, wherein each emulated radioactive event test pulse is of a kind selected from the group consisting of:
(A) a beta test pulse having a light pulse shape that emulates a light pulse shape produced by a scintillator as a result of radioactive decay of a beta emitter;
(B) an alpha test pulse having a light pulse shape that emulates a light pulse shape produced by a scintillator as a result of radioactive decay of an alpha emitter; and
(C) a gamma test pulse having a light pulse shape that emulates a light pulse shape produced by a scintillator as a result of radioactive decay of a gamma emitter;
(b) adjusting at least one of (i) and (ii) as follows:
(i) an intensity of one or more of the emulated radioactive event test pulses; and
(ii) a time interval between two or more emulated radioactive event test pulses; and
(c) detecting, by one or more detectors of the liquid scintillation counter, the plurality of emulated radioactive event test pulses,
wherein:
step (b) comprises adjusting the time interval between the two or more emulated radioactive event test pulses to generate a sequence of emulated radioactive event test pulses emitted at a fixed rate,
step (c) comprises detecting the sequence of emulated radioactive event test pulses, and
the method comprises calibrating and/or testing a count rate linearity of the liquid scintillation counter based on the detected sequence of emulated radioactive event test pulses.

4. The method of claim 3, wherein:
the plurality of emulated radioactive event test pulses comprises beta test pulses, step (b) comprises adjusting an intensity of one or more of the beta test pulses to produce a distribution of intensities that emulates a carbon-14 ($^{14}C$) spectrum, thereby generating an emulated $^{14}C$ spectrum,
step (c) comprises detecting the emulated $^{14}C$ spectrum, and
the method comprises calibrating and/or testing one or more high voltage settings of the liquid scintillation counter based on the detected emulated $^{14}C$ spectrum.

5. The method of claim 3, wherein:
step (b) comprises adjusting an intensity of one or more of the emulated radioactive event test pulses to produce a plurality of emulated radioactive event test pulses having different intensities, and
step (c) comprises detecting the plurality of emulated radioactive event test pulses having different intensities, and
the method comprises calibrating and/or testing an energy path dynamic range of the liquid scintillation counter based on the intensities of the detected emulated radioactive event test pulses having different intensities.

6. The method of claim 3, wherein:
step (b) comprises repeatedly adjusting the time interval between consecutive radioactive event test pukes to generate a pseudorandom sequence of emulated radioactive event test pulses,
step (c) comprises detecting the pseudorandom sequence of emulated radioactive event test pulses, and
the method comprises calibrating and/or testing a dead-time correction of the liquid scintillation counter based on the detected pseudorandom sequence of emulated radioactive event test pulses.

7. The method of claim 3, wherein:
step (b) comprises generating multiple emulated radioactive event test pulses 75 nanoseconds to 5 microseconds after generating a primary emulated radioactive event test pulse,
step (c) comprises detecting the sequence of emulated radioactive event test pulses, and
the method comprises calibrating and/or testing Time-Resolved Liquid Scintillation Counting (TRLSC) electronics and/or software of the liquid scintillation counter based on the detected primary test pulse and detected emulated after-pulse radiation.

8. A system for calibrating and/or testing a liquid scintillation counter, the system comprising:
a detector for producing a pulse signal corresponding to each of a plurality of detected radioactive events in a test sample;
an electronic test source comprising a pulse light emitting diode (LED), circuitry, and a programmable source controller;
a processor; and
a memory having instructions stored thereon, wherein the instructions, when executed by the processor, cause the processor to perform the calibration and/or testing of the detector, wherein:
(a) the pulse light emitting diode (LED) is operable to emit one or more emulated radioactive event test pulses, each a result of a corresponding electronic pulse signal(s) applied to the pulse LED; and
(b) the circuitry of the electronic test source comprises circuitry for producing a plurality of electronic pulse signal(s) and applying the electronic pulse signal(s) to the pulse LED, wherein each of the one or more electronic pulse signal(s) has a selectable electronic pulse shape such that each electronic pulse signal, when applied to the pulse LED, results in emission of an emulated radioactive event test pulse corresponding to a kind of light pulse selected from the group consisting of:
(A) a beta test pulse having a light pulse shape that emulates a light pulse shape produced by a scintillator as a result of radioactive decay of a beta emitter,
(B) an alpha test pulse having a light pulse shape that emulates a light pulse shape produced by a scintillator as a result of radioactive decay of an alpha emitter, and
(C) a gamma test pulse having a light pulse shape that emulates a light pulse shape produced by a scintillator as a result of radioactive decay of a gamma emitter; and
(c) the programmable source controller is operable to select the electronic pulse shape of each of the electronic pulse signal(s), thereby providing for programmable emission of the plurality of emulated radioactive event test pulses from the pulse LED of the electronic test source for calibration and/or testing of the liquid scintillation counter based on detection of the emulated radioactive event test pulses by the liquid scintillation counter; and wherein the system further comprises:

(d) a lumi light emitting diode (LED) operable to emit light emulating background light as a result of a corresponding electronic lumi signal applied to the lumi LED; and (e) circuitry for producing the electronic lumi signal and applying the electronic lumi signal to the lumi LED, wherein an amplitude and/or duty cycle of the electronic lumi signal is adjustable such that the electronic lumi signal, when applied to the lumi LED, results in emission of the emulated background light comprising a sufficiently small number of photons so as to emulate single photon events corresponding to background luminescence and/or after-pulses.

9. The system of claim 8, wherein the instructions, when executed by the processor, cause the processor to:

(a) generate, from the pulse light emitting diode (LED) of the electronic test source, a plurality of emulated radioactive event test pulses, wherein each emulated radioactive event test pulse is of a kind selected from the group consisting of:

(A) a beta test pulse having a light pulse shape that emulates a light pulse shape produced by a scintillator as a result of radioactive decay of a beta emitter;

(B) an alpha test pulse having a light pulse shape that emulates a light pulse shape produced by a scintillator as a result of radioactive decay of an alpha emitter; and (C) a gamma test pulse having a light pulse shape that emulates a light pulse shape produced by a scintillator as a result of radioactive decay of a gamma emitter, wherein the plurality of emulated radioactive event test pulses comprises at least one beta test pulse and at least one alpha test pulse; and (b) detect, by the detector, the plurality of emulated radioactive event test pulses.

10. The system of claim 9, wherein the instructions, when executed by the processor, cause the processor to calibrate one or more discriminators of the liquid scintillation counter based on the detection of the at least one alpha test pulse and the at least one beta test pulse by the liquid scintillation counter.

11. The system of claim 9, wherein:

the plurality of emulated radioactive event test pulses comprises at least one gamma test pulse, and the instructions, when executed by the processor, cause the processor to calibrate one or more discriminators of the liquid scintillation counter based on (i) detection of the at least one alpha test pulse and/or the at least one beta test pulse and (ii) detection of the at least one gamma test pulse.

12. The system of claim 8, wherein the circuitry of the electronic test source comprises at least two selectable circuit paths:

a first circuit path for producing an electronic pulse signal of a first kind having a first electronic pulse shape such that application of the electronic pulse signal to the pulse LED results in emission of an alpha test pulse; and a second circuit path for producing an electronic pulse signal of a second kind having a second electronic pulse shape such that application of the electronic pulse signal of the second kind to the pulse LED, results in emission of a beta test pulse.

13. The system of claim 8, wherein the programmable source controller module is operable to, for each electronic pulse signal of the one or more electronic pulse signal(s), select the electronic pulse shape of the electronic pulse signal by selecting one or both of the first and second circuit paths wherein:

when the first circuit path is selected, the electronic pulse signal of the first kind is produced and applied to the pulse LED, thereby resulting in emission of an alpha test pulse, when the second circuit path is selected, the electronic pulse signal of the second kind is produced and applied to the pulse LED, thereby resulting in emission of a beta test pulse, and when both the first and second circuit paths are selected, an electronic pulse signal of a third kind having a third electronic pulse shape is produced and applied to the pulse LED, thereby resulting in emission of a gamma test pulse.

14. The system of claim 8, wherein the programmable source controller module is operable to adjust the electronic lumi signal, thereby providing for programmable emission of the emulated background light and calibration and/or testing of the liquid scintillation counter based on (i) detection of the emulated radioactive event test pulses and (ii) detection of the emulated background light by the liquid scintillation counter.

15. The system of claim 8, wherein the programmable source controller module is operable to adjust intensities of the emulated radioactive event test pulses by adjusting an amplitude of corresponding electronic pulse signals that are applied to the pulse LED.

16. The system of claim 8, wherein the programmable source controller module is operable to adjust a time interval between two or more emulated radioactive event test pulses by varying a time interval between two or more corresponding electronic pulse signals that are applied to the pulse LED.

* * * * *